United States Patent
Seawright et al.

[11] Patent Number: 5,920,711
[45] Date of Patent: *Jul. 6, 1999

[54] SYSTEM FOR FRAME-BASED PROTOCOL, GRAPHICAL CAPTURE, SYNTHESIS, ANALYSIS, AND SIMULATION

[75] Inventors: J. Andrew Seawright, Cupertino; Robert J. Verbrugghe, Mountain View; Wolfgang B. Meyer; Barry M. Pangrle, both of Cupertino; Ulrich E. Holtmann, Mountain View; Pradip C. Shah, Santa Clara, all of Calif.

[73] Assignee: Synopsys, Inc., Mountain View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/529,876

[22] Filed: Sep. 18, 1995

Related U.S. Application Data

[63] Continuation-in-part of application No. 08/458,220, Jun. 2, 1995, abandoned.

[51] Int. Cl.$^6$ .................................................... G06F 9/455
[52] U.S. Cl. ........................... 395/500; 364/488; 364/489
[58] Field of Search .............................. 395/500; 364/488, 364/489, 490, 491

[56] References Cited

U.S. PATENT DOCUMENTS

| | | | |
|---|---|---|---|
| 4,546,435 | 10/1985 | Herbert et al. | 364/200 |
| 5,111,413 | 5/1992 | Lazansky et al. | 364/578 |
| 5,175,814 | 12/1992 | Anick et al. | 395/161 |
| 5,191,646 | 3/1993 | Naito et al. | 395/161 |
| 5,243,538 | 9/1993 | Okuzawa et al. | 364/489 |
| 5,253,363 | 10/1993 | Hyman | 395/800 |
| 5,313,615 | 5/1994 | Newman et al. | 395/500 |
| 5,544,066 | 8/1996 | Rostoker et al. | 364/489 |

OTHER PUBLICATIONS

Affdavit of J. Andrew Seawright, 3 pages, signed Jul. 28, 1998.

Affidavit of J. Andrew Seawright: Exhibit A, J. Andrew Seawright, "Protocol Compiler Demo Objectives", Synopsys, Inc., 27 pages, 1994.

Affidavit of J. Andrew Seawright: Exhibit B, J. Andrew Seawright and Dr. Raul Camposano, "Protocol Compiler Proposal", Synopsys, Inc., 18 pages, 1994.

Affidavit of J. Andrew Seawright: Exhibit C, J. Andrew Seawright and Dr. Raul Camposano, "Protocol Compiler Proposal", Synopsys, Inc., 17 pages, 1994.

Affidavit of Dr. Raul Camposano, 4 pages signed Aug. 11, 1998.

(List continued on next page.)

*Primary Examiner*—Kevin J. Teska
*Assistant Examiner*—Matthew Loopnow
*Attorney, Agent, or Firm*—Jonathan T. Kaplan; McDermott, Will & Emery

[57] ABSTRACT

A system for specifying, synthesizing, analyzing, simulating, and generating circuit designs for frame protocols. A GUI allows a user to specify a frame protocol and to edit and browse frame protocols. The GUI also allows the user to analyze an intermediate virtual circuit resulting from the protocol and to check the syntax of the protocol specification. In addition, the GUI allows the user to generate a High-level Description Language (HDL) file for the protocol. After the HDL is generated, the user can, through the GUI, simulate the operation of the HDL. The present invention includes a "SIMPLUG" feature that specifies a standard interface for GUI software 110, allowing the GUI to operate with a variety of simulators. The present invention also "back annotates" the virtual circuit to provide information in the virtual circuit that is used during simulation to indicate information about individual frames in the protocol. The present invention also optimizes both the virtual circuit and intermediate state transition graphs in accordance with the level of optimization specified by the user.

20 Claims, 61 Drawing Sheets

OTHER PUBLICATIONS

Affidavit of Dr. Raul Camposano: Exhibit A, "Minutes of Div. X/Synopsys Conference", 2 pages, Jun. 25, 1994.

Affidavit of Dr. Raul Camposano: Exhibit B, J. Andrew Seawright, "Protocol Compiler Demo Objectives", Synopsys, Inc., 27 pages, 1994.

Affidavit of Dr. Raul Camposano: Exhibit C, J. Andrew Seawright and Dr. Raul Camposano "Protocol Compiler Proposal", Synopsys, Inc., 18 pages, 1994.

Affidavit of Dr. Raul Camposano: Exhibit D, J. Andrew Seawright and Dr. Raul Camposano "Protocol Compiler Proposal", Synopsys, Inc., 17 pages, 1994.

Affidavit of Dr. Raul Camposano: Exhibit E, Email message addressed to Penny Herscher, 2 pages, Sep. 6, 1994.

Affidavit of Dr. Raul Camposano: Exhibit F, Purchase Order, issued Feb. 3, 1995 to Synopsys, Inc., 1 page.

Authors: Andrew Seawright and Forrest Brewer; Title: High–level Symbolic Construction Techniques for High Performance Sequential Synthesis; Article pp. 424–428; $30^{th}$ ACM/IEEE Design Automation Conference 1993.

Authors: Andrew Seawright and Forrest Brewer; Title: Clairvoyant: A Synthesis System for Production–Based Specification; Article pp. 172–185; IEEE Transactions on very large Scale Integration (VLSI) Systems, vol. 2; No. 2; Jun. 1994.

Authors: Andrew Seawright and Forrest Brewer; Title: Synthesis from Production–Based Specifications; Article pp. 194–199; $29^{th}$ ACM/IEEE Design Automation Conference 1992.

Author: Andrew Seawright; Title: Grammar–Based Specification and Synthesis for Synchronous Digital Hardware Design; Thesis (submitted to Thesis committee); Jun. 1994.

Brian Ebert et al., "SeeSaw: A Verilog Synthesis Viewer," 2nd Annual International Verilog HDL Conference, Design Excellence for Today and Tomorrow; Santa Clara, CA, pp. 55–60, Mar. 22, 1993, sponsored by Open Verilog, Int.

Hyunwoo Cho et al., "ATPG Aspects of FSM Verification," IEEE, 1990, pp. 134–137.

Linked Protocol Tree
(Frame Definition Database)

```
typedef enum {
    frame_null = 0,
    frame_def,
    frame_seq,
    frame_alt,
    frame_simul,
    frame_rept0,
    frame_rept1,
    frame_reptn,
    frame_reptp,
    frame_opt,
    frame_qual,
    frame_ref,
    frame_paramref,
    frame_term,
    frame_epsilon,
    frame_array,
    frame_exception,
    frame_if,
    frame_type;
```

Types of nodes in the Protocol Tree

Fig. 17

X0 = 0 ; X1 = 0            VC state list = X0X1', X0'X1

X0 = 1 ; X1 = 0            VC state list = X0'X1

X0 = 0 ; X1 = 1            VC state list empty

To Generate Wrapper HDL

HDLC_patterns

!id id id id 1 — assign (supress_flag, '1')

count[5:0] =="110000" && ! error_flag  id  write (data_valid, '1')

count[5:0] == "10-----"  1  crc_calc(supress_flag, id, data_reg, count, data_flag, error_flag, crc)

count[5:0] != "1-----"  id  a_one(data_reg, count, error_flag, supress_flag, data_flag)

!id  a_zero(data_reg, count, supress_flag, data_flag)

!id id id !id  write (data_reg, "00000000000000000000000000000000")  assign (count, "00000

| Analysis:Control : HDLC |
|---|
| Clear  Previous  Co-accept  Next  Done |

Done

Fig. 42

FrameBrowser(ReadOnly) - HDLC (hdlc.pdb)

File  Edit  View  Options  Help

HDLC_patterns

| !id | id | id | id | id | 1 | assign (suppress_flag, '1') |
| count[5:0] == "110000" && ! error_flag | id | write (data |
| count[5:0] == "10----" | 1 | crc_calc(suppress_flag, id |
| count[5:0] != "1-----" | id | a_one(data_reg, count, er |
| !id | a_zero(data_reg, count, |
| !id | id | id | id | id | id | id | id | write (data_reg, "0000 |

FrameBrowser(ReadOnly) - HDLC (hdlc.pdb)

File  Edit  View  Options  Help

HDLC_patterns

!id  id  id  id  id  1  assign (suppress_flag, '1')

count[5:0] == "110000" && ! error_flag  id  write (data count[5:0] == "10-----"  1  crc_calc(suppress_flag, id, count[5:0] != "1-----"  id  a_one(data_reg, count, er !id  a_zero(data_reg, count, !id  !id  write (data_reg, "0000

Frame Structured Data Format

Frame-Based Protocol Design Today

Frame continuous_search of Protocol HDLC

```
continuous_search (x)

[ 1 ]*

$x
```

Example of vertical frame display

Fig. 57

Design Flow

Generate Code Dialog

SYSTEM FOR FRAME-BASED PROTOCOL, GRAPHICAL CAPTURE, SYNTHESIS, ANALYSIS, AND SIMULATION

This application is a continuation in part of U.S. application Ser. No. 08/458,220 of Seawright et al. filed Jun. 2, 1995, now abandoned.

The Appendices appearing below were not printed with this issued patent, however they are available in the file wrapper.

APPENDICES

This application includes the following Appendices, each of which is hereby incorporated by reference:

Appendix A: FML Functional Specification,

Appendix B: example of FML for the HDLC protocol,

Appendix C: Functional Specification of the Frame Editor,

Appendix D: format of frame definition data base,

Appendix E: an example action package,

Appendix F: an example original virtual circuit,

Appendix G: an example optimized virtual circuit,

Appendix H: an example state transition graph,

Appendix I: an example min-encoded state transition graph,

Appendix J: an example min-encoded virtual circuit,

Appendix K: the SIMPLUG API,

Appendix L: an example test bench, and

Appendix M: example HDL.

BACKGROUND OF THE INVENTION

The present invention relates to a method and apparatus for synthesizing and analyzing circuits and, more particularly, to a system and method for specifying, synthesizing, analyzing, and simulating synchronous digital circuits for frame protocols.

Today's digital hardware systems are highly complex, layered, and operate at many levels of abstraction. Tomorrow's systems will be even more complex. As a means of addressing the design of systems whose complexity is continually growing, designers are moving to higher levels of abstraction.

For designers, especially telecommunication designers, the term "frame" is often used to describe a structured data format such as a packet, header, or cell. Frames are a medium familiar to designers for describing structured data and are often used to graphically illustrate data exchange standards and protocols. Frames appear in data books, communications standards, and instruction sets. For our purposes, a "frame" is defined as any element of a hierarchically structured data format. Frames are composed of sub-frames, which can themselves be de composed into further sub-frames. Ultimately, these sub-frames are composed of terminal frames which represent bit patterns, simple expressions, or value fields seen in a protocol. An example of a structured frame format is illustrated in FIG. 55.

FIG. 55 illustrates a frame comprising a sequence of three subframes. Each of the sub-frames can be further decomposed, perhaps into possible alternative sub-frames. The lowest level frames represent bit patterns. In the example, the second sub-frame is decomposed into two alternative sub-frames, one of which begins with the bit pattern "101 . . . " and the other which begins with "0 . . . ". Examples of typical industrial frame-based data formats include Asynchronous Transfer Mode (ATM) cells, Synchronous Optical Network (Sonet)/SDH frames, and the JPEG or MPEG stream data format. Additional frame-based protocols used in networking systems include Ethernet, FDDI, and token-ring.

Many designs simply process highly structured data such as, for example, a network switch. This structured data may conform to a "standard" at which different layers, or in which different modules, of a system communicate. The structure of the data may be an international standard, a standard in flux, or proprietary. In any case, in these designs, the structure of the data is an essential defining feature or parameter of the design.

Today, the design of a network interface chip typically progresses in four stages (see FIG. 56). In the first stage, the protocol is designed based on the structure of the data to be processed and the computations to be performed. This is done manually. After designing the protocol, an implementation of the protocol controller is undertaken by designing the Finite State Machine (FSM) implementing the required control logic. Again, this is usually performed manually. In the third stage, the designer translates the finite state machines into High-Level Description Language (HDL) code and integrates into the HDL code the computations required. At this point the designer can verify the design through simulation and perform synthesis of the design.

For the designer, translating from the protocol to the FSM's (stage 1 to stage 2) and from the FSM's to the HDL (stage 2 to stage 3) is a complicated and error-prone process. Graphical state machine entry systems can help in going from stages 2 to 3. However, this forces the designer to think about the design at more of an implementation level, i.e., in terms of states. This thought process can obscure the parameters of interest to the designer—the packets or cells or data frames to be processed. These FSM's are sensitive to the characteristics of the protocol; any change in the structure of the data often causes significant changes to the implementation of the design. For example a change such as adding a field or adding an alternative will force the re-design of the FSM's and potentially cause global changes to the HDL. If there is a bug in the design the designer is forced to debug at the HDL level, while the designer would like to understand, analyze, and debug the design at the protocol level.

The telecommunication designer needs a domain specific solution in the area of frame based protocols enabling him/her to work at the protocol level of abstraction.

SUMMARY OF THE INVENTION

The present invention provides a system for specifying, synthesizing, analyzing, and simulating frame protocols. A protocol is initially specified using a Graphical User Interface (GUI) (or a textual frame specification language). Using the GUI, a human user can perform various GUI functions for the specified protocol. For example, the user can edit the protocol using the GUI. The user can browse existing protocols in a graphical form and can cut and paste elements of the protocol, thus avoiding having to type redundant information. The user also can check the syntax of an entered protocol for correctness using the GUI.

The user uses the GUI to initiate generation of a High-level Description Language (HDL) output that reflects the specified protocol. The present invention allows the user to specify, through the GUI, various levels of optimization to be used while generating the HDL. During generation of the HDL, the present invention translates the protocol into a intermediate "virtual circuit." Although the steps taken to translate the virtual circuit into HDL depend on the optimization level specified by the user, the various translation steps are transparent to the user.

The user can perform various analysis functions on the virtual circuit using the GUI. The present invention can translate the HDL into any of a number of known circuit definition languages in accordance with parameters specified through the GUI.

The user can also use the GUI to simulate the operation of the HDL. The present invention includes a "SIMPLUG" feature that specifies a standard interface for interfacing between conventional simulator software and the GUI, i.e., for displaying the results of simulation via the GUI. The present invention "back annotates" the virtual circuit to provide information in the virtual circuit that is used during simulation to indicate information about individual frames in the protocol. The present invention also optimizes both the virtual circuit and intermediate state transition graphs in accordance with the level of optimization specified by the user through the GUI.

These and other advantaiges of the present invention will become more fully apparent when the following detailed descriptions of the invention are read in conjunction with the accompanying drawings.

BRIEF DESCRIPTION OF THE DRAWINGS

The invention will now be described with reference to the accompanying drawings, wherein:

FIG. 17 shows examples of the types of nodes in the frame definition data base.

FIGS. 39–42 show sample output of analysis of a protocol using the GUI.

FIG. 48 shows an example of a Simulator Browser window of FIG. 46 after a first breakpoint.

FIG. 50 shows an example of a Simulator Browser window after a second breakpoint.

FIG. 51 shows an example of a window for displaying commands sent between GUI software and simulator software.

FIG. 57 shows a vertical frame display in a GUI window that corresponds to the horizontal frame display of FIG. 6.

DETAILED DESCRIPTION OF THE PREFERRED EMBODIMENTS

The following description is of the best presently contemplated modes of carrying out the invention. This description is made for the purpose of illustrating the general principles of the invention and is not to be taken in a limiting sense.

1. General Overview

Figure 1:
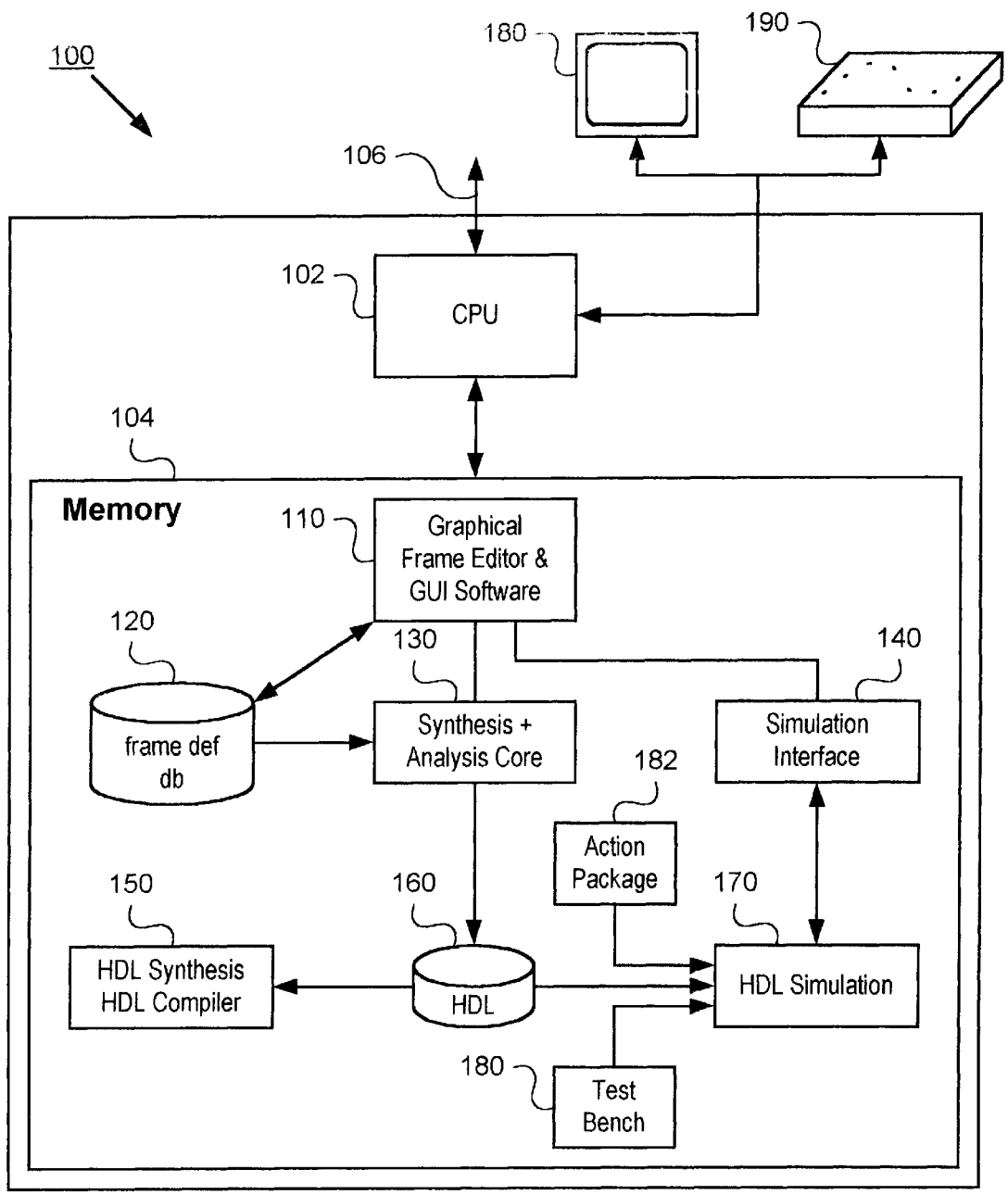
FIG. 1 is a block diagram of a computer system in accordance with the present invention.

FIG. 1 is a block diagram of a computer system 100 in accordance with the present invention. Computer system 100 includes a CPU 102, a memory 104, input/output lines 106, a display device 180, and an input device 190 such as a mouse, a touchpad, a keyboard, etc. It will be understood by a person of ordinary skill in the art that computer system 100 can also include numerous elements not shown in the Figure for the sake of clarity, such as disk drives, network connections, additional memory, additional CPUs, etc. In FIG. 1, several elements 120, 160 are shown using the standard symbol for disk drives. These elements (and other elements represented in the Figures by use of the disk drive symbol) may be stored on external media such as a disk drive or as files in memory 104.

Memory 104 includes both software and data. Specifically, the software in memory 104 includes a graphical frame editor and Graphical User Interface (GUI) software 110, a synthesis and core analysis element 130, a simulation interface 140, an HDL synthesis/compiler element 150, and HDL simulation software 170. The data includes a frame definition data base 120 and a High-level Description Language (HDL) file 160. Frame definition data base 120 is input to and output from GUI software 110 and is input to synthesis and analysis core 130. HDL 160 is output from the synthesis portion of synthesis and analysis core 130 and is input to HDL synthesis/compiler software 150 and to HDL simulation software 170. Throughout this document, it should be understood that elements 110, 130, 140, 150 and 170 preferably are embodied as instructions stored in memory 104 and executed by CPU 102. The output of GUI software 110 is displayed on display device 180. User input to GUI software 110 is received via input device 190 or any other suitable device.

A preferred embodiment of the invention runs under the SunOS 4.1.3 operating system. SunOS is a registered trademark of Sun Microsystems, Inc. of Mt. View, Calif. The GUI of the described embodiment was developed with MAIN-Win from MAINSoft, Inc. of Mt. View, Calif. This development environment yields a system that runs under unix. A preferred embodiment was developed using PC windows GUI toolkit visual C++.

The present invention allows a user to specify a protocol using GUI 110 software (or FML 210). As a first step of both the synthesize and analyze functions, the invention generates a frame definition data base 120 (also called a "linked protocol tree"). Data base 120 is converted to HDL 160. HDL 160 can be translated into a design for hardware circuitry by methods known to persons of ordinary skill in the art. Thus, the present invention translates a protocol (which may be specified graphically) into HDL.

Figure 2:
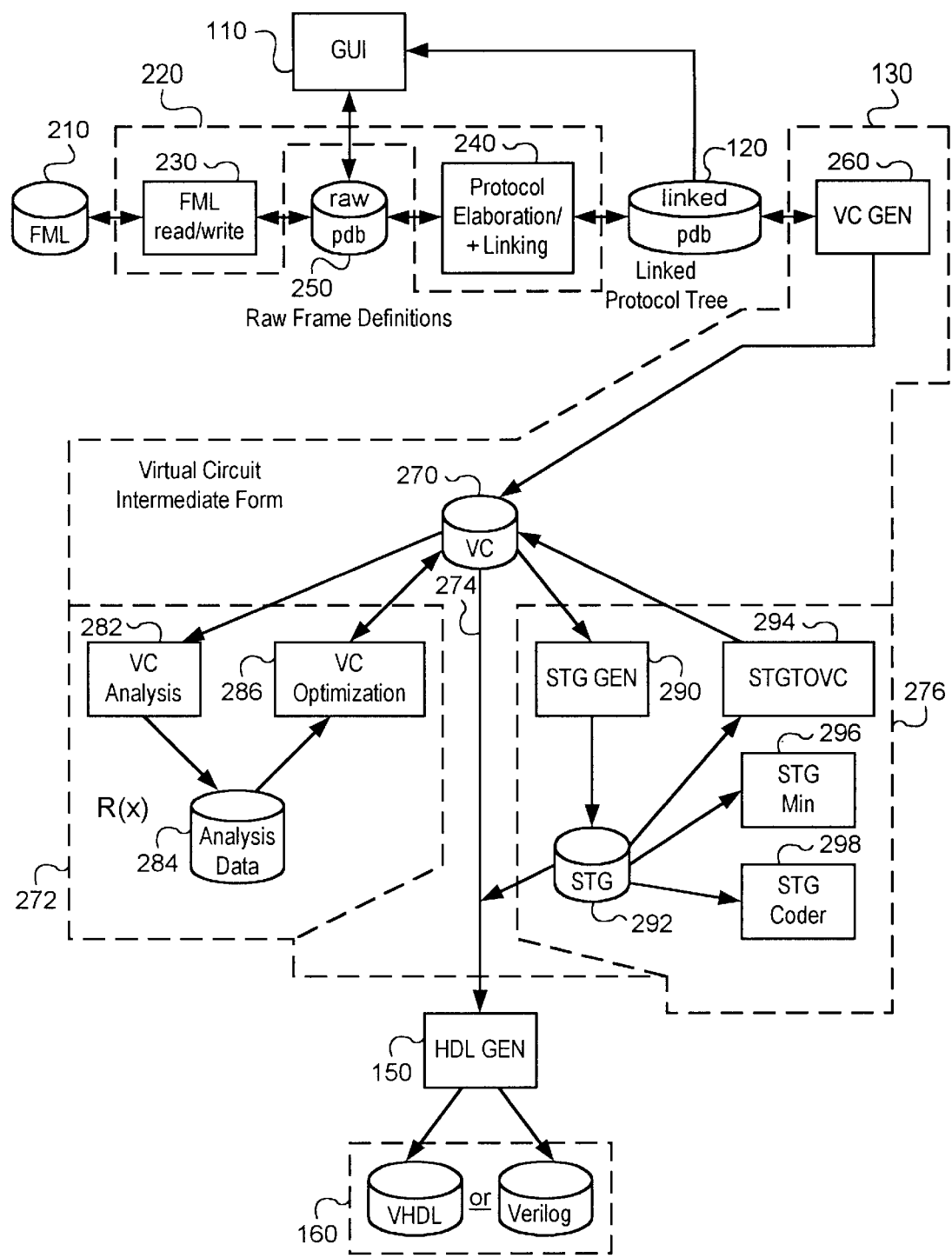
FIG. 2 is a block diagram of software modules and data in accordance with the present invention, including a GUI.
Figure 3:
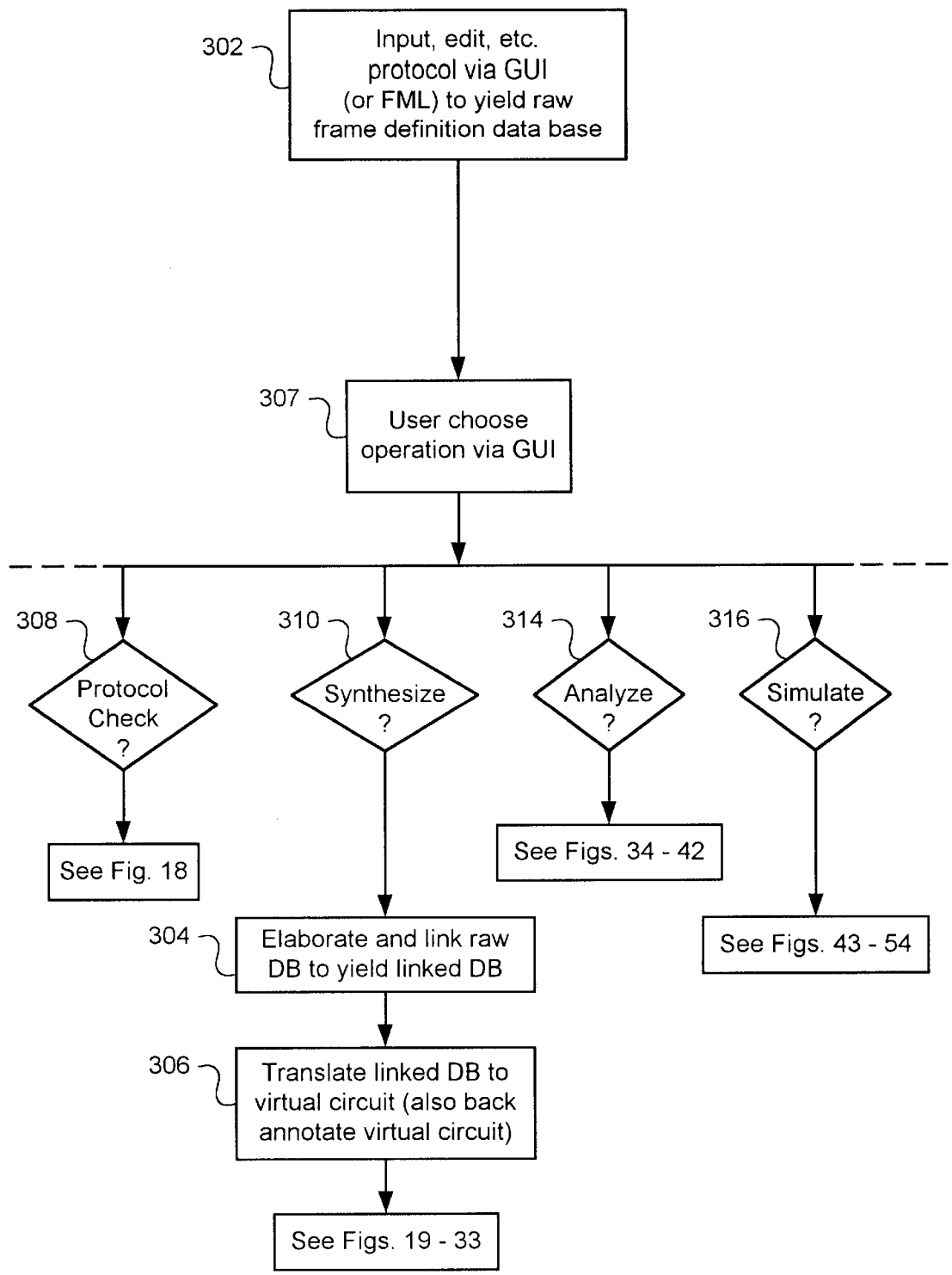
FIG. 3 is a flow chart showing steps performed in conjunction with the block diagrams of FIGS. 1 and 2.

FIG. 2 is a block diagram of software modules and data in accordance with the present invention. FIG. 2 shows additional detail of elements of FIG. 1. FIG. 3 is a flow chart showing steps performed by GUI software 110 in conjunction with the block diagrams of FIGS. 1 and 2. As shown in step 302 of FIG. 3, a Frame Modeling-up Language (FML) file 210 is input to element 220, where it is converted to a "raw" frame definition data base 250. FML is a language for specifying protocols and is described in an FML Functional Specification, which is attached hereto as Appendix A and which is hereby expressly incorporated by reference. An early version of FML (called "PBS") is described in "Grammar-Based Specification and Synthesis for Synchronous Digital Hardware," a Ph.D. thesis of Andrew Seawright, University of California, Santa Barbara, Calif., which is expressly incorporated herein by reference. The frame definition data base includes a plurality of tree data structures, each tree data structure corresponding to a frame is the specified protocol.

Alternatively, as also shown in step 302, GUI software 110 receives user input that specifies a protocol, as described in detail below, and converts the user input to have the format of frame definition data base 250. Use of either the FML or the GUI results in substantially similar entries in the "raw" frame definition data base 250. All data capable of being entered using the GUI can be entered using FML and vice versa.

Figure 16:
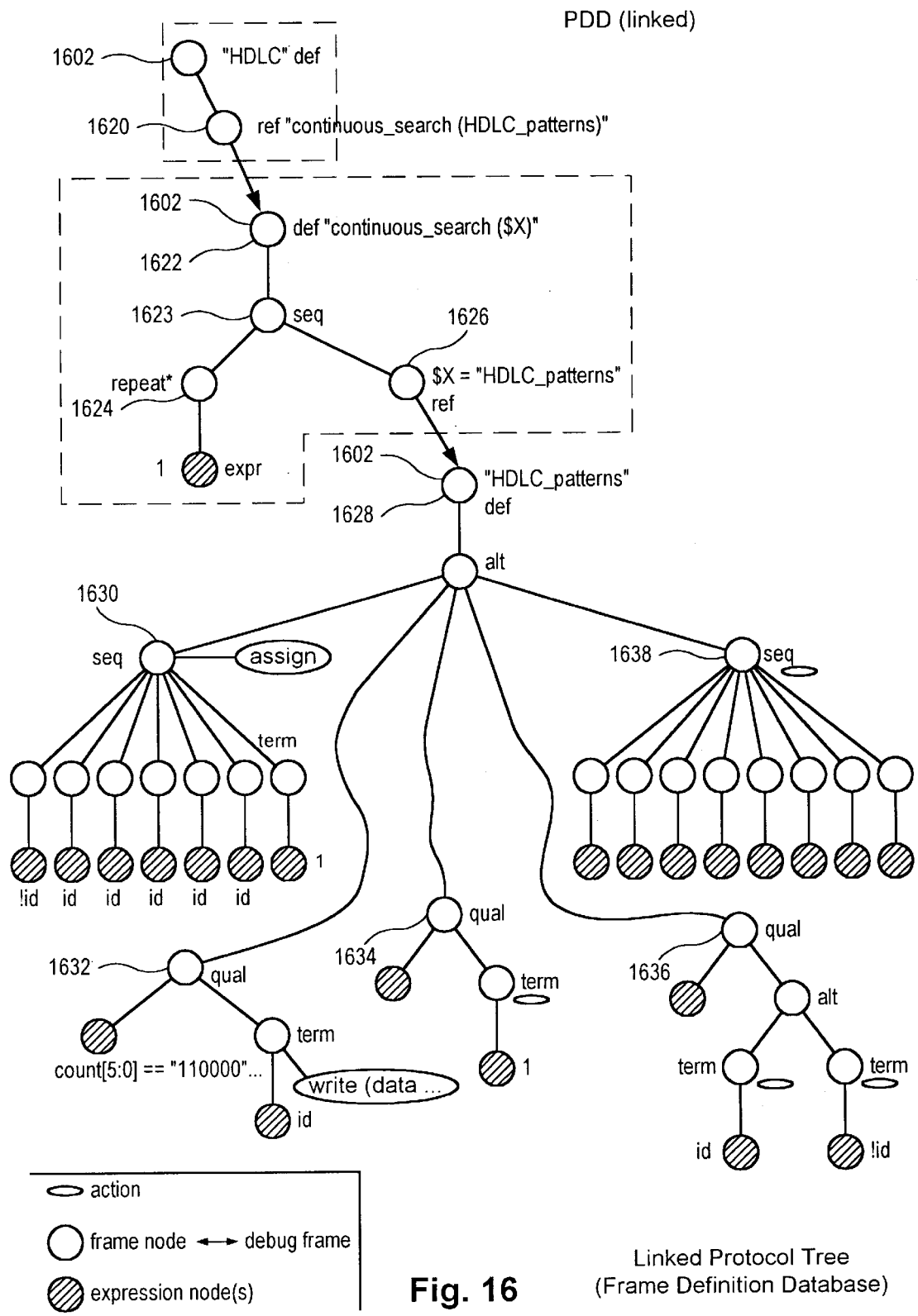
FIGS. 16(a) and 16(b) show an example of a protocol stored in the frame definition data base of FIG. 1.

In step 304, protocol elaboration and linking software 240 links the plurality of trees (one for each specified frame) in frame definition data base 250 to create a linked protocol tree 120, which has a format as shown in Appendix D. FIG. 16 is an example of a linked protocol tree 120.

FIG. 2 shows additional details of synthesis and analysis software 130 of FIG. 1. Specifically, in step 306, protocol tree 120 is input to a virtual circuit (VC) generator 260, which produces a virtual circuit 270. Once the protocol is entered, the present invention can proceed via several paths, depending On user direction that is input via the GUI. GUI software 110 allows the user to indicate several operations that can be performed at this point. These operations include protocol check (step 308), synthesis to generate HDL 160 (step 310), analysis of virtual circuit 270 (step 314), and simulation of generated HDL (step 316). Each of these operations, along with the operation of GUI software 110 for each, is discussed below.

Figure 58:
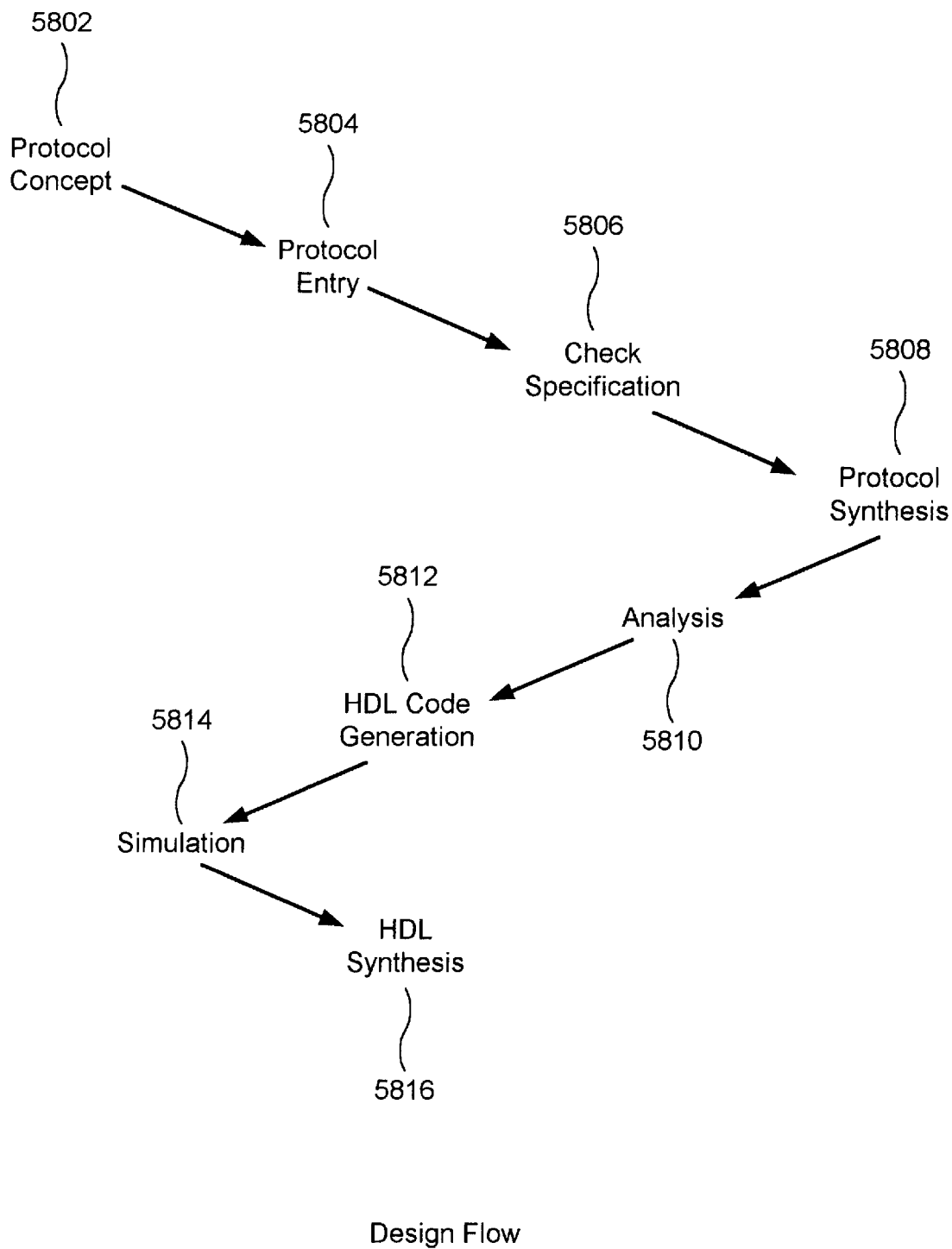
FIG. 58 shows an example of a development process performed using the present invention.
Figure 59:
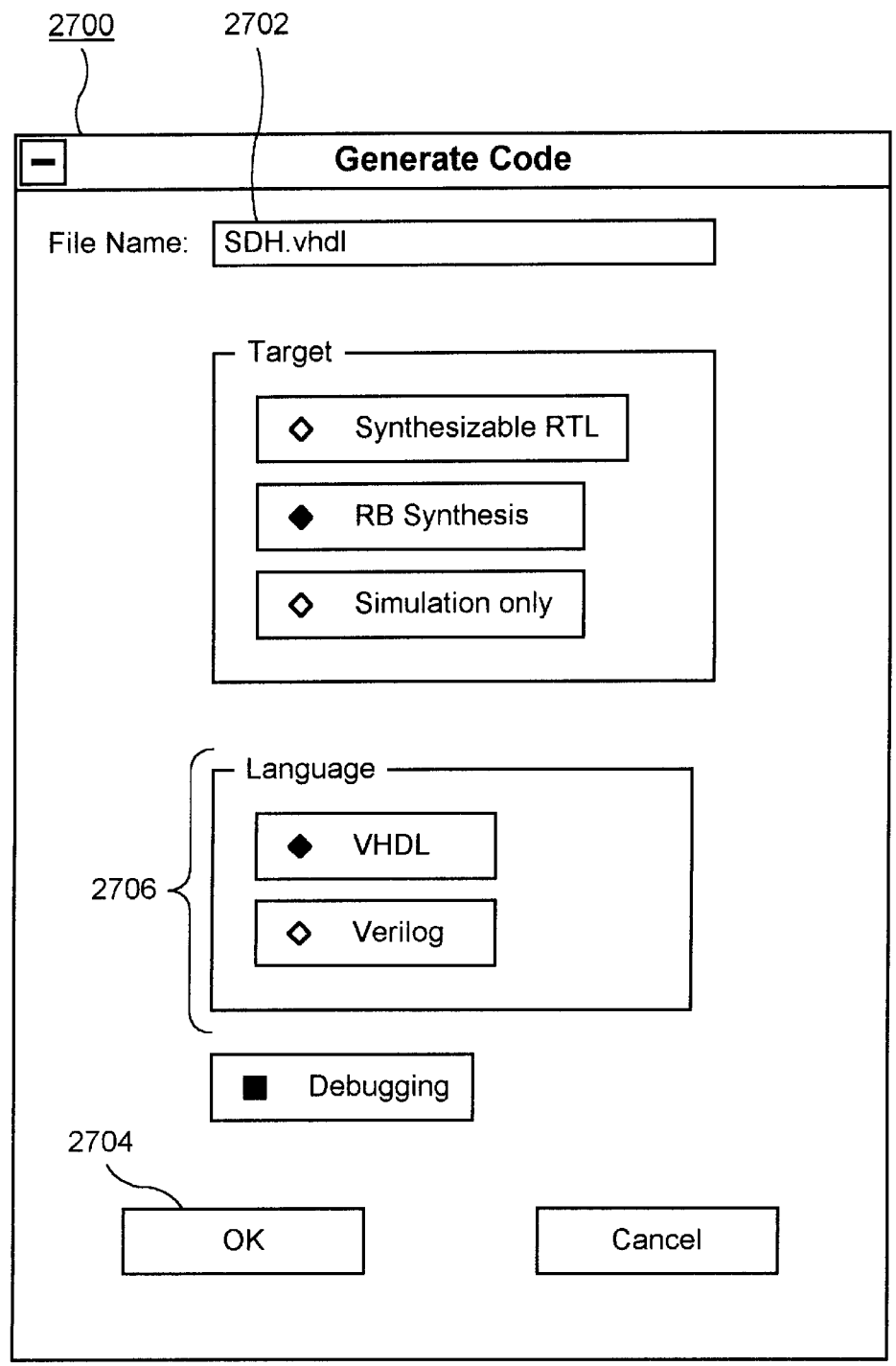
FIG. 59 shows a Generate Code window generated by the GUI.

FIG. 58 shows an example of a development process performed using the present invention. In step 5802, a human designer conceives of a protocol to be synthesized. In step 5804, the protocol is entered into the computer system using GUI (or FML). From here on, the development process is controlled by menu items shown in FIG. 5. In step 5806, the user clicks on "Check Protocol" and the entered protocol is checked for syntax errors. In step 5808, the user clicks on "Synthesize" and GUI software 110 initiates generation of HDL 160 in accordance with parameters entered by the user (e.g., effort and style parameters, see FIG. 19). In step 5810, the user clicks on "Analyze" and GUI software 110 initiates the analysis operation of the intermediate virtual circuit 270, displaying the results via the GUI. In some embodiments, the analysis process may also include linking and conversion to a virtual circuit.

In step 5814, the user clicks on "Simulate" and GUI software 110 performs a simulation of the HDL, displaying the results via the GUI. The simulation may use any of a number of commercially available simulators, since the present invention incorporates a standard SIMPLUG interface 140 that allows various commercial simulators to interface with the GUI. If the simulation is acceptable, the user may also choose to synthesize the HDL into a low-level circuit representation (step 5816), using any one of a number of commercially available products, such as Design Compiler, which is available from Synopsys, Inc. of Mt. View, Calif. Note that the last synthesis step, which synthesizes a circuit, is different from the HDL synthesis step, which generates HDL 160 for the specified protocol.

2. Entering a Protocol Using the GUI a. Appearance and Behavior of the GUI

Figure 4:
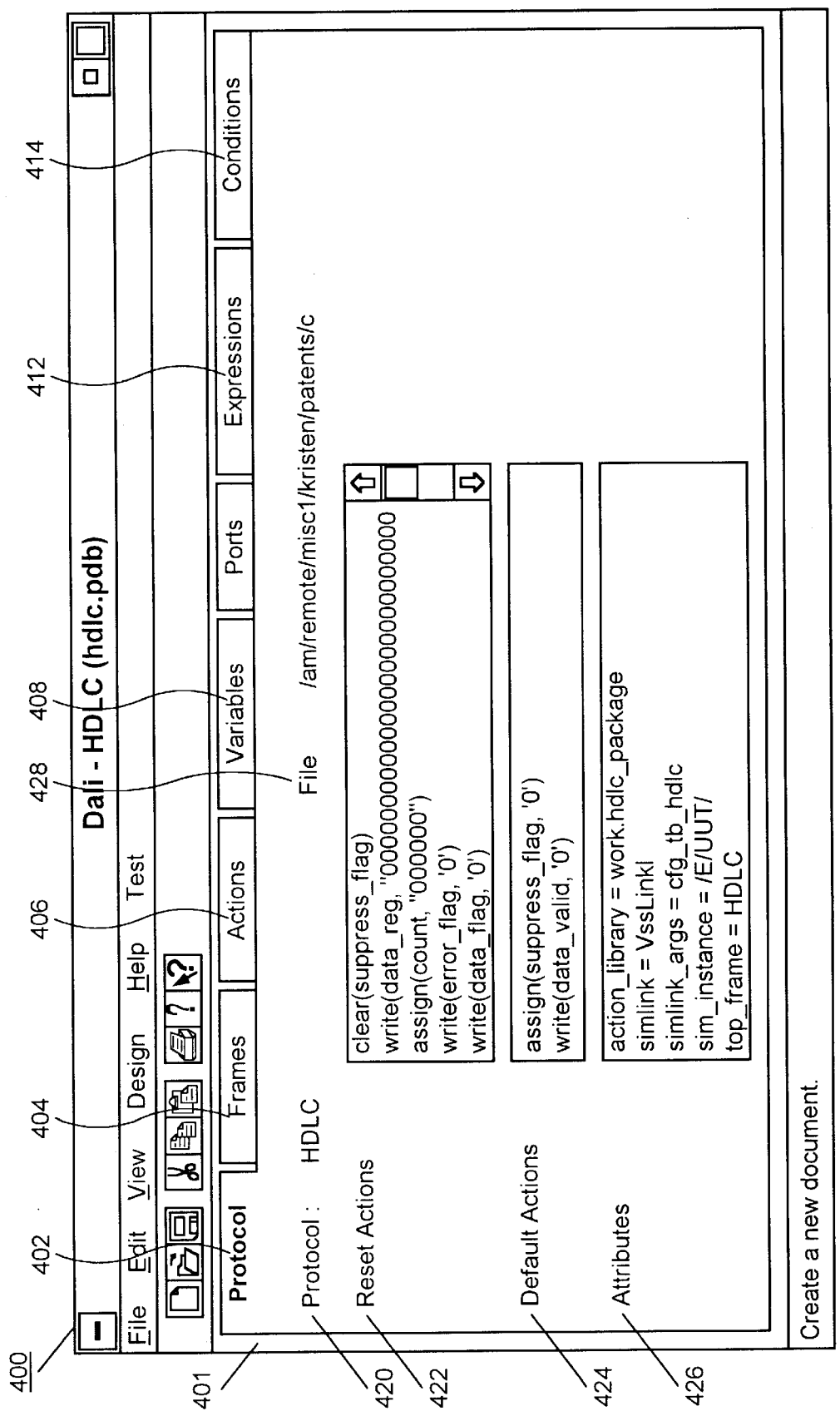
FIG. 4 is an example of a Protocol Browser display screen generated by the GUI.

FIG. 4 is an example of a Protocol Browser display screen generated on display device 180 by GUI 110 software. GUI software 110 allows a user to enter a protocol in graphical form. A preferred embodiment of the present invention uses a windows type user interface. In a preferred embodiment, the Protocol Browser is the first screen displayed by GUI software 110. The main window has a plurality of buttons 401 along a top border. These buttons are labelled "Protocol" 402, "Frames" 404, "Actions" 406, "Variables" 408, "Ports" 410, "Expressions" 412, and "Conditions" 414. The protocol Browser of FIG. 4 also is displayed whenever "Protocol" button 402 is clicked.

Figure 6:
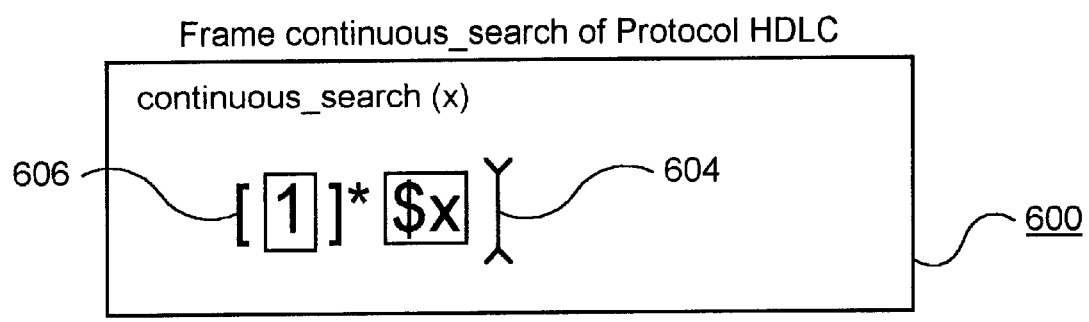
FIG. 6 is an example of a first Frame Editor window generated by the GUI.
Figure 7:
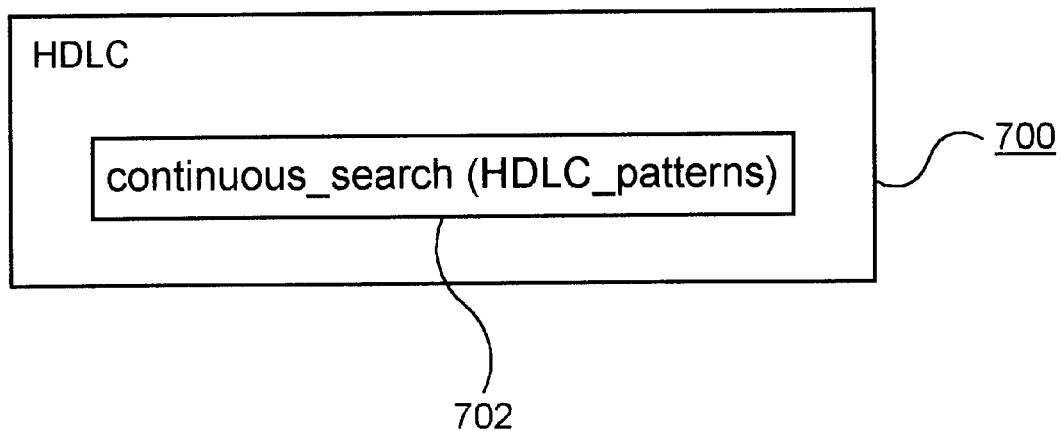
FIG. 7 is an example of a second Frame Editor window generated by the GUI.

The following discussion shows use of the GUI to specify a protocol called "HDLC," which recognizes a set of "HDLC patterns" and which performs a corresponding one of a plurality of actions when an associated frame is "recognized" (also called "accepting"). Frames graphically entered by the user to define the HDLC protocol are shown in FIGS. 6–8. The FML for the HDLC protocol is shown in Appendix B, which is hereby incorporated by reference.

The following paragraph defines certain terminology used in this document. A frame "recognizes" (accepts) in a cycle when the input bit pattern it is looking for is received. Any actions tied to the frame are executed in the cycle when the frame accepts. A "hierarchical" frame is a frame that includes other, lower level frames (children frames). A "terminal" frame is a frame that does not include children frames. A terminal frame is "active" when it accepts. A hierarchical frame is active when one of its children frames are active and accepts when a last one of its children frames accepts. If multiple frames are recognized, multiple actions are executed, in a predetermined order, e.g., in a top-to-bottom order shown in FIG. 8.

The display screen of FIG. 4 includes the following fields: a protocol field 420 which displays a name of a protocol being specified, i.e., a name of a design or block of the protocol; a Reset Actions field 422, which indicates actions to be performed when the protocol design is reset; a "Default Actions" field 424, which displays the names of actions that always execute at a start of every cycle. Default actions are useful for setting ports or internal variables to a default value that may be overridden in selected cycles by actions linked to parts of the protocol. The default actions themselves preferably are stored by the user in a predetermined default FML action file known to GUI software 110. Other embodiments of the invention allow the user to specify the reset and default actions within the GUI.

The screen of FIG. 4 also includes an Attributes field 426, which displays attributes for the protocol (example of attributes are defined in Appendix A), and a "File" field 428, which displays a name of the file where the specified protocol is to be stored (i.e., the name of frame definition data base 250). In alternative embodiments, the user clicks on any of these displayed field 426 to bring up an Attribute Editor window (not shown). An alternate embodiment also shows which frame is the "top frame" for the protocol.

Figure 5:
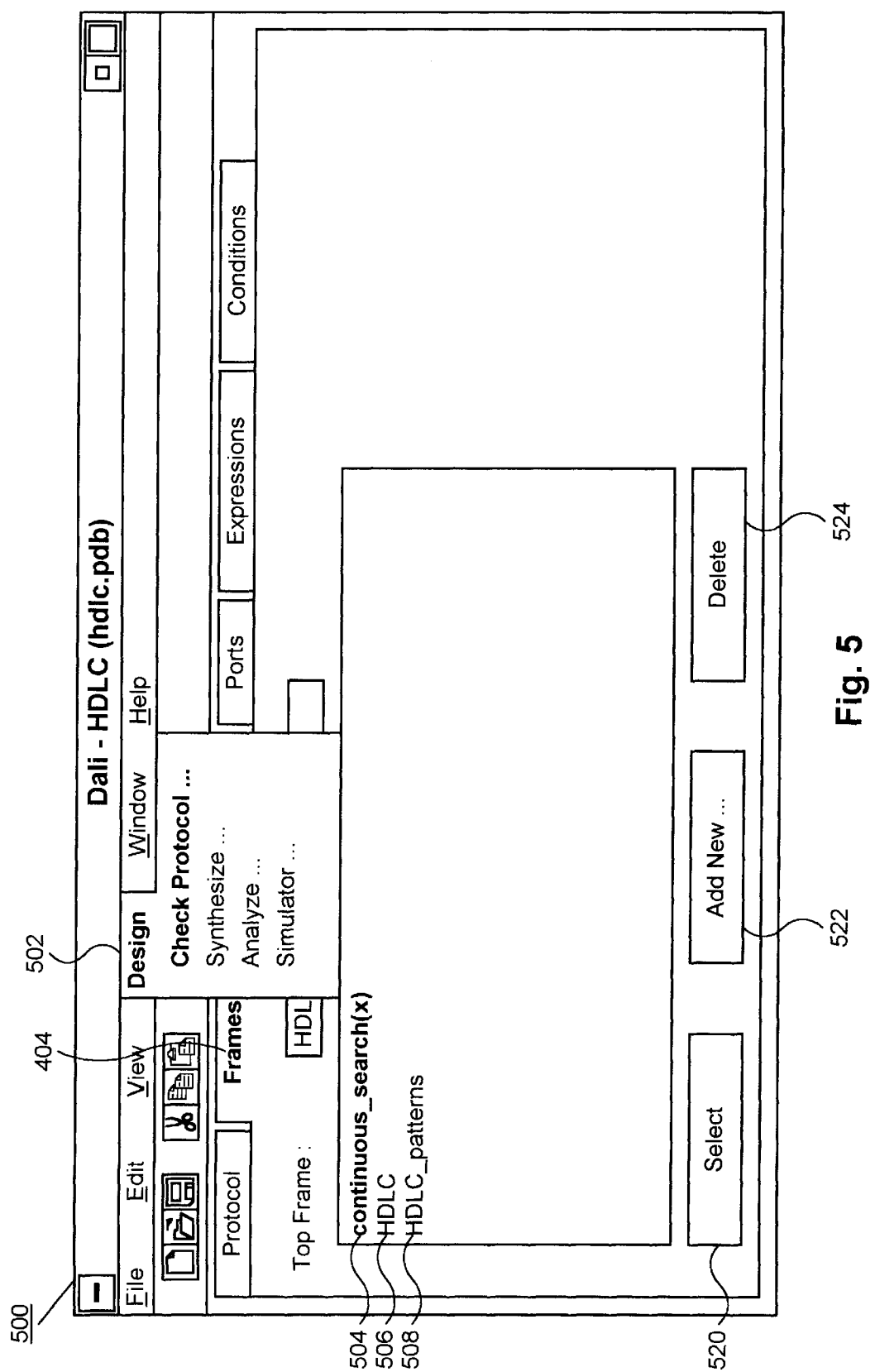
FIG. 5 is an example of a Frame Browser display screen generated by the GUI.

FIG. 5 is an example of a Frame Browser display screen 500 generated by GUI software 110 when "Frames" button 404 is clicked and also shows the contents of a pull-down "Design" menu 502. The entries in the Design menu correspond to steps 310–316 of FIG. 3. In FIG. 5, the protocol HDLC incudes three frames: "continuous_search" 504, "HDLC" 506 (which has been designated by the user as the "top" frame and "HDLC_patterns" 508. The Frame Editor display screen includes three buttons: "Select" 520, "Add New" 522, and "Delete" 524. These buttons are used to select frames, to add a new frame, and to delete a selected frame. Throughout the described embodiment, selected elements (frames, actions, etc.) are highlighted to indicate their selected status. Different types of frame elements (e.g., alternate bars, frames, actions, conditions, etc) preferably are displayed in different colors. Double clicking on a frame 504, 506, or 508 opens a Frame Editor window for that frame (see FIGS. 6–8, respectively).

FIGS. 9(a) through 9(g) show a format for specifying frames in the Frame Editor display of the GUI. Creation of frames is shown in Appendix C. Frames, and portions of frames are moved around on the display device by a standard cut and paste method. Further details of the Frame Editor are described in Appendix C.

Figure 9A:
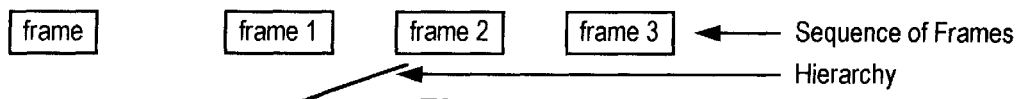
FIG. 9(a) through 9(g) show a format for specifying frames in the Frame Editor window of the GUI.
Figure 9B:
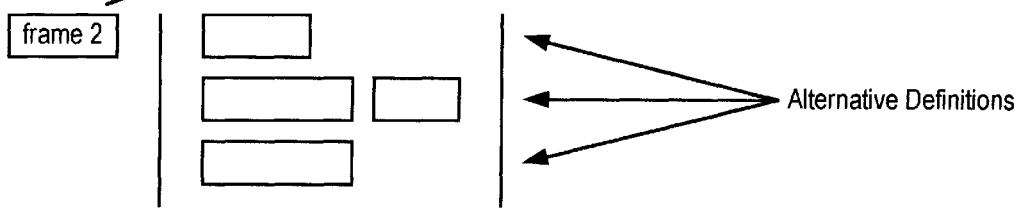

A number of operators can be applied to the frames in a frame definition. Most of the formats of FIG. 9 are obtained by selecting one or more appropriate frames and selecting an appropriate operator from a pull-down menu (or from a plurality of buttons). FIG. 9(a) (sequence of frames) is represented graphically as a list of frames from left to right. FIG. 9(b) shows alternative frames. Alternatives are displayed vertically with a single bar on either side. Within each alternative, a sequence of frames is listed from left to right.

Figure 9C:
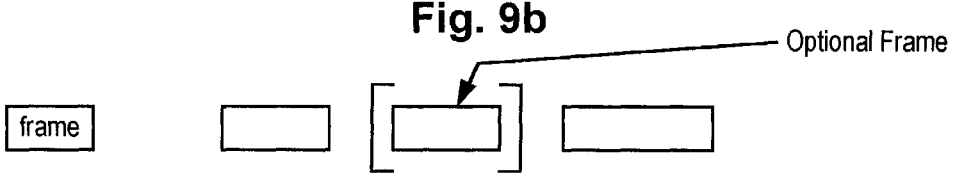
Figure 9D:
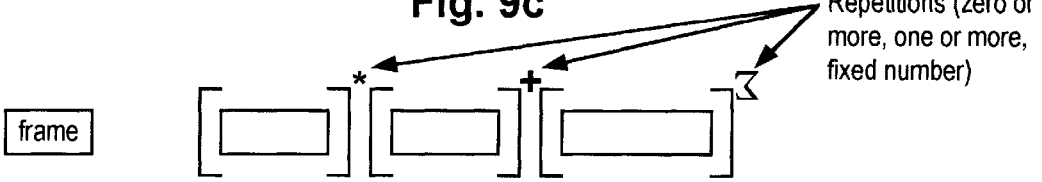
Figure 9E:

Rather than having to explicitly list a single repeating frame many times, the user can use a short-hand notation using brackets for how many times the frame repeats. FIG. 9(c) shows optional frames. FIG. 9(d) shows repeated frames. The user can specify zero or more repetitions (indicated on the display by a "+"), one or more repetitions (indicated on the display by a "+") or some other number of repetitions (indicated on the display by an integer).

Qualifiers may be attached to a frame. A qualifier restricts a frame to only be active when a certain condition is true. This condition is a Boolean equation expressed in terms of variables or ports of a design. This way, frame recognition can be controlled by HDL statements embedded in actions (see, e.g., FIG. 8), but outside of the protocol's frame definition. A qualifying definition may be based on both ports and declarations. Qualifiers can be nested. A qualifier is represented graphically by a box attached to the left side of a frame definition. The qualifier may be either expanded or collapsed (not shown) by, e.g., clicking on an "expand" or "collapse" button (not shown). An expanded qualifier displays the text of the Boolean condition. The collapsed qualifier shows only the qualifier box.

Figure 9F:
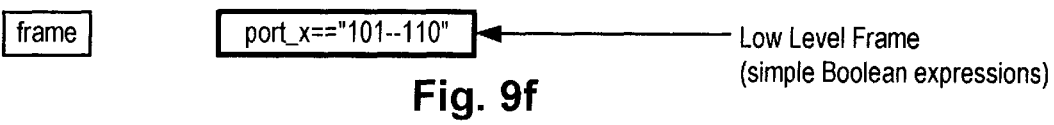

Terminal frames recognize a specific bit pattern on specified designated ports. These patterns may be specified either as a constant bit pattern or as a Boolean equation of certain input ports. As with qualifiers, the text within a terminal frame may be collapsed for readability. For details on how to specify terminal equations, refer to the FML Specification (Appendix A), which is attached hereto and is incorporated by reference. FIG. 9(f) shows a low level/terminal frame.

A frame might be composed of two or more child frames that are recognized concurrently. A simultaneous frame recognizes when all of its sub-frames recognize, i.e., when all sub-frames start on one initial cycle and they all recognize on another, later cycle. Simultaneous frames are represented graphically as a vertical list of sub-frames, with a double line on each side.

Figure 9G:
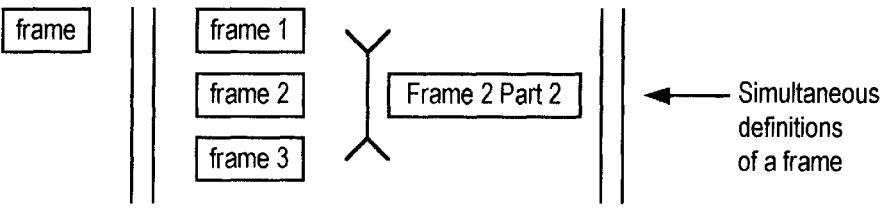
Figure 9G:

FIG. 9(g) shows an "IF" frame that is similar to a qualifier frame. "IF" requires that a condition be true at the start of an associated frame. Frames also may be "parameterized" as shown in FIG. 6, in which a name of a frame is substituted for parameter "x". Parameterized frames are also called template frames.

Thus, FIGS. 6–8 show information entered by a user into frame definition windows of the GUI for each of the three frames in the HDLC protocol. FIG. 6 shows at Frame Editor window 600 for a frame named "continuous_search", which receives a parameter of "x" and which recognizes any input ending in a frame indicated by the parameter "x". (The frame [1]* 606 will match any input). FIG. 6 also shows an insertion point cursor 604 that indicates a point at which a new frame would be added (or a Cut and paste would occur). The insertion point cursor is used in each of the edit windows and can be moved via the mouse.

Figure 8A:
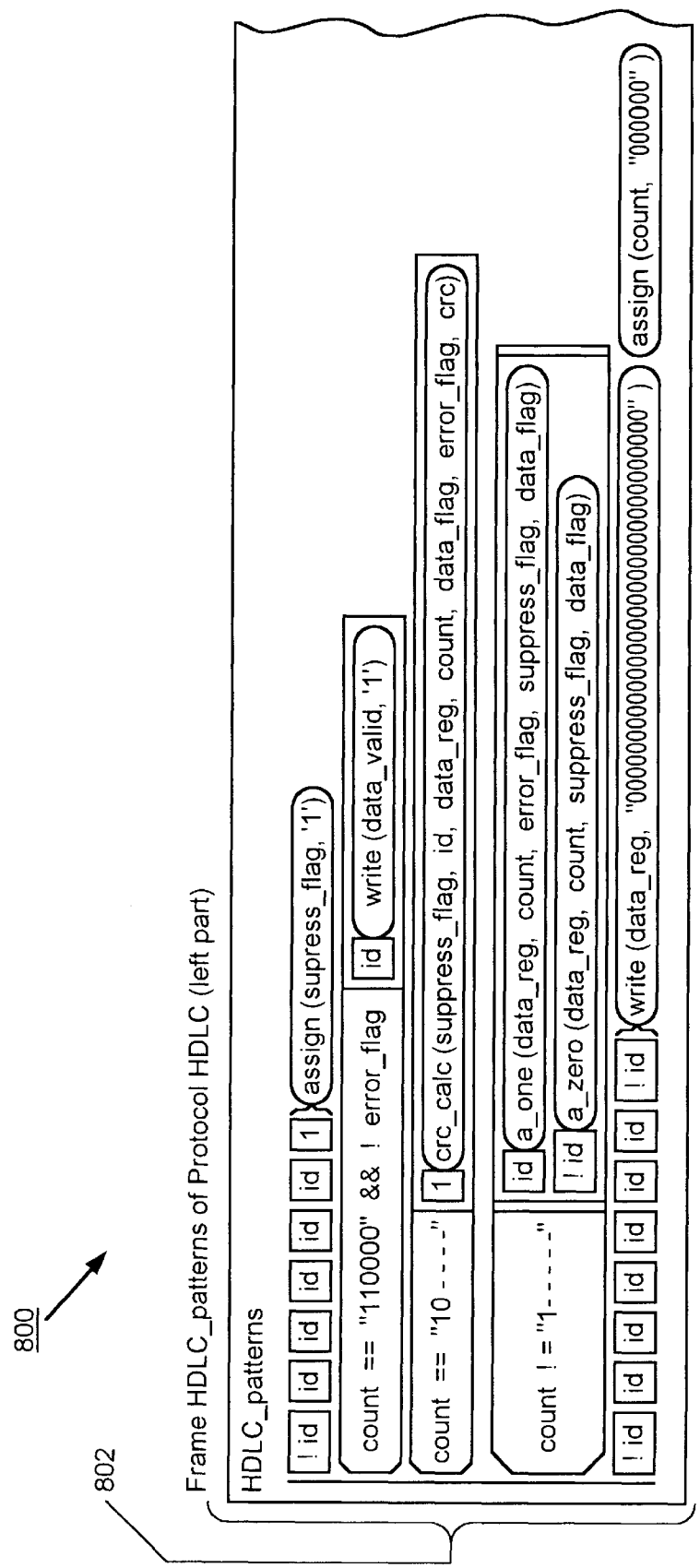
FIGS. 8(a) and 8(b) are an example of a third Frame Editor window generated by the GUI.
Figure 8B:
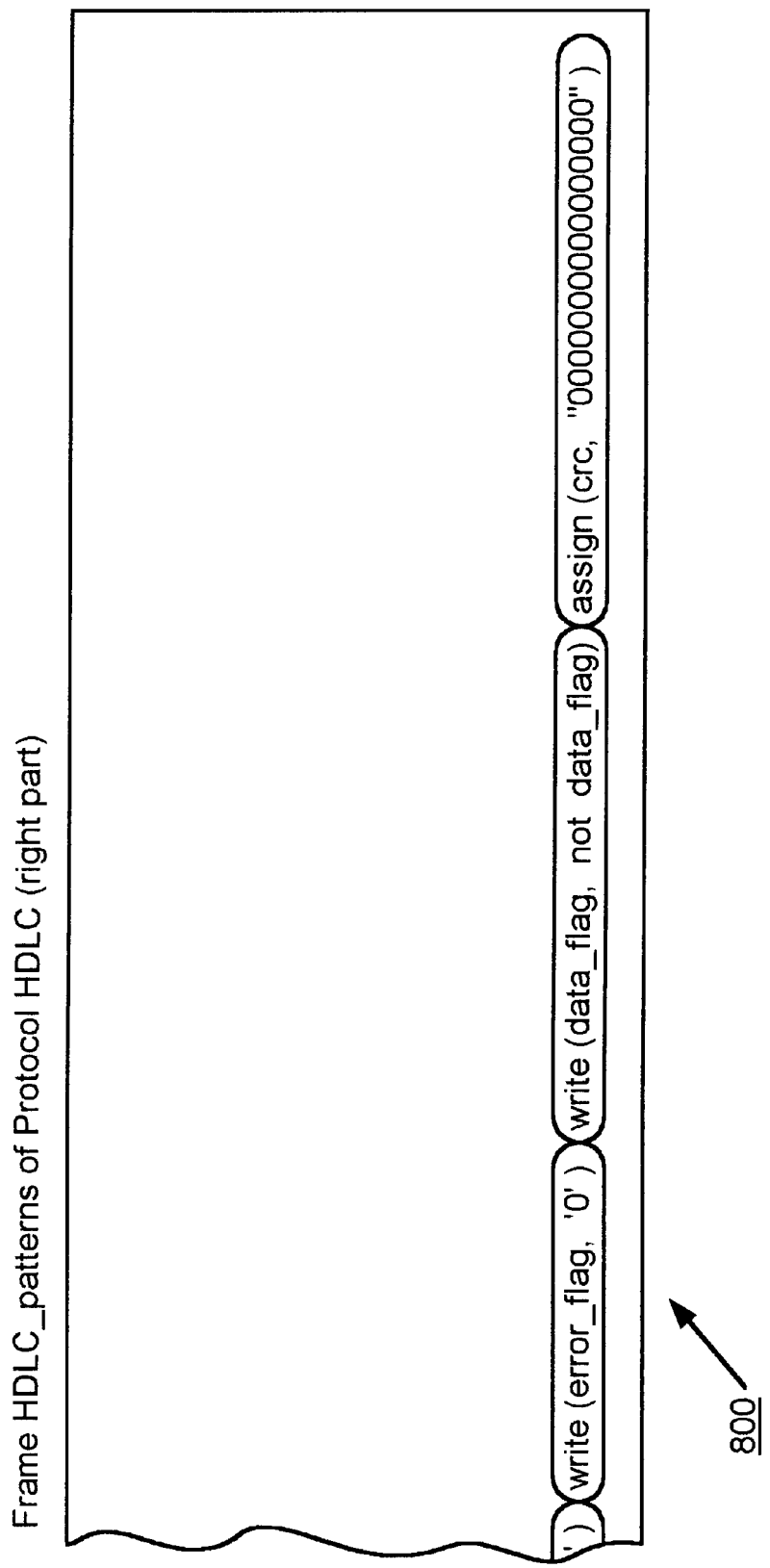

FIG. 7 shows a Frame Editor window 700 for a top frame "HDLC", which recognizes the pattern defined by the frame "HDLC_patterns". FIGS. 8(a) and 8(b) show a Frame Editor window 800 for a frame "HDLC_patterns", which recognizes any of five alternative patterns: 1) a zero followed by five ones and any other single input; 2) a zero, as long as the count variable equals "110000" and the error variable is false; 3) any single input, as long as the count variable is at least "100000"; 4) a zero or a one, as long as the count variable is at least "100000"; or 5) a zero, followed by six ones and another zero.

In FIG. 8, each of the patterns has an associated action, indicated by a bubble, that will be performed when its associated pattern is recognized. In a preferred embodiment, the actions are HDL procedures that have been written by the user, e.g., procedures written in VHDL or Verilog. An example of actions is included as Appendix E. The bubbles contain the name of the action. Here, recognition of the first pattern initiates the action "assign", which has a parameter "suppress_flag". Recognition of the second pattern initiates the action "write", which has two parameters. Recognition of the third pattern initiates the action "crc_calc", which has seven parameters. Recognition of the fourth pattern initiates either the action "a one" or "a_zero", depending on the pattern recognized. Recognition of the fifth pattern initiates three "write" actions and two "assign" actions in the order shown in the Figure.

In a preferred embodiment of the present invention, it is possible to navigate from the Frame Reference 704 of FIG. 7 to the Frame Definition 802 of FIG. 8 and from the Frame Definition 802 to all of the Frame References 704 in a protocol.

Figure 10:
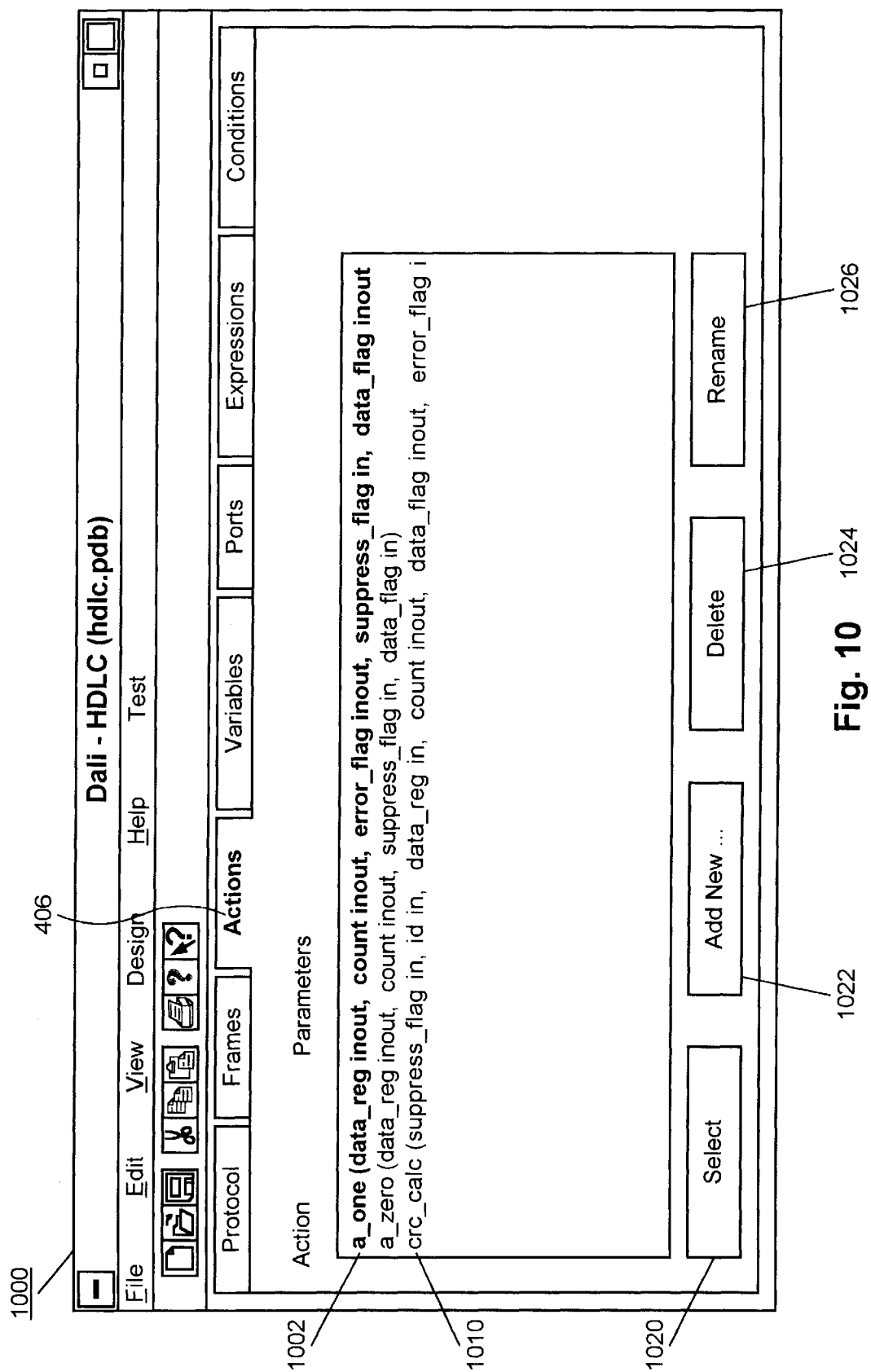
FIG. 10 is an example of an Action Browser display screen generated by the GUI.

FIG. 10 shows an Action Browser display screen 1000 generated by GUI software 110 when the "Actions" button 406 is pressed. An "action" is a separate procedure written in HDL or some other suitable language. As shown in FIG. 10, the Action Browser displays the direction (i.e., input, output, or both) and type of each of the parameters of each action procedure. As shown in FIG. 10, field 1002 contains the declarations of the actions shown in Fig, 8, along with an indication for each parameter. In a preferred embodiment, this information is used by the analysis routines to determine when a single value may be altered by two actions at the same time. The Action Browser lists all of the actions currently declared. With this window the user can quickly browse through his list of actions.

The Action Browser display screen includes four buttons: "Select" 1020, "Add New" 1022, "Delete" 1024, and "Rename" 1026. These buttons are used to select actions, to add a new action, to delete a selected action, and to rename an action. Double clicking on an action opens an Action Editor window for that action.

Figure 11:
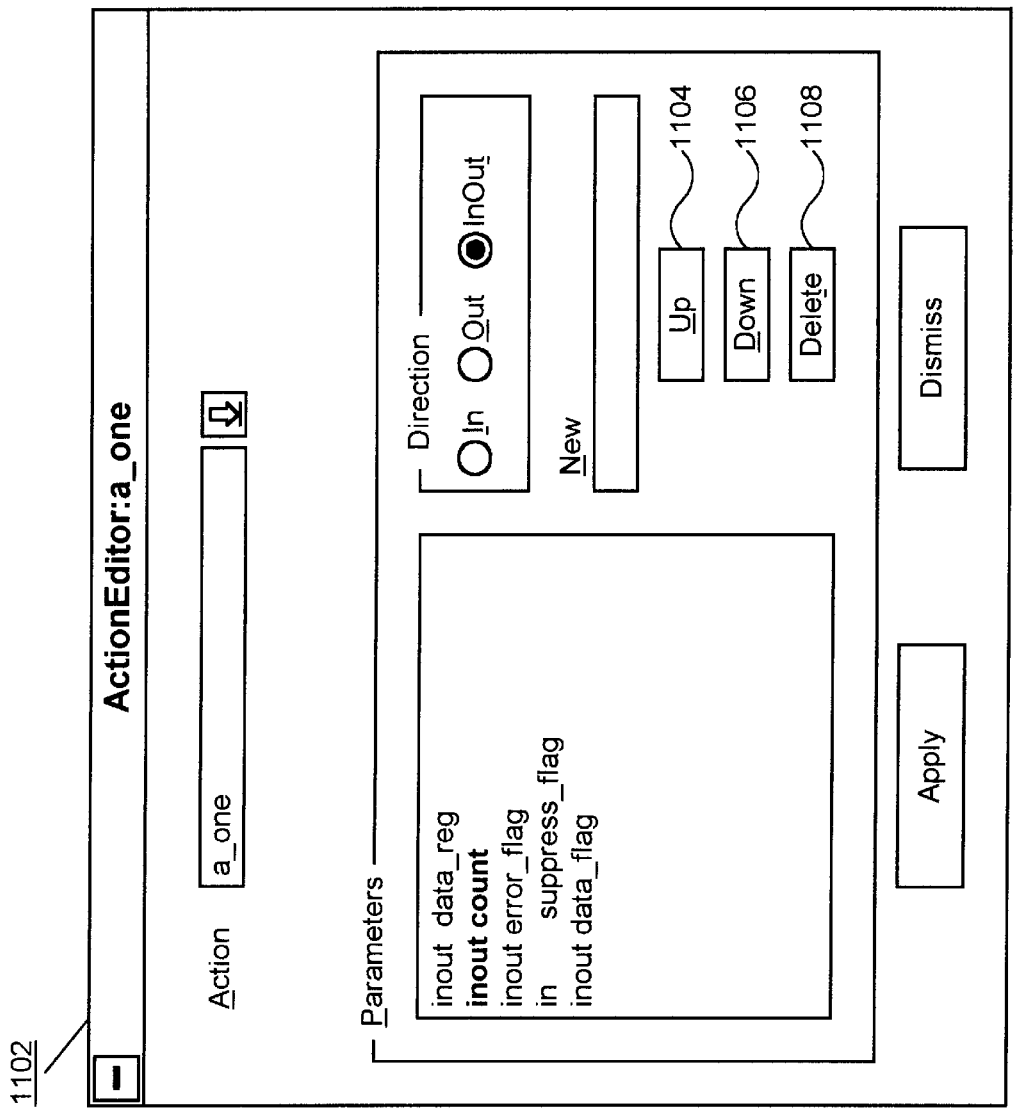
FIG. 11 is an example of an Action Editor window generated by the GUI.

FIG. 11 is an example of an Action Editor window 1102 generated by GUI software 110. Once entered, the action can be linked to a frame by pasting the action into the Frame Editor of FIGS. 6–8. The action is linked to the preceding portion of the frame in the Frame definition line, and the action executes when that frame accepts. Graphically, as shown in FIG. 8, the action appears as a bubble surrounding the action name, but can be collapsed to a small blip to allow the user to more easily see the frame hierarchy by clicking on "Collapse" in the View pull-down menu. As with frames, it is possible to navigate from an Action Reference 1010 to the Action Prototype 1110, and from the Action Prototype 1110 to all of the Action References 1010 in a protocol. FIG. 11 shows "Up", "Down", and "Delete" buttons 1104, 1106, and 1108. These buttons allow a user to change the order of parameters of the action (up and down) and to delete a parameter.

Figure 12:
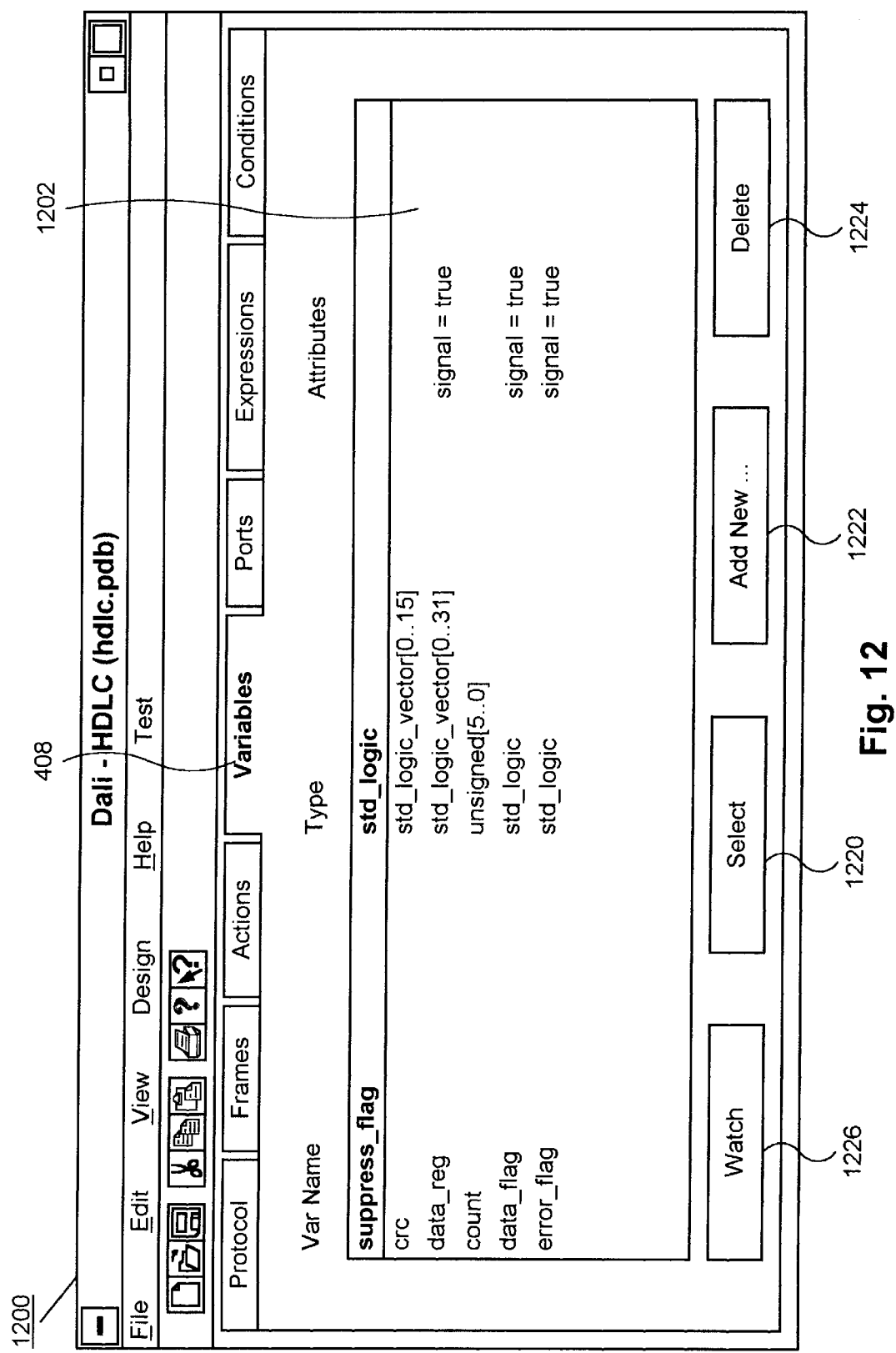
FIG. 12 is an example of a Variable Browser display screen generated by the GUI.

FIG. 12 is an example of a Variable Browser display screen 1200 generated by GUI software 110 the user clicks on "Variables" button 408. In the example, standard variable types (std_logic, std_logic_vector, and unsigned) are shown. These variables are available for use by every protocol. The Variable Browser display screen includes four buttons: "Select" 1220, "Add New" 1222, "Delete" 1224 and "Watch" 1226. These buttons allow the user to select variables, to add a new variable, to delete a selected variable, and to watch variable values during simulation. Double clicking on a variable name opens a Variable Editor window for that variable.

Figure 13:
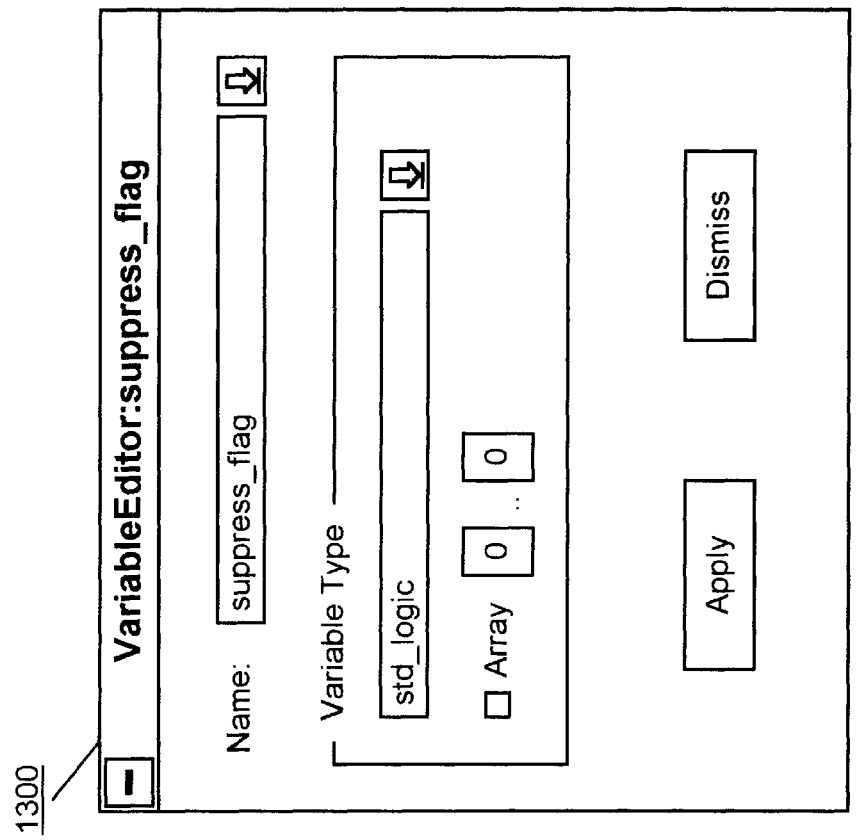
FIG. 13 is an example of a Variable Editor window generated by the GUI.

FIG. 13 is an example of a Variable Editor window 1300 generated by GUI software 110. The user can specify a variable's name, and type and, if the variable is an array, its size. In the present invention, variables of type "bit" or "bit vector" can be used as frame qualifiers. Variables of other types are restricted to being passed between action procedures to facilitate communication between procedures.

Figure 14:
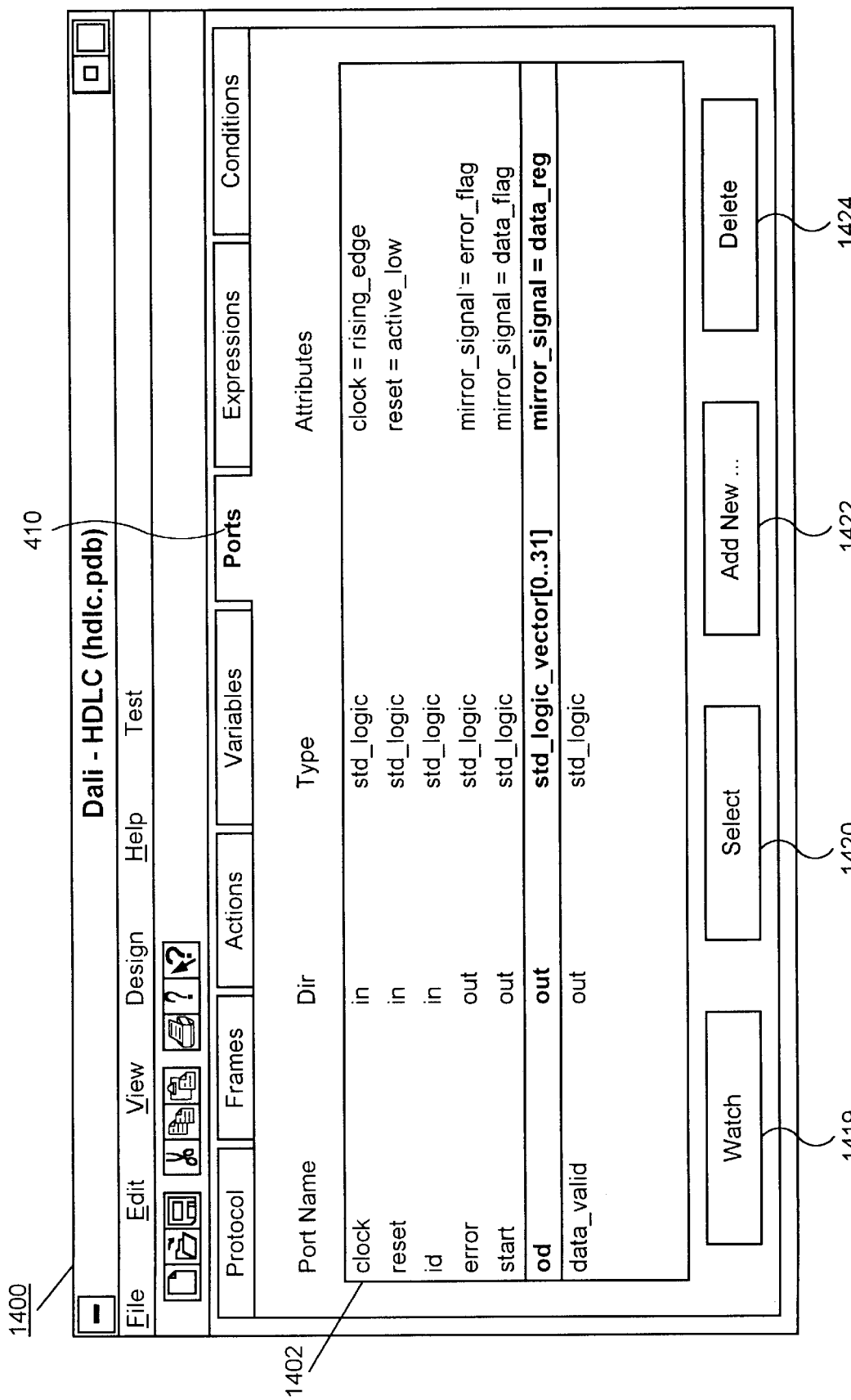
FIG. 14 is an example of a Port Browser display screen generated by the GUI.

FIG. 14 is ant example of a Port Browser display screen 1400 generated by GUI software 110 when the "Ports" button 410 is pressed. The window display; the name, type, direction (in, out, or inout), and attributes (e.g., clock, reset, mirror$_{13}$ signal) of each port. The Port Browser display screen includes four buttons: "Watch" 1419, "Select"1420, "Add New" 1422, and "Delete" 1424. These buttons are used to watch ports values (luring simulation, to select ports, to add a new port, and to delete a selected port. Double clicking on a port opens a Port Editor window for that port.

Figure 15:
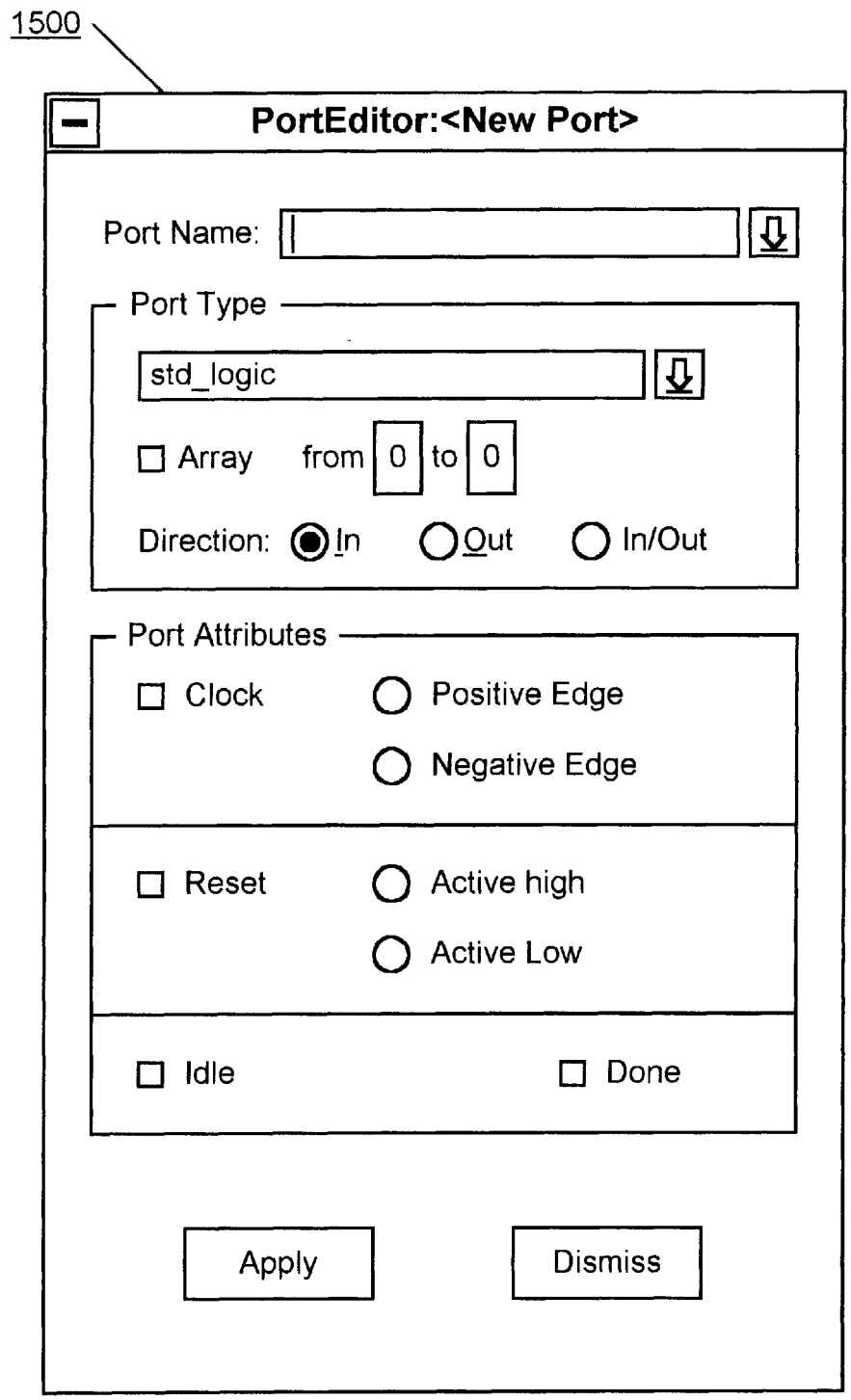
FIG. 15 is an example of a Port Editor window generated by the GUI.

FIG. 15 is an example of a Port Editor window 1500 generated by GUI software 110. The input ports of a protocol can be declared through Port Editor window 1500. For array types, the start and stop indices of the array must also be specified. Ports of type bit and bit-array (and other simple types) can be referenced in frame terminals and qualifiers. Ports can generally have the same types as variables (see variables, above). Non-simple types of ports, however, can only be accessed from actions and/or conditions. The Port Editor window is also used to designate certain special ports. Each design has a clock port and most will have a reset port. Some designs may also have ports that are used to idle the Finite State Machine (FSM), or to indicate when the FSM has fully recognized a protocol ("done"). The "done" port can be used to plug multiple protocols together.

The described embodiment of the present invention also includes an Expression Browser and an Expression Editor, along with a Condition Browser and a Condition Editor, which are displayed in accordance with the "Expressions" button 412 and the "Conditions" button 414. These screen displays are similar to the Variable display screen of FIGS. 12 and 13 and will not be described in detail, since the example HDLC protocol does not include any expressions or conditions. Expressions are used in terminal frames and qualifiers, and represent Boolean functions of ports and variables. The Expression Browser shows all expressions used in the protocol. The Condition Browser shows all conditions used in the design. The Editors let the user graphically input expressions and conditions that are used in frames of the specified protocol.

b. Effect of Entering a Protocol on the Frame Definition Data Base

FIG. 16 shows an example of a linked protocol stored in the frame definition data base 120 for protocol HDLC. Frame definition data base 120 preferably is a tree data structure. FIG. 16 includes a "frame-def" node 1602 for each of the frames of protocol HDLC in FIGS. 6–8. Appendix D shows a more complete format of the data base 120. Database 250 is similar, except that the frames nodes are not linked together and references (e.g., to parameter x) are not resolved.

FIG. 17 shows a list of preferred types of nodes in data base 120. As shown in FIG. 17, frame definition data base 120 preferably can have nodes of the following types: frame_null, frame—def, frame_seq, frame_alt, frame_simul, frame_rept0, frame_rept1, frame_reptn, frame_optional, frame_qualifies, frame_ref, frame_parameref, frame_term, frame_epsilon, frame_array, frame_exception, and frame_if. Not all of these types are shown in the example of FIG. 16. GUI software 110 converts input received rom the user into the tree of FIG. 16.

FIG. 16 shows a top frame node HIDLC 1620. The frame HDLC consists of a frame cont_search 1622, which consists of a sequence 1623 of two frames 1624 and 1626. Frame 1626 is a parameter that, here, refers to frame HDLC_pattern 1628. Frame HDLC_pattern 1628 consists of five alternate frames 1630, 1632, 1634, 1636, and 1638.

3. Protocol Check Using the GUI.

Figure 18:
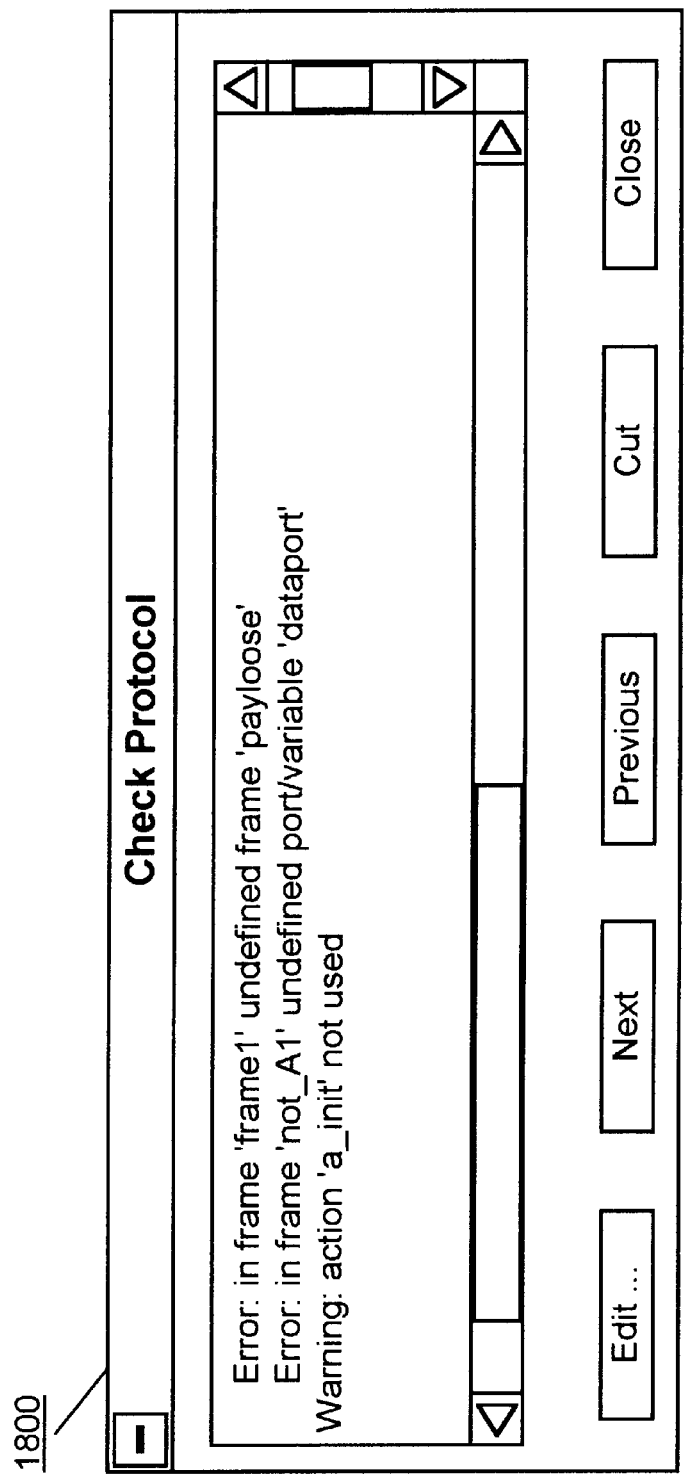
FIG. 18 shows a Check Protocol window generated by the GUI.

When a user selects the Check Protocol Menu item (FIG. 4, step 308 of FIG. 3), GUI software 110 initiates a conventional syntax check on the raw frame definition data base 250 in accordance with the syntax specified in Appendix A. In a preferred embodiment, GUI software 110 performs a syntax check every time new FML is read in and every time Check Protocol is selected from the menu. A syntax check is also performed before each synthesis and simulation. FIG. 18 shows a Check Protocol window 1800 generated by GUI software 110. The window display the results of the syntax check.

4. Synthesis Using the GUI

As discussed above, there are several different paths taken by GUI software 110 to generate HDL from frame definition data base 120. As indicated in FIG. 3, synthesis is initialized when the user selects "Synthesize" from the menu of FIG. 5.

Figure 19:
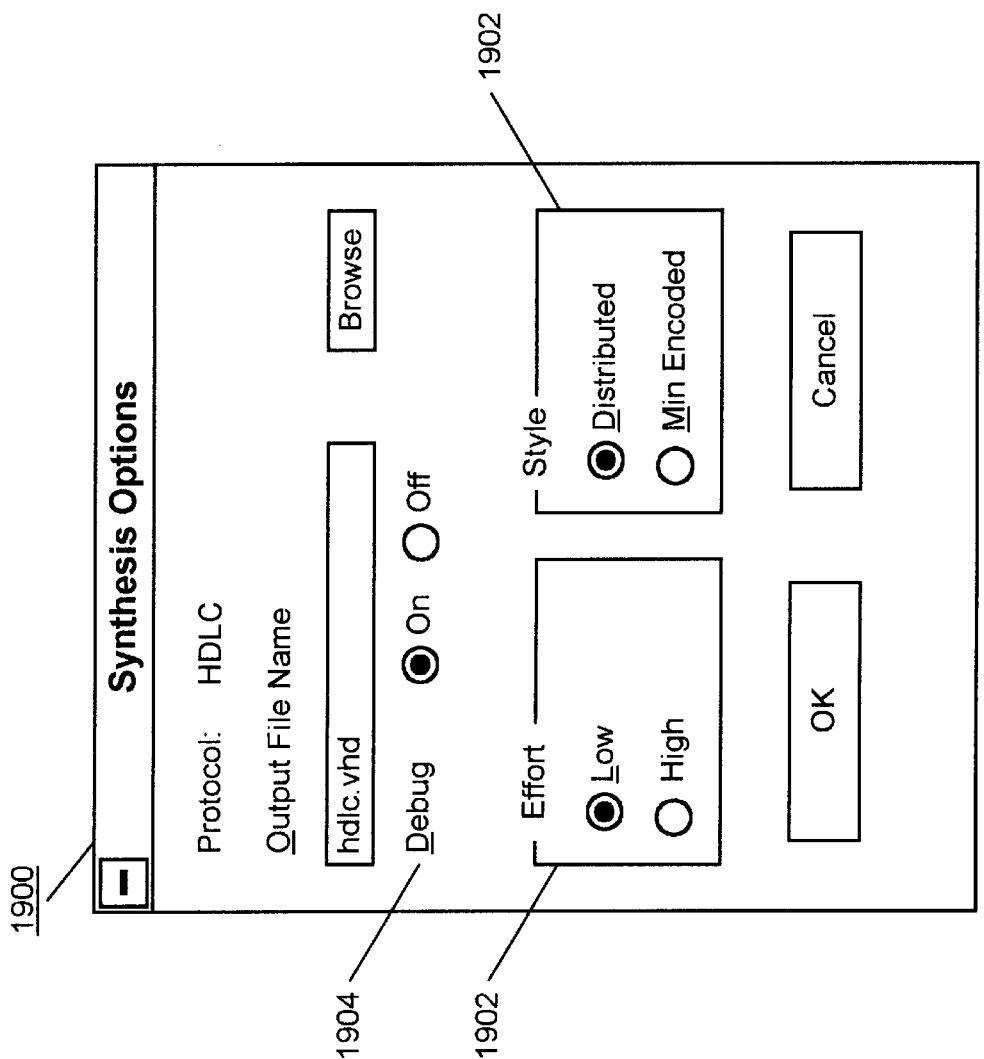
FIG. 19 shows a Synthesize window generated by the GUI.

FIG. 19 shows a synthesis window 1900 generated by GUI software 110. The parameters 1902 set by the user in this window determines a path taken by the synthesis procedure (performed by synthesis core 130 in conjunction with GUI software 110 and 130). A preferred embodiment defaults to effort:low; style: distributed. If the user (by way of GUI software 110) sets parameters 1902 to: effort: low; style: distributed, then software 110 and 130 cconverts frame definition data base 250 to virtual circuit 270 and converts virtual circuit 270 directly to HDL 160.

If the user sets parameters 1902 to: effort: high; style: distributed, then software 110 and 130 converts frame definition data base 250 to virtual circuit 270. Virtual circuit 270 is optimized by VC Optimization software 286 to yield optimized virtual circuit 270'. Optimized virtual circuit 270' is then converted to HDL 160.

If the user sets parameters 1902 to: style: min-encoded (effort is "don't care), then GUI software 110 converts frame definition data base 250 to virtual circuit 270, and converts virtual circuit 270 to a State Transition graph (STG) 292. State Transition graph (STG) 292 is then minimized by STG Min software 296 and converted back to a min-encoded virtual circuit 270". The min-encoded virtual circuit 270" is then converted to HDL 160. Each of these conversion paths will be discussed below in turn.

The window of FIG. 19 also allows a user to specify whether debug signals should be generated during synthesis. In a preferred embodiment, GUI software 110 only allows a "debug" flag 1904 to be set to "on" when the style parameters are set to the default values (i.e., when no STG will be generated). This restriction exists because, in the described embodiment, debug signals are not preserved during generation of STG. It also is possible for a user to set the style parameter to "distributed", and to set "debug" flag 1904 to "off". In this case, no debug signals are generated when GUI software 110 initially generates virtual circuit 270.

0.1 Virtual Circuit/State Transition Graph Transformations

The present invention can represent the protocol as either a virtual circuit (VC) or a conventional state transition graph (STG). The virtual circuit representation is used for static analysis and for maintaining the debug signals which are used in simulation. In addition, the virtual circuit is used for some optimization techniques. Some of these optimization techniques are described Andrew Seawright's Ph.D. dissertation, Grammar-Based Specification and Synthesis for Synchronous Digital Hardware Design, University of California Santa Barbara, June 1994, hereafter called "the thesis." The alternative state transition graph representation is used to further optimize the protocol once the user has determined that its behavior is correct. In a preferred embodiment, when the user selects Min-Encoded from the Synthesis options dialog in the GUI of FIG. 19, the VC is transformed to an STG for minimum state encoding. The present invention converts between a virtual circuit and a state transition graph (and vice versa) using the following methods.

0.1.1 Virtual Circuit Structure

Figure 20:
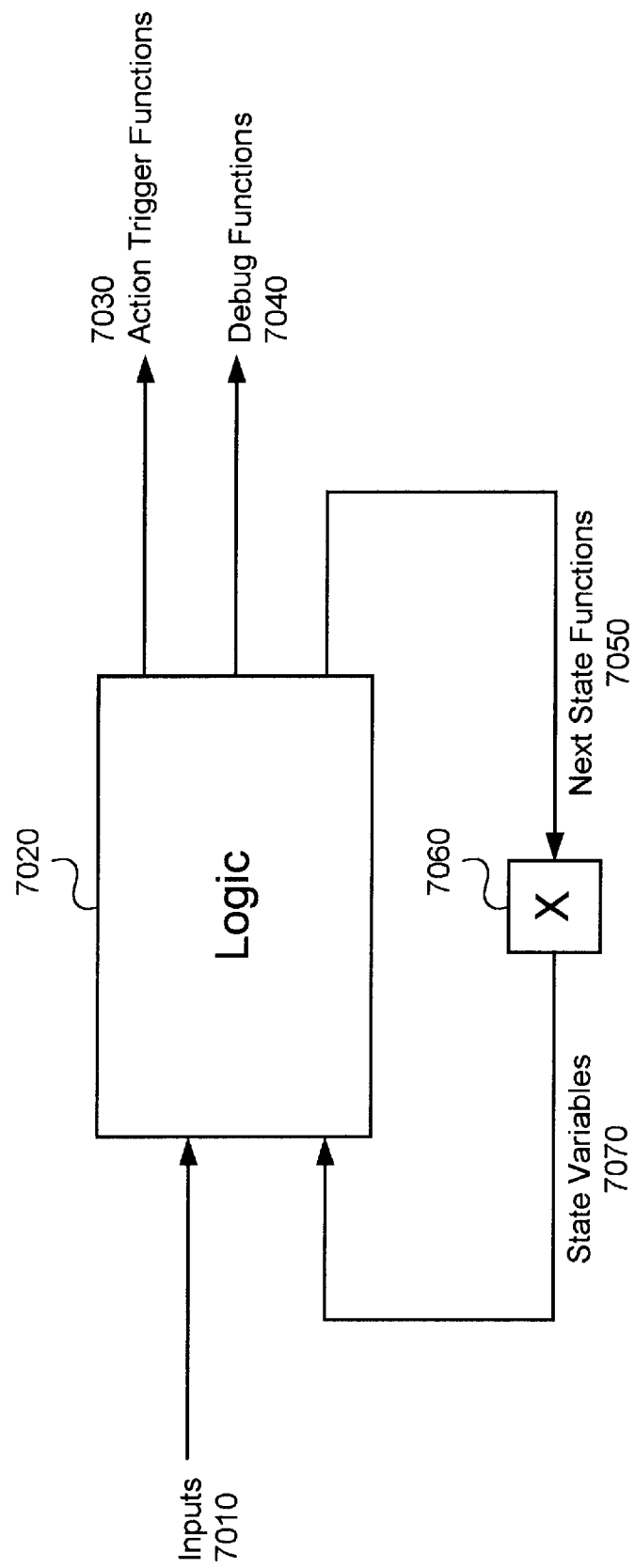
FIG. 20 is a block diagram of a virtual circuit.

A virtual circuit implements a Finite State Machine (FSM). FIG. 20g. 20 shows the overall structure of the virtual circuit. As with any FSM, the VC has inputs 7010, outputs (the action trigger functions 7030 and the debug functions 7040), state registers 7060, next state functions 7050, state variables 7070, and boolean logic 7020 to compute the outputs and next state functions. A virtual circuit is represented as a set of boolean functions which represent a sequential digital circuit. These boolean functions can be manipulated using standard boolean techniques.

Figure 21:
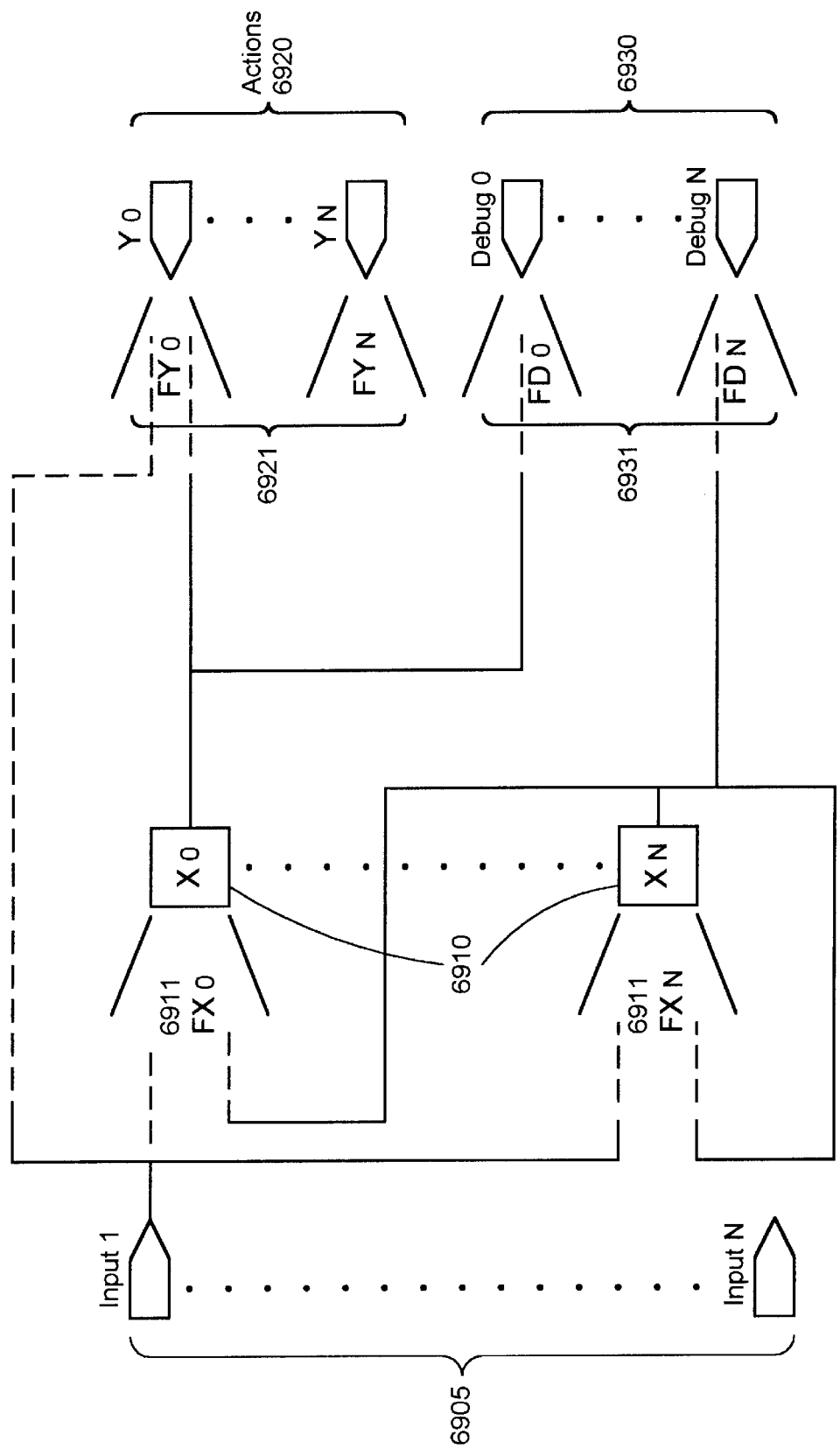
FIG. 21 shows the conceptual organization of a virtual circuit.

FIG. 21 shows the organization of the boolean logic in a virtual circuit in greater detail. The inputs to the virtual circuit 6905 are the ports, variables, and results of condition values in the protocol. There are two types of outputs from a virtual circuit. Virtual circuits always have action trigger outputs 6920. In addition, virtual circuits may have debug function outputs 6930. The debug outputs can be preserved through some optimizations, but not through others. For example, when the virtual circuit is transformed to a state transition graph, the debug outputs are lost. The debug outputs are useful for simulation back annotation. Specifically, each debug function indicates when a frame in the protocol is accepting. These debug outputs are later used to generate signals for the simulation interface.

The virtual circuit contains three types of functions. First, there are "next state" functions which are represented by "X" functions 6911. Each of these functions describes the next state of a state register 6910 in terms of the current state of the state registers and the current inputs. Each next state function is the input to a state register 6910 in the virtual circuit. Next state functions may be functions of the output of the state register they drive and may also receive as inputs the inputs of the virtual circuit. Next, there are action functions 6921, which indicate when actions are triggered. Action functions are also functions of state registers and the virtual circuit inputs. Finally, there are debug functions 6931 which are functions of the state registers. The action functions and the debug functions drive the action and debug outputs respectively. Finally, the virtual circuit also includes an initial state. The initial state indicates the current value of each state register at system start-up.

In a preferred embodiment, the boolean functions in a VC are represented using Binary Decision Diagrams (BDD's). A standard BDD package is used. One feature of BDD packages is the ability to compute the "range" of a set of boolean functions which is represented by one or more BDD's. The range of a set of points through a set of boolean functions is the full set of all points which can be represented by the set of boolean functions given those inputs. In addition, the "inverse image" of a set of boolean functions can be calculated. The inverse image of a set of boolean functions is the reverse of the image; the inverse image maps a set of points in the image of the original function to a set of points in the domain.

Figure 22:
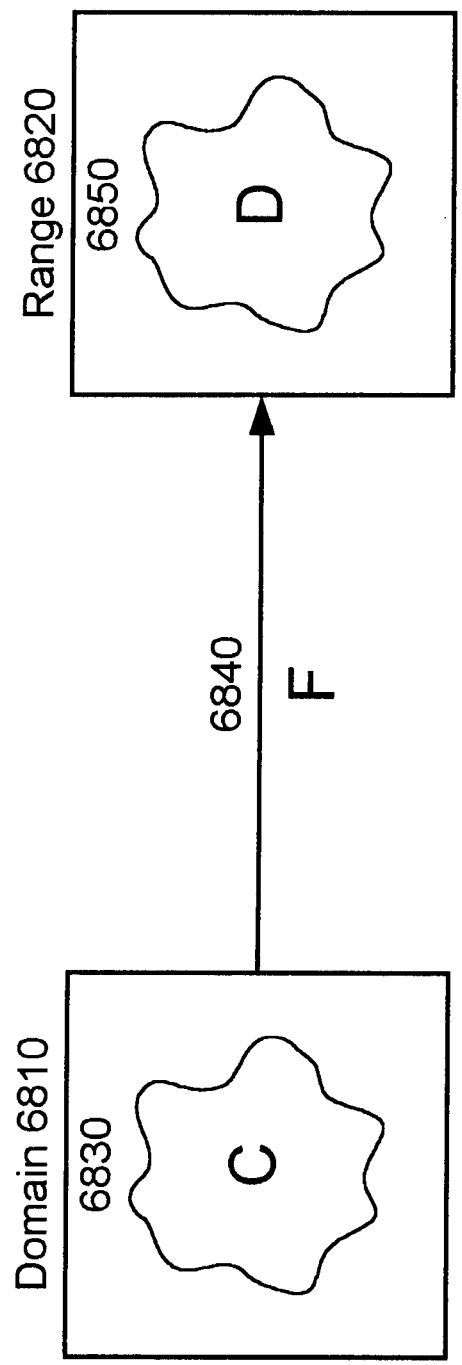
FIG. 22 shows a domain, a range, a function, and two sets of points, respectively, within the domain and the range.

FIG. 22 shows a domain 6810, a range 6820, a set of boolean functions F 6840, and two sets of points, C 6830 within domain 6810 and D 6850 within range 6820. D 6850 is the image of C 6830 through F 6840. Thus, D 6850 is the set of points which F can imply given the set of inputs represented by C 6830. Furthermore, C 6830 is the inverse image of D 6850 through F 6840. C 6830 and D 6850 can also be expressed as boolean functions which define the sets of points.

Images and inverse images of functions are described in "Implicit State Enumeration of Finite State Machines using BDD's" by H. Touati et. al. in Proceedings of 1990 ICCAD which is hereby incorporated by reference. This paper is based heavily upon the work presented in "Verification of Sequential Machines Based on Symbolic Execution" by O. Coudert, C. Berthet, and J. C. Madre in Proceedings of the workshop on automatic verification methods for finite state systems, Grenoble, France, 1989, which is hereby incorporated by reference.

The image and inverse image of the set of BDD's which represent a virtual circuit are used to compute the set of reachable states for the virtual circuit. Specifically, the set of reachable states, R(X) is computed by computing the image of the initial state through the next state functions, and then iteratively computing the image of the resulting function through the next state functions until the resulting function does not change. The image calculation is also used in converting between a virtual circuit and a STG.

0.1.2 Virtual Circuit to State Irantsition Graph

This section describes a method for converting a virtual circuit to a STG as done in element 290 of FIG. 2. To transform the virtual circuit into a state transition graph, the present invention puts the virtual circuit into its initial state and then iterates through all reachable states, using the image of the BDD's which represent the VC. For each reachable state, a corresponding state in the STG is created. The following sections detail a method for this procedure, and give a simple example.

0.1.2.1 Method

Figure 23:
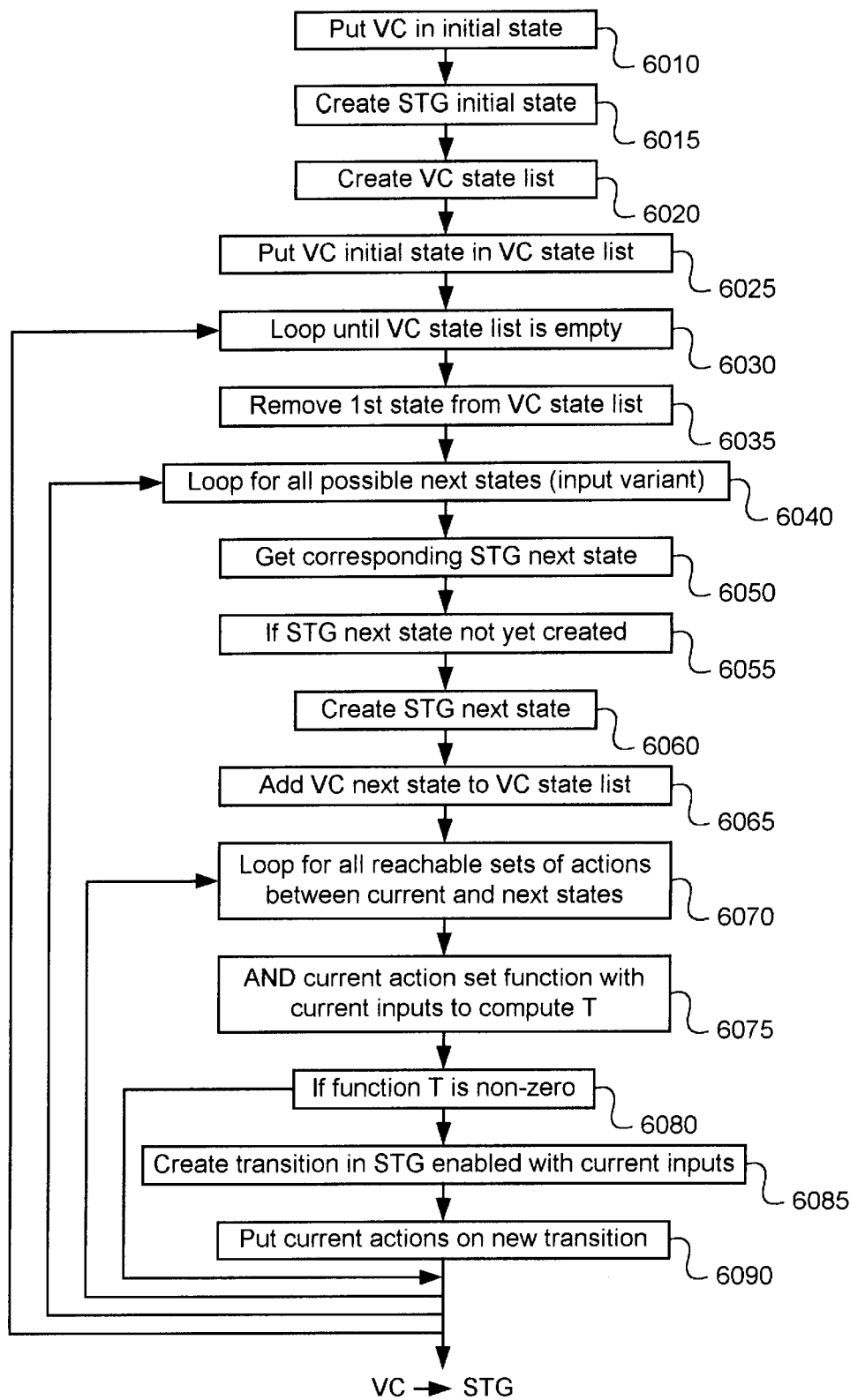
FIG. 23 is a flow chart showing a method for creating a state transition graph that corresponds to a given virtual circuit.

FIG. 23 is a flow chart showing a method for creating a state transition graph which corresponds to a given virtual circuit. The input to this procedure is a virtual circuit. Step 6010 puts the VC into its initial state and computes the image of the VC as described above. Step 6015 creates an initial state in the STG, and marks it as such. Step 6020 creates a linked list of VC states, called the VC state list. Step 6025 puts the initial VC state into the VC state list.

Loop 6030 loops until the VC state list is empty. Step 6035 removes the first VC state from the VC state list. This state is called the current VC state. Loop 6040 loops over all of the possible next states which are reachable from the current VC state. The possible next states are found using the image of the current VC state through the next state functions. The next states are all those states which are mapped from the current VC state in the image. Each of the possible next states is dependent on a specific set of values for the inputs. In each iteration of the loop, the next state being processed is called the VC next state. In addition, the boolean function which activates the next state is called the current transition function. Step 6050 checks the STG to see if it contains a next state which corresponds to the VC next state. This state is called the STG next state. If the STG next state does not yet exist, step 6055 proceeds to step 6060. Otherwise, the procedure skips to step 6070. Step 6060 creates the STG next state as necessary. Step 6065 adds the VC next state to the VC state list. Note that the each VC state is only added to the VC state list as the corresponding STG state is created. This ensures the transitions from each VC state are only processed once.

Loop 6070 loops over all of the reachable sets of actions between the current state and the next state given the current set of inputs. The reachable set of actions is found by computing the image of the current state through the action functions of the VC. As each set of actions is processed, it is called the current action set. Each current action set is represented a function. Step 6075 AND's the current action set function with the current inputs to compute another function, T. Step 6080 checks to see if T is non-zero. If T is zero, the loop continues. Otherwise, step 6085 creates a transition in the STG between the current and next states and enables the transition with the current inputs. Step 6090 adds the current actions to the new transition.

0.1.2.2 Example

Figure 24:
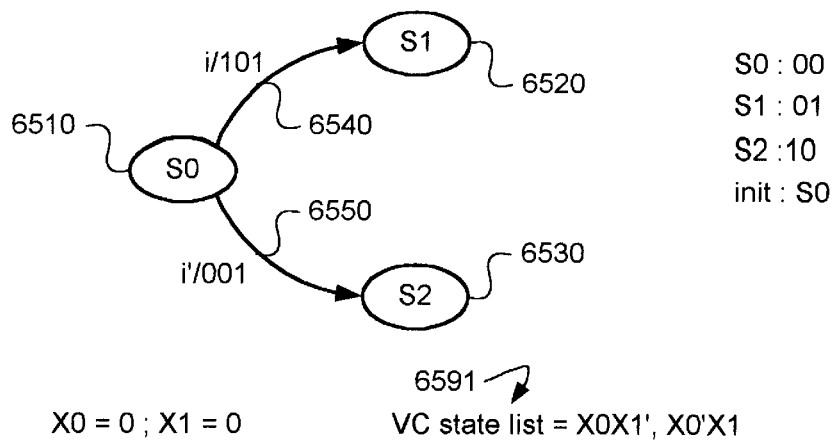
FIGS. 24–26 show a small example of building an state transition graph.
Figure 25:
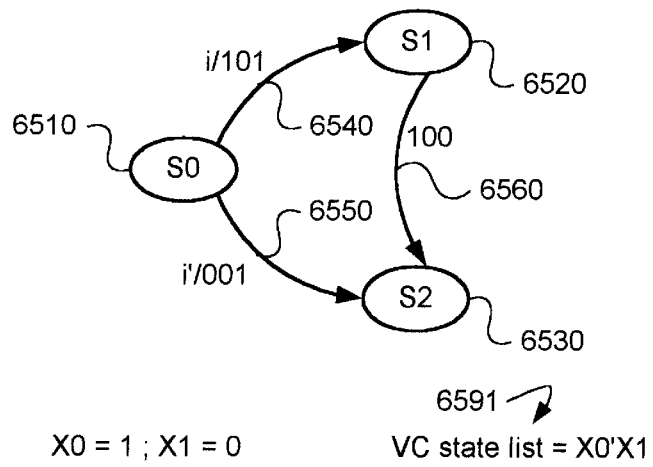
Figure 26:
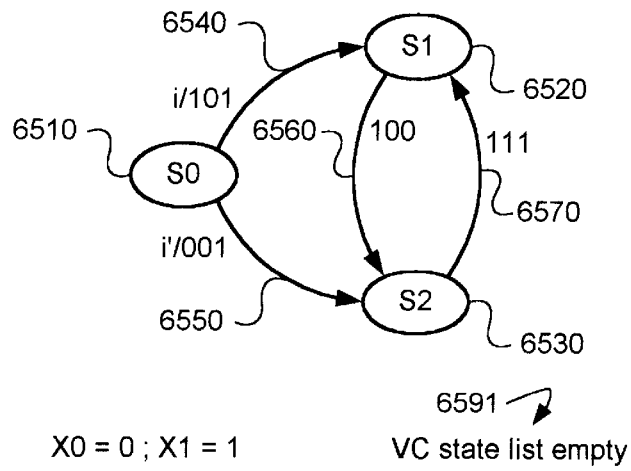
Figure 31:
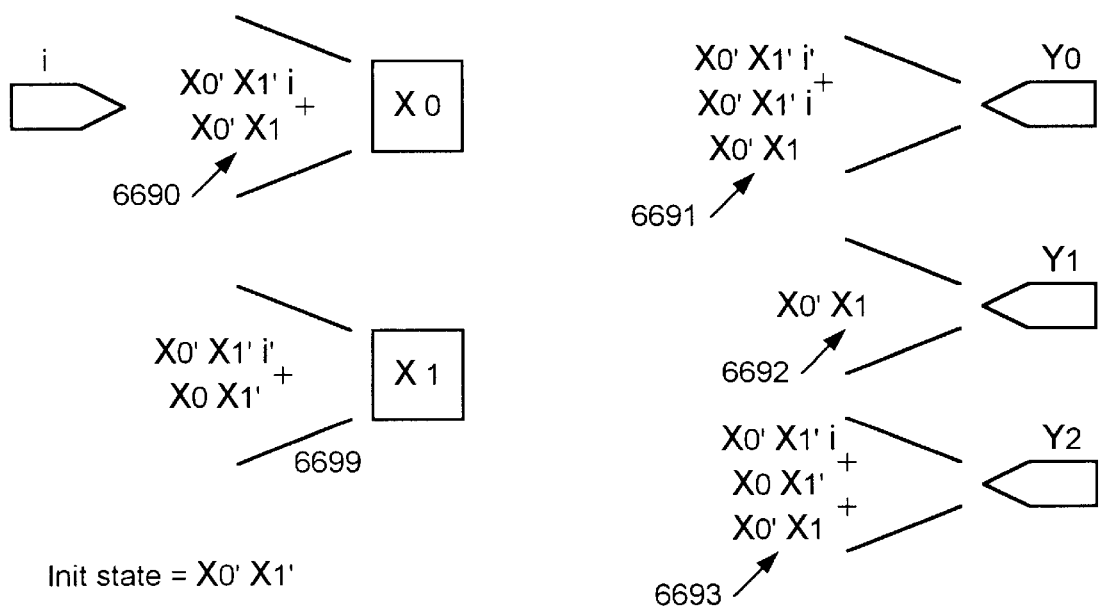

FIGS. 24 through 26 show a small example of building an STG from a VC using the above method. The original VC is shown in FIG. 31.

FIG. 24 shows the STG after the initial state of the VC and the transitions from this initial state have been processed. First, the VC is put into its initial state, X0'X1' 6699 in step 6010 of FIG. 23. Next, state S0 6510 of the STG is created in step 6015 and given the encoding "00". The VC state list 6591 is created in step 6020 and the initial VC state 6699 is put into the list in step 6025. Loop 6030 then begins by removing X0'X1'from the VC state list in step 6035. Loop 6040 loops over all of the possible input variant next states. In this case, the reachable states from X0'X1'are X0X1' and X0'X1', on current inputs i and i' respectively. The first state processed, state X0X1' does not yet have a corresponding STG state (step 6055), so S1 6520 is created in step 6060 and added to the VC state list 6591 in step 6065. Loop 6070 then iterates over all of the reachable sets of actions on the transition between S0 6510 and S1 6520. From state X0X1', actions Y0 and Y2 are reachable. Step 6075 determines that these actions are reachable given input i, which is the current input for this transition. Thus, STG transition 6540 is created and enabled with input i in step 6085, and the action vector 101 is put onto the transition 6540.

Likewise, in the next iteration of loop 6040, state S2 6530 and transition 6550 are created. At the end of this iteration of the loop, VC state list 6591 contains X0X1', X0'X1.

FIG. 25 shows the STG after state X0X1' has been removed from the VC state list in step 6035. Since the corresponding STG state, S1 6520 already exists in the STG, no new state is added. Transition 6560 between S1 6520 and S2 6530 is created when the transitions from state S1 6520 are created.

FIG. 26 shows the STG after state X0'X1 has been removed from the VC state list in step 6035. Since the corresponding STG state, S2 6530 already exists in the STG, no new state is added. Transition 6570 between S2 6530 and S1 6520 is created when the transitions from state S2 6530 are created. At this point, VC state list 6591 is empty, so the process of creating the STG is complete.

0.1.3 State lransition Graph to Virtual Circuit

This section describes a method for converting a STG to a VC as done in element 294 of FIG. 2. To transform an STG into a VC, the present invention traverses each state and transition in the STG. The state encoding for each state in the STG is used to set the values of the state registers in the virtual circuit. Each transition between states is ORed with the next state and action functions of the virtual circuit appropriately. The following sections describe this transformation in detail and give a simple example.

0.1.3.1 Method

Figure 27:
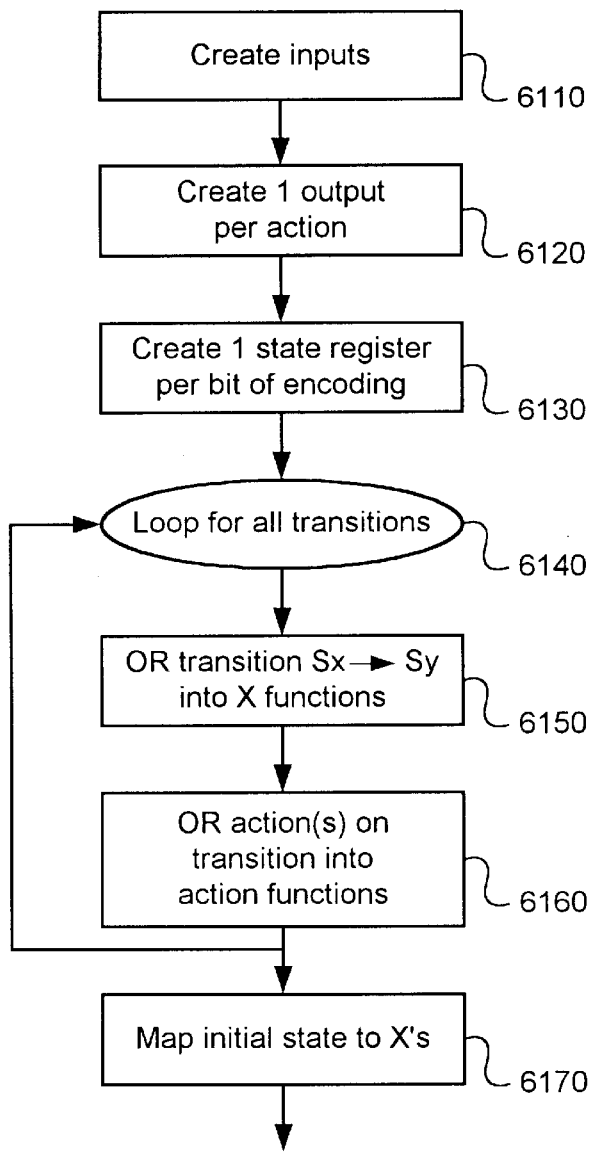
FIG. 27 is a flow chart showing a method for creating a virtual circuit that corresponds to a given state transition graph.

FIG. 27 is a flow chart showing a method for creating a virtual circuit which corresponds to a given state transition graph. The input to this procedure is a state transition graph. The states variables of the input STG must be fully encoded.

Step 6110 creates an input to the VC for each input of the STG. Step 6120 creates an output to the VC for each action triggered by the STG. Step 6130 creates a state register for each bit of the state encoding. Loop 6140 loops over all of the transitions in the STG. Each transition is called the current transition. The current transition goes between a source and a destination state, and includes a function of the inputs values for which it is enabled, and a bit vector which indicates which actions are enabled on that transition. Step 6150 computes the effect of the current transition on the next state functions of the VC. The boolean AND of the encoding for the source state and the input function which enables the current transition is a function. This function, F(X, i) is ORed into the next state function of each state register which has a value of 1 in the encoding of the destination state.

Step 6150 computes the effect of the current transition on the action functions of the VC. The boolean AND of the encoding for the source state and the input function which enables the current transition is a function. This function, F(X, i) is ORed into the action function of each action which is enabled by the current transition.

Once all of the transitions of the STG have been converted into next state and action functions in the VC, the initial state of the STG is mapped to an initial state for the VC by setting the state registers to have the values indicated by the state encoding for the initial state of the STG.

0.1.3.2 Example

Figure 28:
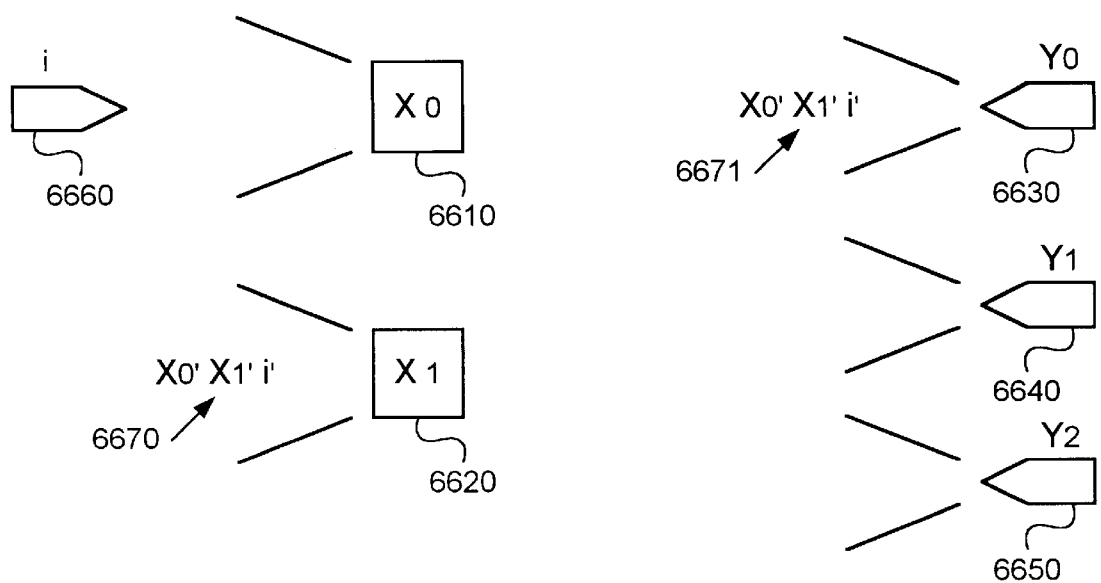
FIGS. 28–31 show an example of building a state transition graph from a virtual circuit.

FIGS. 28 through 31 show an example of creating a VC from an STG. The original STG is shown in FIG. 26. FIG. 28 shows the VC after the first STG transition has been processed. Step 6110 of FIG. 27 creates the inputs to the VC, in this case i 6660. Step 6120 creates one output per action, in this case Y0 6630, Y1 6640, and Y2 6650. Step 6130 creates 1 state register per bit of encoding in the STG, in this case X0 6610 and X1 6620.

Loop 6140 then begins processing the transitions. Transition 6550 from S0 6510 with encoding 00 to S2 6530 with encoding 10 on input i' and action vector 001 is processed first. This transition can be represented in terms of the VC state registers using the state encoding as X0'X1'i'→ X0X1'. Since X0 goes to 1 on this transition, the function X0'X1 'i' is ORed with the next state function for X0 in step 6150 as shown by factor 6670. In addition, the function X0'X1'i' is ORed with Y2 6630 in step 6160 as shown by factor 6671.

Figure 29:
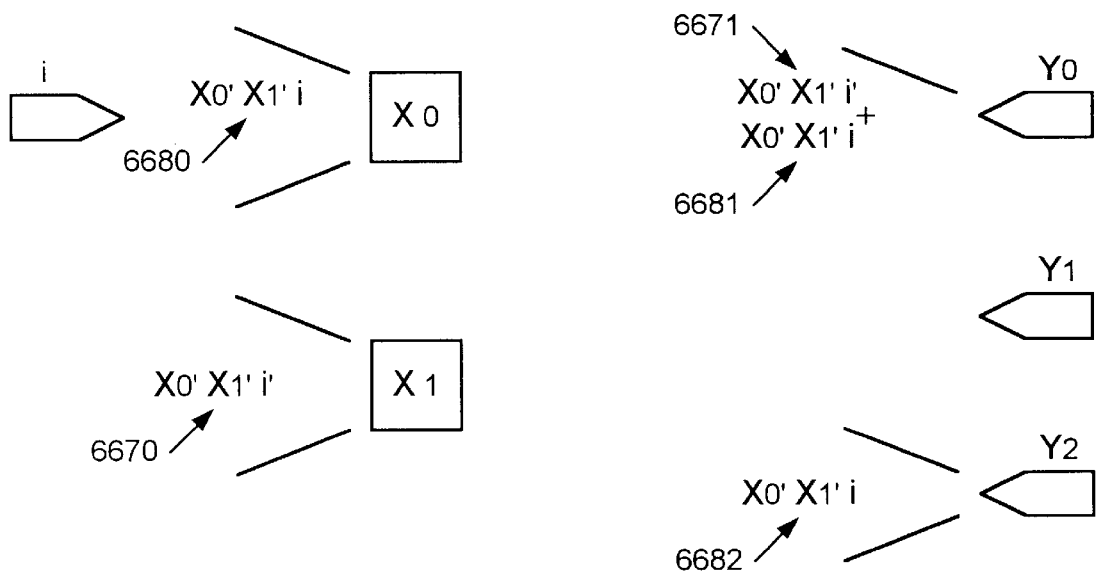
Figure 30:
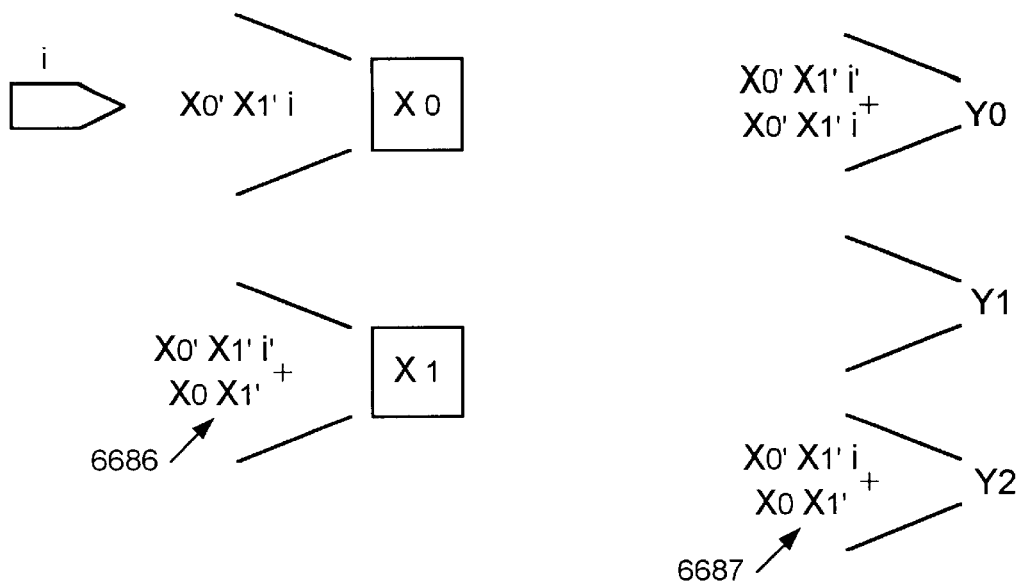

FIG. 29 shows the VC after transition 6540 has been processed. Factor 6680, factor 6681, and factor 6682 have been added to the next state and action functions. FIG. 30 shows the VC after transition 6560 has been processed. Factor 6686 and factor 6687 have been added to the next state and action functions. FIG. 31 shows the VC after transition 6570 has been processed. Factor 6690, factor 6691, factor 6692 and factor 6693 have been added to the next state and action functions. Finally, step 6170 of FIG. 27 maps the encoding of the initial state of the STG, SO to the state registers to get X0'X1' as the VC initial state 6699.

0.2 Code Generation

This section describes a method for HDL code generation that is performed in the present invention to convert a VC to HDL 160 of FIG. 2. Conceptually, a virtual circuit represents logic for a circuit. Thus, the virtual circuit can be written out using a Hardware Description Language (HDL). HDL 160 is used as input to simulators and synthesis tools. Thus, the present invention can generate output which can be used by other tools. The generated HDL 160 can be considered to have two principle portions: the logic for the FSM implied by the protocol, and the remainder of the code including the input and output ports, debug and other signals, the actions, and other structures required by the specific HDL used. The relationship between circuits and HDL is well known to those skilled in the art. "Introduction to HDL-Based Design Using VHDL" by Steve Carlson, 1990, available from Synopsys, Inc. in Mountain View, Calif. gives numerous examples of this relationship and is hereby incorporated by reference.

In a first embodiment of the present invention, the conversion from a VC to HDL is performed automatically as a part of the synthesis procedure. In a second embodiment of the present invention, the synthesis procedure generates a VC and stops. The user clicks a separate "Generate Code" entry in a pull-down menu to instruct GUI software 110 to complete the conversion from VC to HDL. In the second embodiment, the user is allowed to input the name of the VC from which he wishes to generate HDL code. The following sections describe how the HDL code is generated from the VC.

In a preferred embodiment, it is also possible to generate the FSM logic HDL directly from the STG. The user initiates this conversion using, e.g., a pull-down GUI menu. This may be advantageous if the HDL is used as input to a tool which specializes in STG optimization and as such needs a traditional STG for a starting point. Generating HDL from an STG is a well-known problem. Design Compiler, available from Synopsys, Inc. in Mountain View Calif. is one commercial product which includes this feature.

0.2.1 FSM Logic HDL

Figure 33:
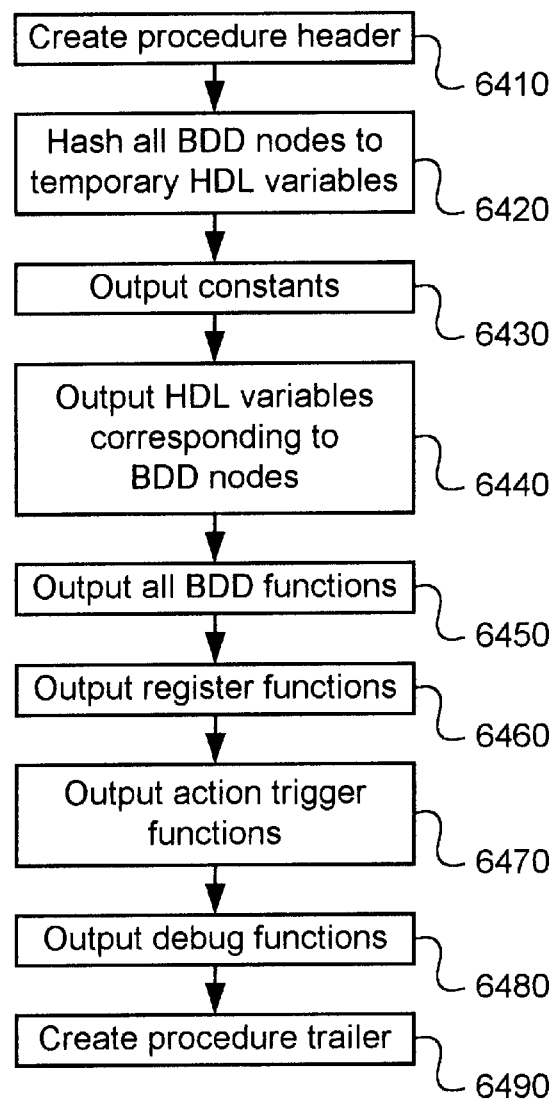
FIG. 33 is a flow chart showing how FSM logic HDL is generated.

FIG. 33 is a flow chart which shows how the FSM logic HDL is generated. In a preferred embodiment, the FSM logic HDL is generated by writing out logic for all of the BDD's which compose the action, next state, and debug functions of the VC. The BDD logic is written out by creating an HDL variable for each of the BDD nodes and then combining them into the appropriate functions. This method creates more efficient code than if each function were written out independently. The FSM logic HDL is put into a procedure and called from the wrapper HDL.

Step 6410 creates a procedure header for the FSM logic procedure using the appropriate syntax for the selected HDL. Step 6420 creates a hash table with all of the BDD nodes as keys, and temporary HDL variables as data. This allows the remaining routines to reuse the BDD nodes in multiple places in the HDL. This step loops over all of the BDD nodes and assigns an HDL variable to the BDD node and places the BDD node, HDL variable pair into the table. A hash table is used so that each variable is only created once. Step 6430 outputs the constants 0 and 1 to the new procedure using appropriate syntax for the chosen HDL. Step 6440 outputs all of the HDL variables created in step 6420. Step 6450 outputs all of the BDD functions which define the nodes found in step 6420. One function is written to define each of the nodes which is now represented as an HDL variable.

Step 6460 outputs the next state functions in terms of the variables which were created in step 6420. Because the variables from step 6420 include all of the variables from all of the BDD's in the entire VC, a subset of them will define the next state functions. Each variable is one bit wide. Therefore, the next state functions can be written as the concatenation of some of the variables. Note that this also holds true for the action trigger and debug functions. Step 6470 outputs the action trigger functions in terms of the variables which were created in step 6420. Step 6480 outputs the debug functions in terms of the variables which were created in step 6420. Step 6490 creates the trailer for the procedure using appropriate syntax for the chosen HDL.

0.2.2 Wrapper HDL

Figure 32:
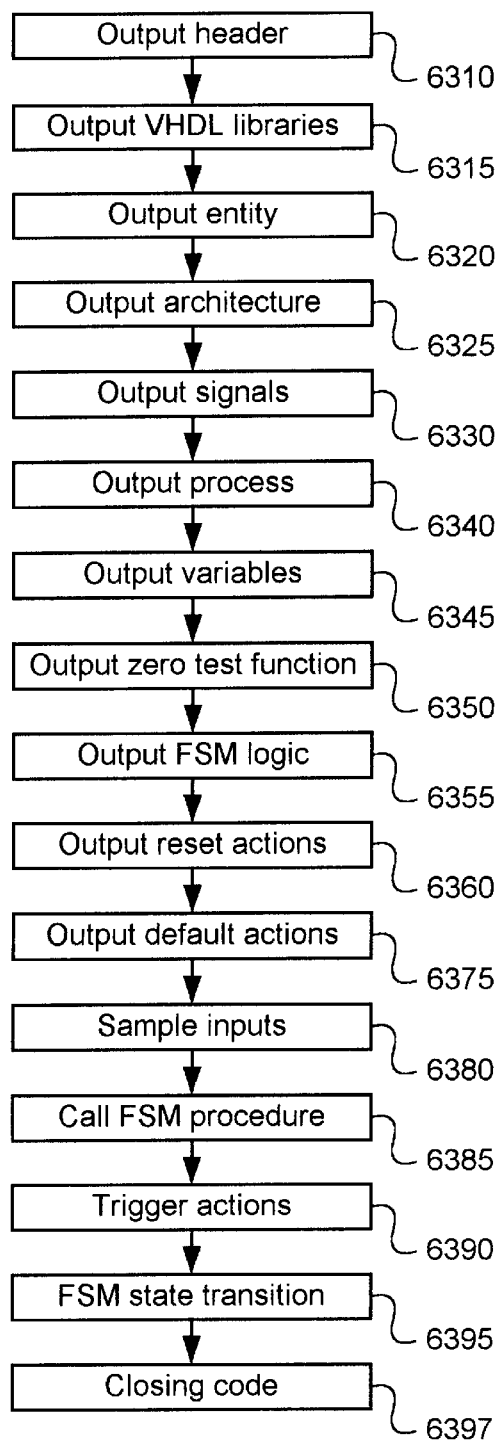
FIG. 32 is a flow chart showing how wrapper HDL is generated.

The wrapper HDL is all of the code which surrounds the FSM logic. This code will call the procedure which defines the FSM logic. FIG. 32 is a flow chart which shows how the wrapper HDL is generated. FIG. 32 shows how VHDL code is generated for a VC. It will be apparent to one skilled in the art that some steps are specific to the VHDL language; these steps can be replaced with steps appropriate for an alternate HDL. Specifically, step 6315, step 6320, step 6325 include VHDL specific structures. In addition, step 6340 refers to a VHDL process, which is simply a structure which implies sequential execution of steps. As all HDL's must include syntax for specifying sequential versus simultaneous execution, it will be apparent to one skilled in the art that this step can be modified for another HDL.

Step 6310 outputs any header information required by the chosen HDL. Step 6315 outputs library use statements. Step 6320 outputs the VHDL entity, including the input and output ports of the design. Step 6325 outputs the VHDL architecture. Step 6330 outputs the protocol variables which are attributed as signals. Step 6340 outputs a process statement Step 6345 outputs the variables that are used in the protocol. Both the internally generated protocol variables and the user defined variables are written out. Step 6350 outputs a zero test function which simply tests a given number to see if it is zero, and returns a boolean 1 if the input number is 0, or a boolean 0 otherwise. Step 6355 outputs the procedure which defines the FSM logic. The construction of this procedure is shown in FIG. 33 and described above. Step 6360 outputs the clock and reset logic.

Step 6365 outputs any reset actions defined in the protocol. Step 6375 outputs any default actions defined in the protocol. Step 6380 samples the inputs. All of the inputs are read into a single variable which contains enough bits to concatenate all of the input bits. Step 6385 calls the FSM procedure which was defined above. Step 6390 triggers the appropriate actions based on the values of the action triggers which were set by the FSM procedure. Step 6395 outputs the FSM state transition. This step sets the value of the current state to be that of the next state. Step 6397 outputs closing code. This code may include closing statements for the clock logic, the process and the architecture, or other structures depending on the syntax of the specific HDL.

0.2.3 Example HDL

Sample HDL output, using the VHDL language is shown in Appendix L. The FSM logic is shown in the procedure pc_fsm_logic.

Appendix F shows an example of original virtual circuit 270. Appendix G shows an example of optimized virtual circuit 270'. Appendix H shows an example of state transition graph 292. Appendix I shows an example of a min-encoded state transition graph. Appendix J shows an example of min-encoded virtual circuit 270". Appendix M shows an example of HDL 160.

5. Analysis Using the GUI

Figure 34:
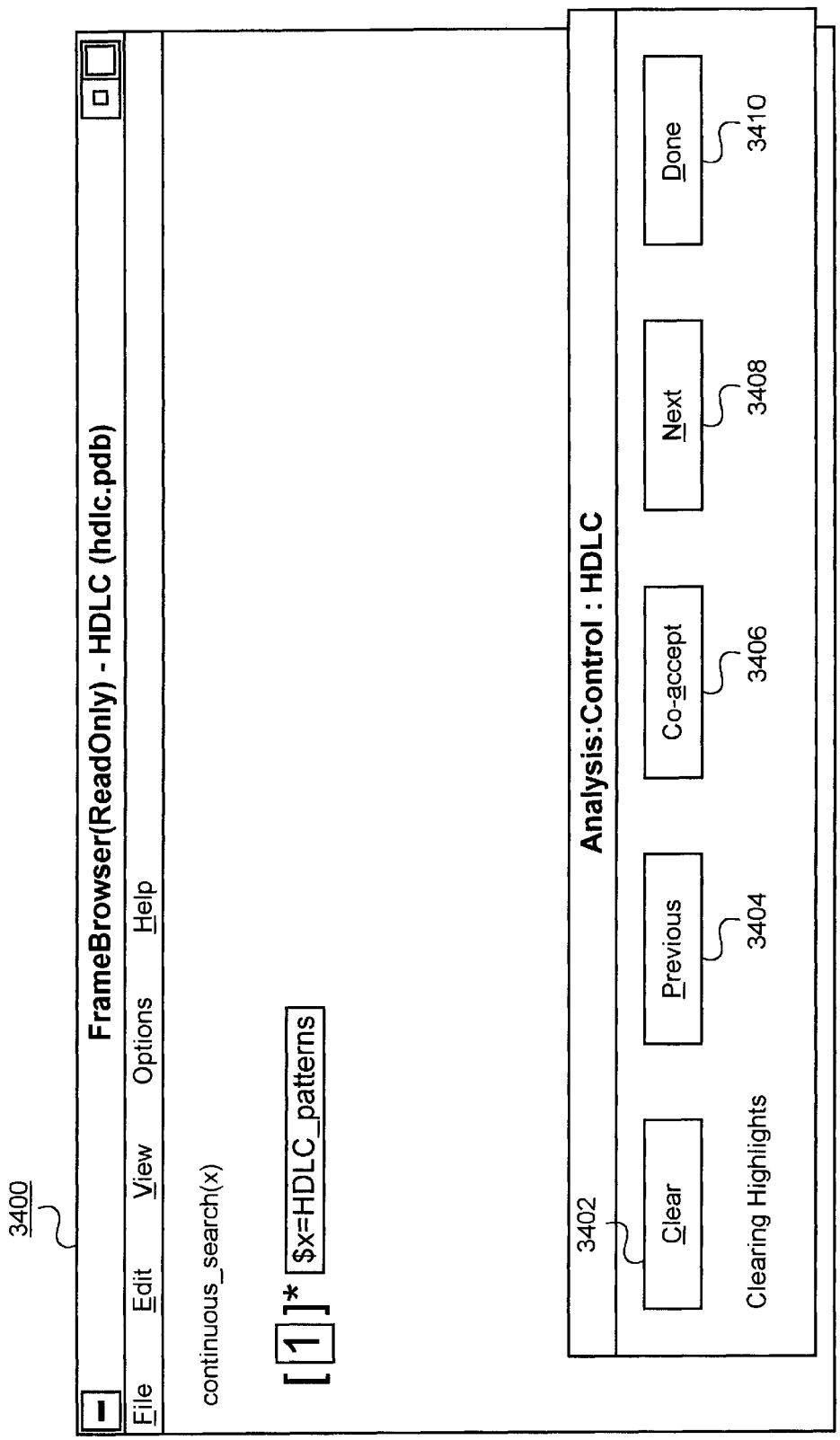
FIG. 34 shows an Analysis Control window generated by the GUI.

FIG. 34 shows an example of an Analysis Control window 3400 generated by GUI software 110. This window allows the user to indicate analysis operations to be performed on virtual circuit 270. In an alternate embodiment, another window (not shown) allows the user to specify one of several virtual circuits stored on a disk or in memory.

As shown in FIG. 34, the Analysis Control window 3400 includes five buttons: a "Clear" button 3402, a "Previous" button 3404, a "Coaccept" button 3406, a "Next" button 3408, and an "End" button 3410. Clicking on "Clear" button 3402 causes the GUI software 110 and VC analysis software 272 to return the analysis to a start state. Clicking on "Done" button 3410 ends the analysis. The actions performed by GUI software 110 and VC analysis software 272 when buttons 3404, 3406, and 3408 are clicked as discussed below.

0.3 Virtual Circuit Analysis

This section describes virtual circuit analysis as done in element 282 of FIG. 2. As seen in FIG. 34, the user can select from a number of analysis options in the GUI. These options include "Clear", "Previous", "Co-accept", "Next", and "Done". The underlying methods for analysis will be described in this section. Some portions of analysis are also described more thoroughly in the thesis. In particular, the thesis describes how to compute the reachable states, R(X), of the virtual circuit. (The virtual circuit is called the Intermediate Machine Representation (IMR) in the thesis.) Briefly, R(X) is computed by putting the VC into its start state and iterating through all of the next states until no new states are found. In a preferred embodiment, this calculation is performed iteratively using the image calculation of the BDD functions which define the virtual circuit In addition, the paper "A Unified Framework for the Formal Verification of Sequential Circuits" by O. Coudert and J. C. Madre in Proceedings of 1990 ICCAD further describes static analysis techniques and is hereby incorporated by reference.

One aspect of the present invention allows the user to select a portion of the protocol which corresponds to one or more possible states using the GUI and then perform analysis using the selected portion of the protocol as a starting point. As described above, the user can select a portion of the protocol using conventional "point and click" methods. The GUI software 110 will pass this selected portion of the protocol to the analysis routines. This section also describes the relationship between the GUI software 110 and the underlying analysis routines.

0.3.0.1 Method

Figure 35:
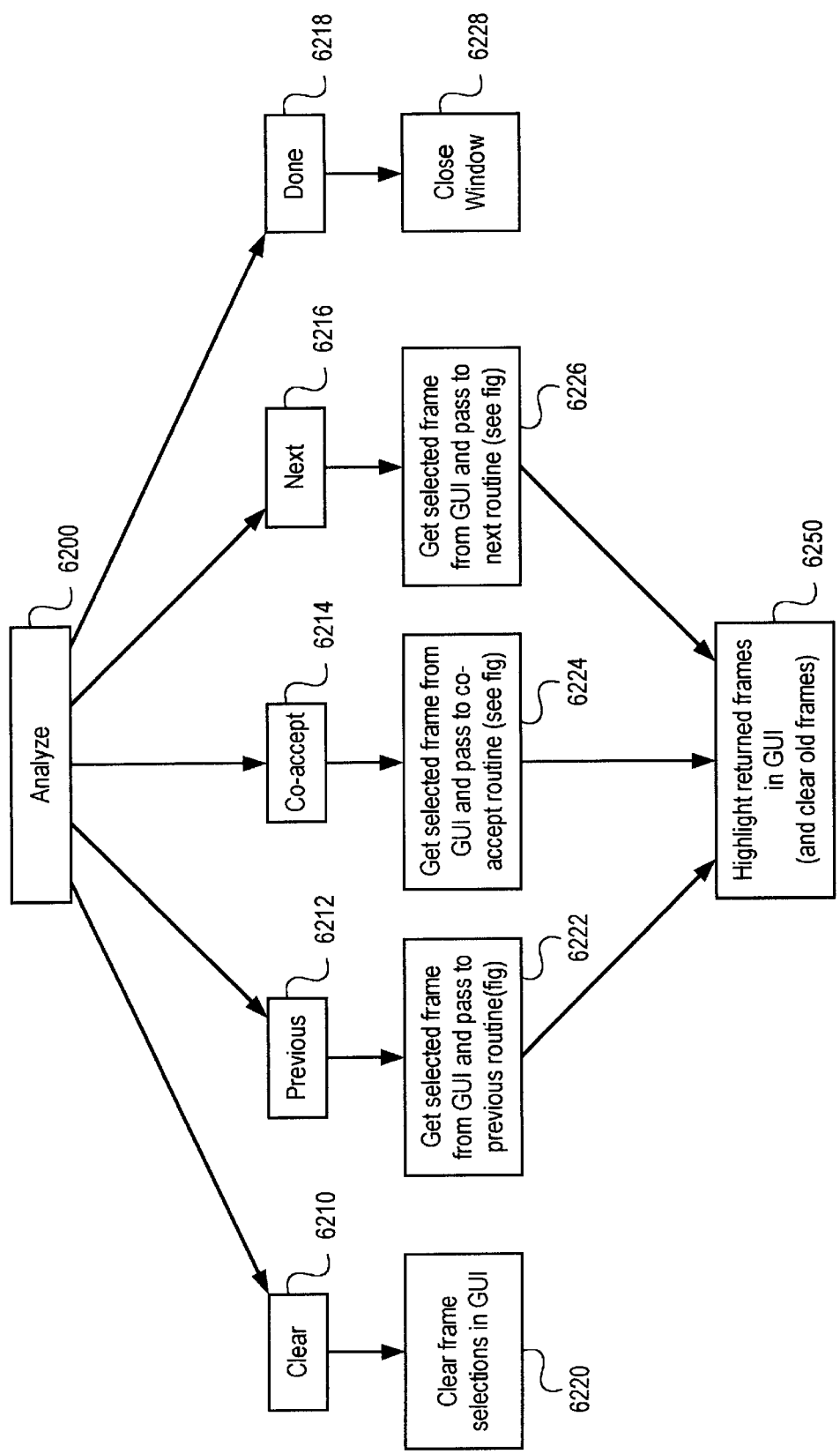
FIGS. 35–38 are flow charts showing a relationship between the GUI and the analysis routines supported by the present invention.

FIG. 35 is a flow chart showing the relationship between the GUI and the analysis routines in accordance with the present invention. Element 6200 indicates that each of the steps in this flow chart are reached from the analysis window. Step 6210 is reached when the user clicks on the Clear button. Step 6220 is then invoked to clear all selections in the GUI. Step 6218 is reached when the user clicks on the Done button. Step 6218 is then invoked to close the analysis window.

Previous

Step 6212 is reached when the user clicks on the Previous button. Step 6222 is then invoked to find all of the previous protocol portions from which the currently selected protocol portion can be reached. If more than one discrete portion of the protocol is selected in the GUI, and error message is posted. Otherwise, the debug function for the currently selected protocol portion is passed to the previous protocol portion routine.

Figure 36:
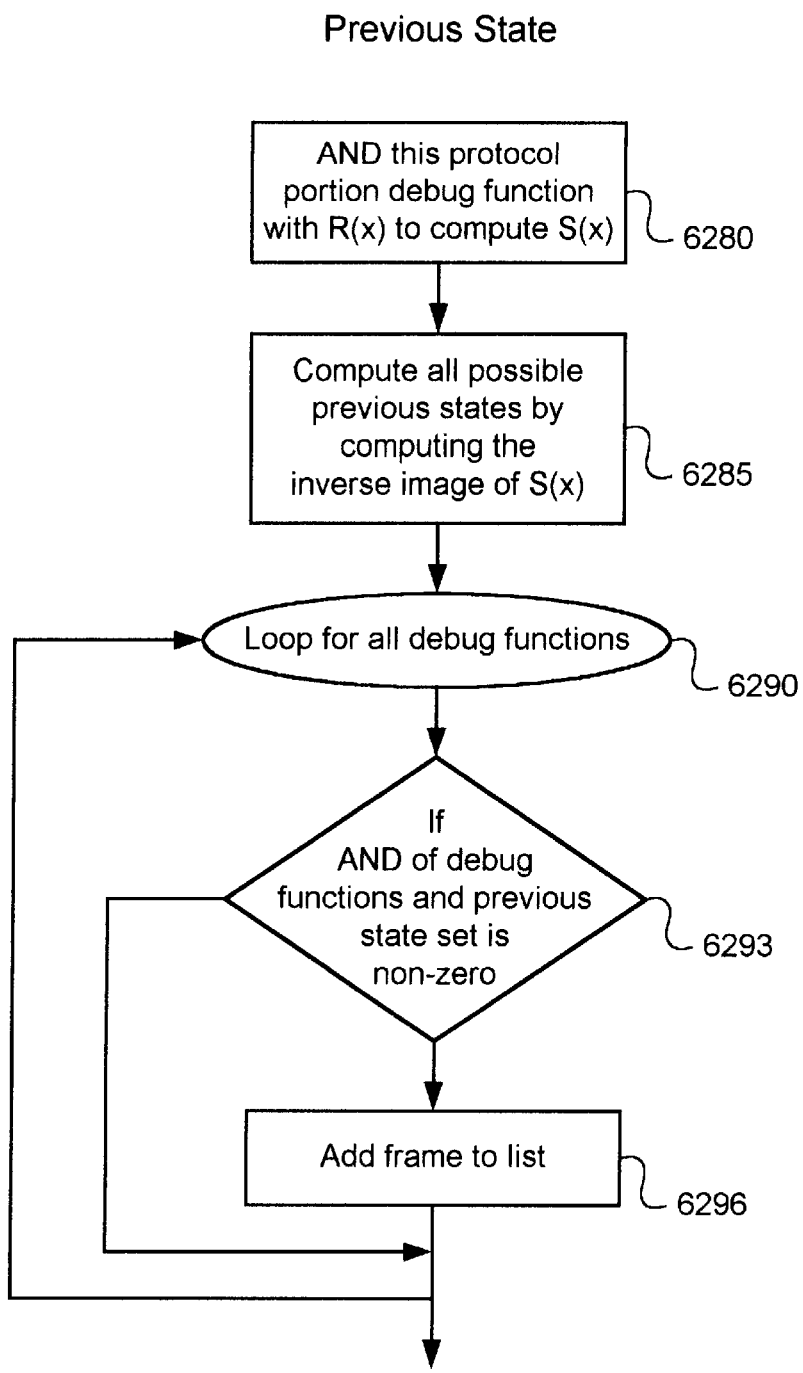

FIG. 36 is a flow chart which shows steps for computing all possible previous protocol portions for a given protocol portion. Step 6280 computes the AND of the currently selected protocol portions'debug function with the set of reachable states. The resulting function is called S(X). Step 6285 computes all of the possible previous protocol portions by computing the inverse image of S(X). Loop 6290 loops over all of the debug functions in the VC. Step 6293 checks to see if the AND of the debug function and S(X) from step 6280, is non-zero. If so, step 6296 adds the frame corresponding to the current debug function to a list to be returned to the GUI software 110. Otherwise, loop 6290 continues. Once the list of previous frames is returned to the GUI software 110, they are highlighted in step 6250 of FIG. 35.

Co-accepting

Step 6214 of Fi.g 62(*a*) is reached when the user clicks on the Co-accept button. Step 6224 is then invoked to find all of the protocol portions which could be accepting concurrently with the currently selected protocol portion. If more than one protocol portion is selected in the GUI, and error message is posted. Otherwise, the debug function for the currently selected protocol portion is passed to the co-accept protocol portion routine.

Figure 37:
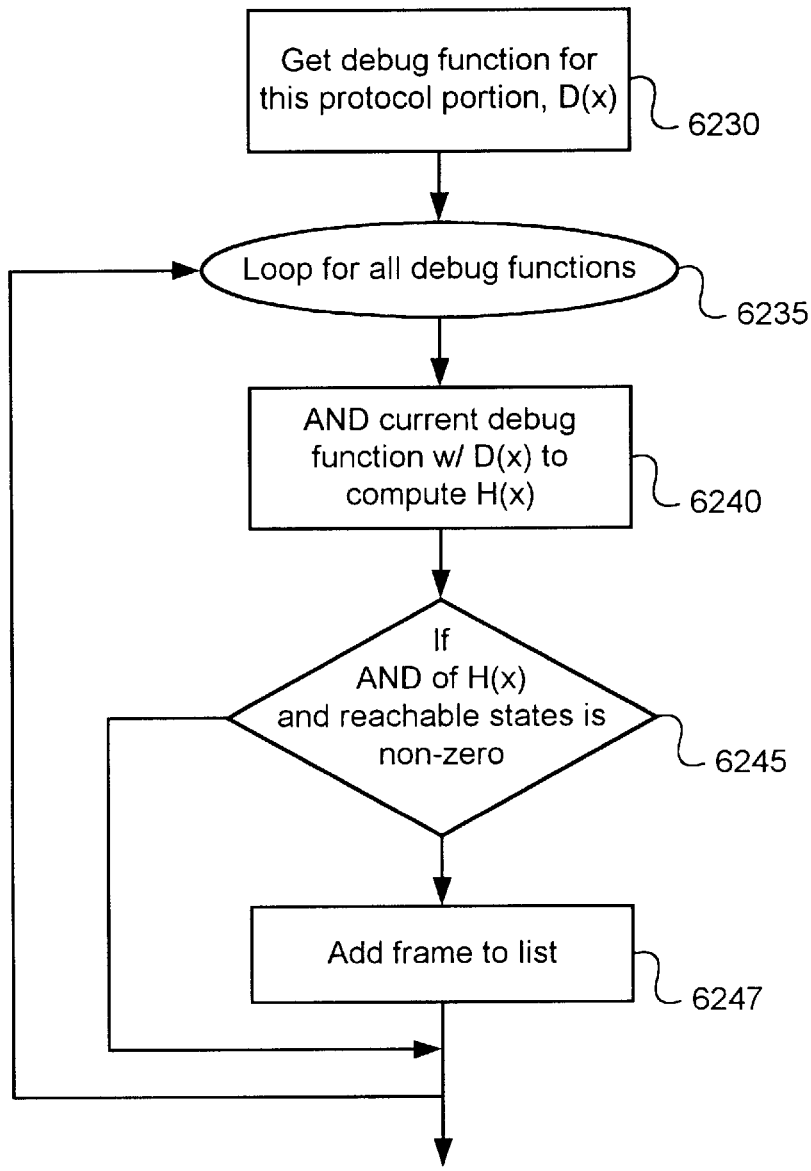

FIG. 37 is a flow chart which shows steps for computing all possible co-accepting protocol portions for a given protocol portion. Step 6230 gets the debug function for the currently selected protocol portion. The debug function will be called D(X). Loop 6235 loops over all of the debug functions in the VC. Step 6240 computes the AND of the current debug function and D(X). The resulting function is called H(X). Step 6245 checks to see if the AND of H(X) and the reachable state set for this virtual circuit is non-zero. If so, step 6247 adds the frame corresponding to the current debug function to a list to be returned to the GUI software 110. Otherwise, loop 6235 continues. Once the list of previous frames is returned to the GUI software 110, they are highlighted in step 6250 of FIG. 35.

Next

Step 6216 of FIG. 36 is reached when the user clicks on the Next button. Step 6226 is then invoked to find all of the next protocol portions which can be reached from the currently selected protocol portion in one cycle. If more than one protocol portion is selected in the GUI, an error message is posted. Otherwise, the debug function for the currently selected protocol portion is passed to the next protocol portion routine.

Figure 38:
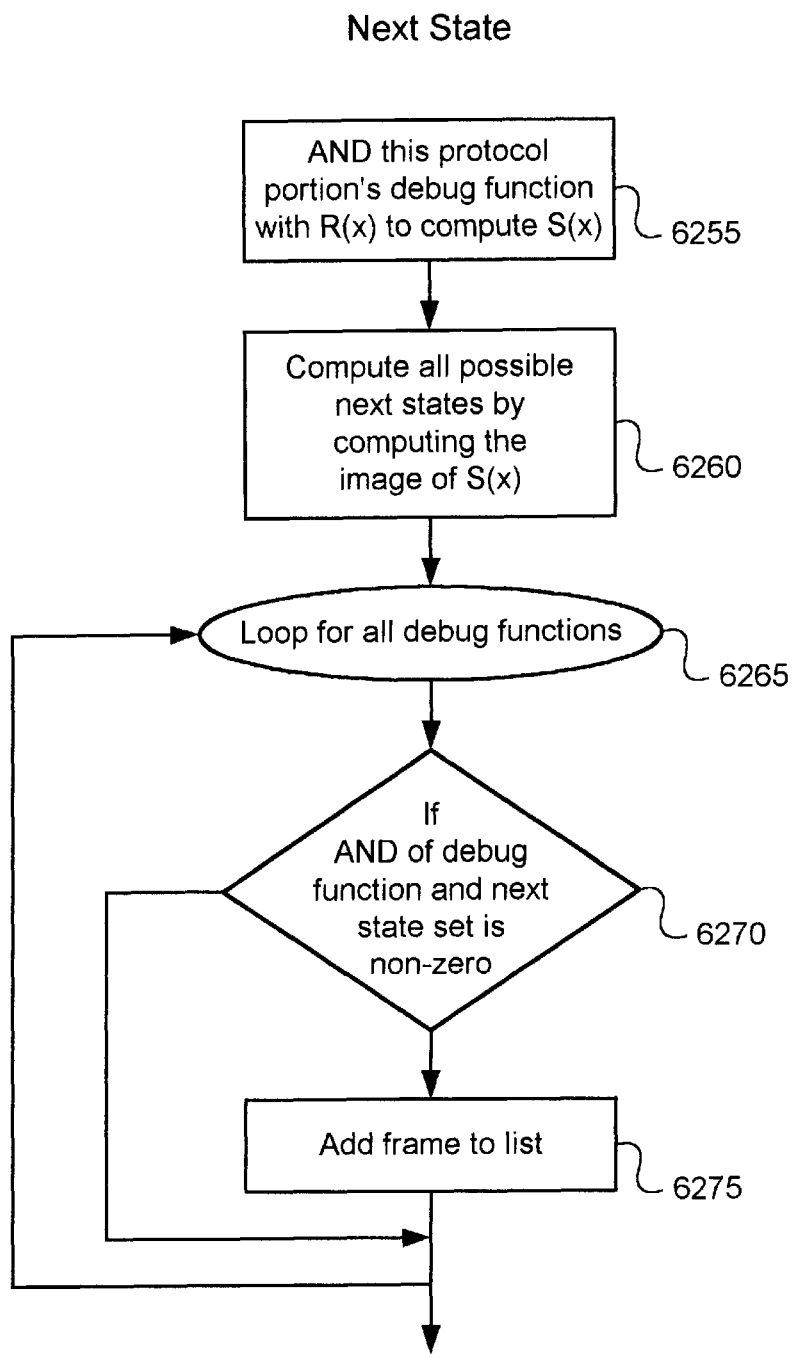

FIG. 38 is a flow chart which shows steps for computing all possible next protocol portions for a given protocol portion. Step 6255 computes the AND of the currently selected protocol portions's debug function with the set of reachable protocol portions. The resulting function is called S(X). Step 6260 computes all of the possible next protocol portions by computing the image of S(X). Loop 6265 loops over all of the debug functions in the VC. Step 6270 checks to see if the AND of the debug function and S(X) from step 6255, is non-zero. If so, step 6275 adds the frame corresponding to the current debug function to a list to be returned to the GUI software 110. Otherwise, loop 6265 continues. Once the list of previous frames is returned to the GUI software 110, they are highlighted in step 6250 of FIG. 35.

0.3.0.2 Example Screen Shots

Figure 39:
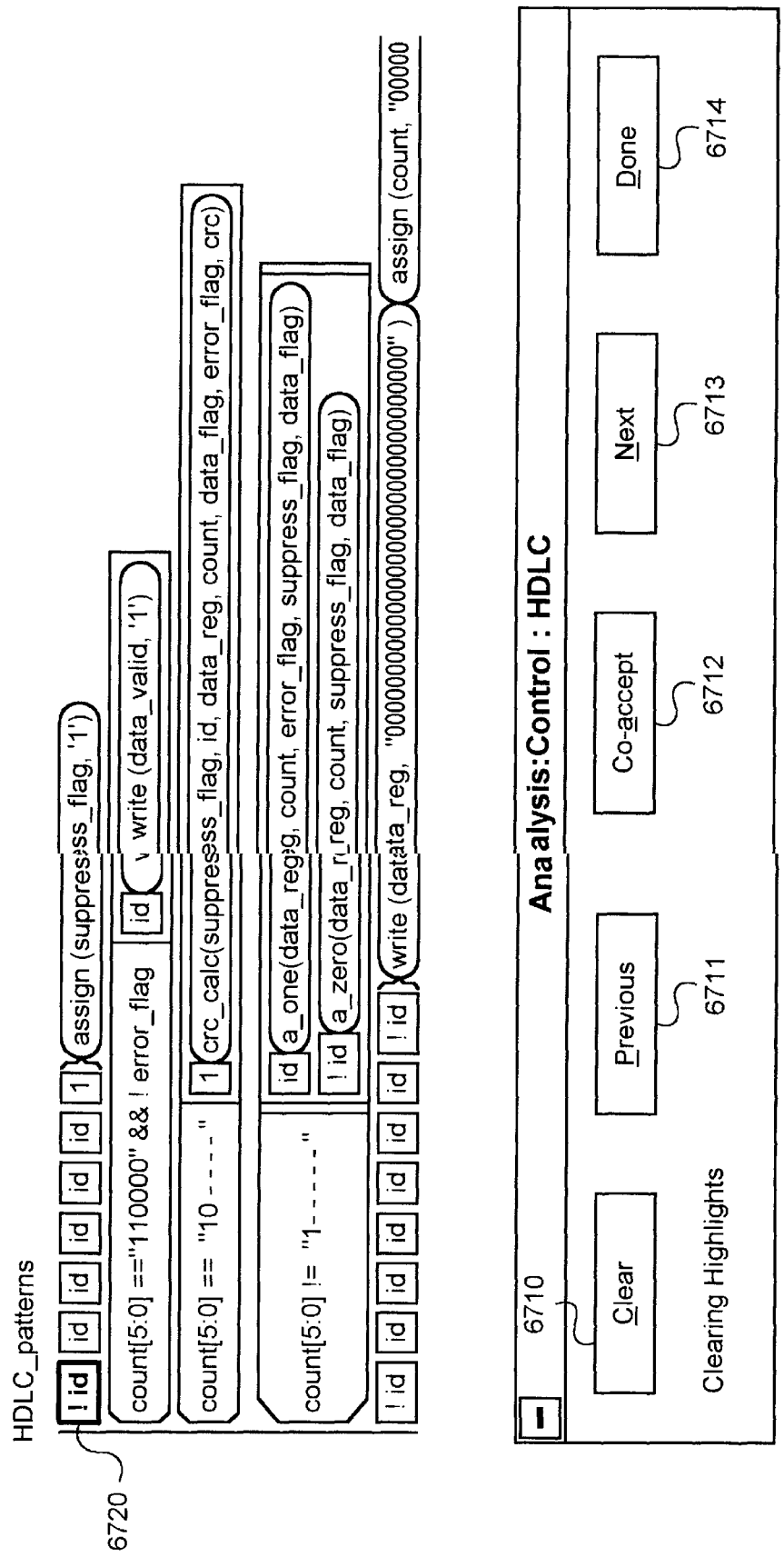
Figure 40:
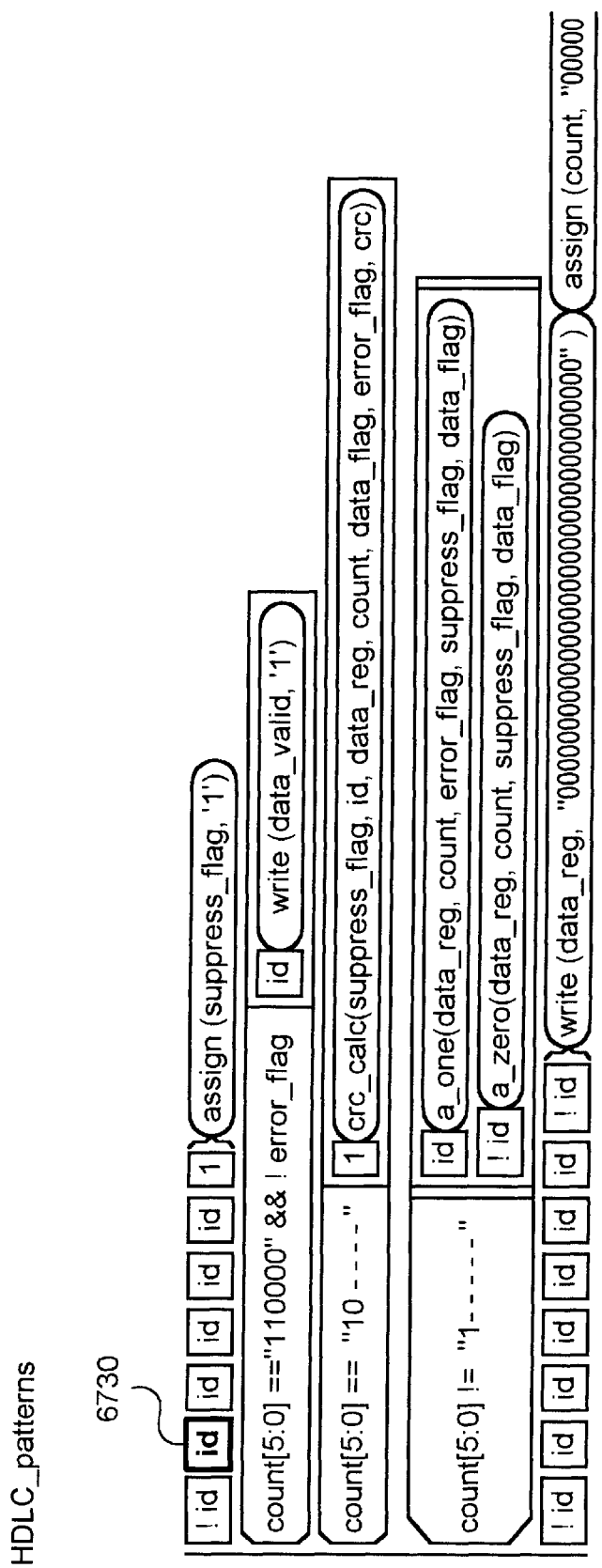
Figure 41:
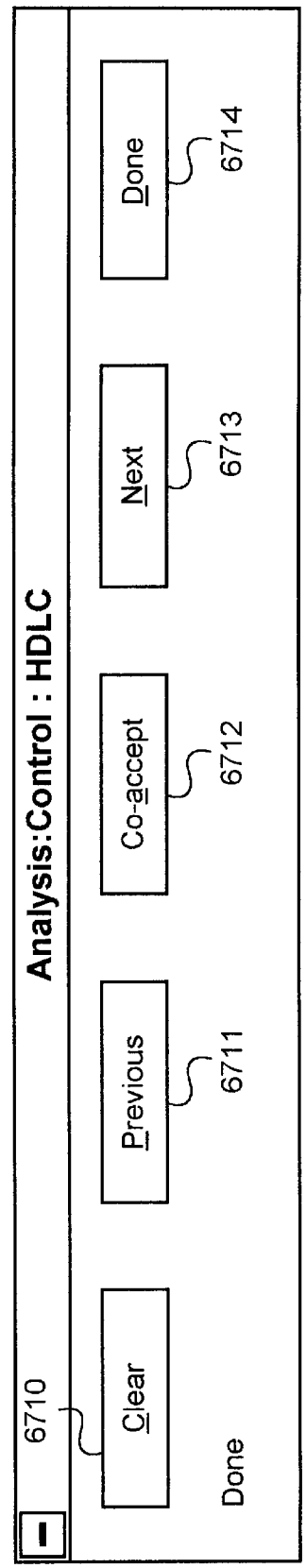

FIGS. 39 through 42 show sample output of analysis of a protocol using the GUI. FIG. 39 shows a frame with one portion 6720 selected. To select this portion of the protocol, the user clicks the Clear Button 6710 to ensure that nothing else is selected, and then clicks on portion 6720. FIG. 40 shows an alternate selection of portion 6730. Note that portion 6720 directly precedes portion 6730. Thus, if the user selects the Previous Button 6711 with portion 6730 selected, portion 6720 will be highlighted as shown in FIG. 39. FIG. 41 and FIG. 42 show the co-accepting and next portions of the protocol from portion 6720 shown in FIG. 39. FIG. 41 shows the GUI after the user has selected Co-accept button 6712 in the GUI. All of the portions of the protocol which could also be accepting when portion 6720 is accepting are highlighted. FIG. 42 shows the GUI after the user has selected Next button 6713 in the GUI. All of the portions of the protocol which could accept in the next cycle after portion 6720 is accepting are highlighted. It will be apparent to one skilled in the art that highlighting protocol portions is one method for differentiating them in the GUI, but other methods such as displaying them in a different color may be used.

6. Simulation Using the GUI

Once HDL 160 has been generated, it is desirable to simulate the behavior of HDL 160 to verify that the protocol behaves as the designer intended. As discussed above, certain ways of generating HDL add "debug signals" to the HDL, each debug signal representing a node in the linked protocol tree 120. The present invention uses these debug signals to enable the user to monitor the progress of a simulation by way of the GUI.

Figure 53:
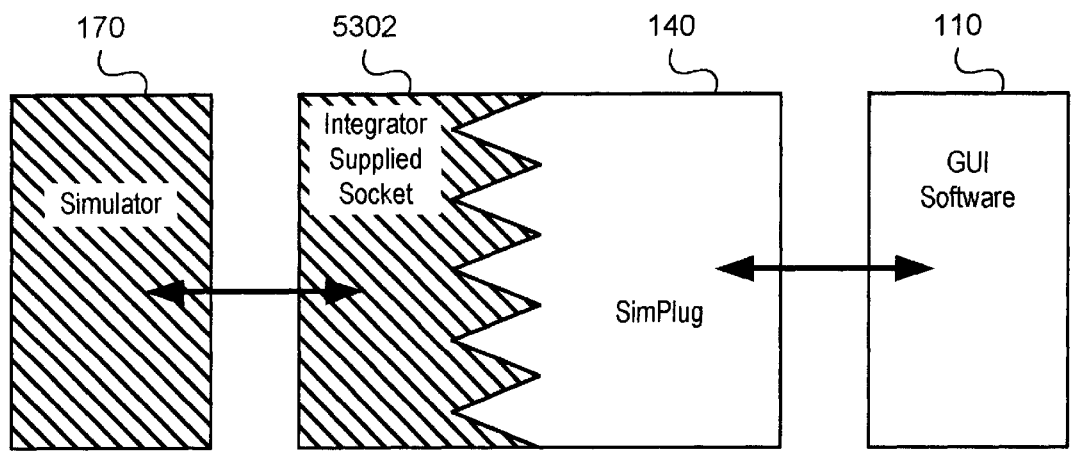
FIG. 53 is a block diagram of the GUI software of the present invention interfacing with a commercial HDL simulator package via a SIMPLUG interface.

In a preferred embodiment, as shown in FIG. 53, GUI software 110 interfaces with a commercial HDL simulator package ("simulator") 170 so that GUI software 110 can graphically display the results of the simulation of the HDL as the simulation is performed. The user also can control the progress of the simulation through commands to GUI software 110. In a preferred embodiment, simulator 170 is the VSS VHDL simulator, available from Synopsys, Inc. of Mt. View Calif.

GUI software 110 has a predefined SIMPLUG interface 140, which allows various VHDL and Verilog simulators to be used with the present invention. The SIMPLUG interface 140 preferably is implemented as an archive of object code in the C programming language. This archive is used by designers to construct their own links to a simulator of their choice. Appendix K shows a SIMPLUG API (Application Program Interface) used in a preferred embodiment of the present invention. Other SIMPLUG APIs in accordance with the present invention may include more, different, or fewer functions than those shown in the Appendix.

Because the present invention should be able to connect to a wide variety of HDL simulators, the SIMPLUG interface 140 preferably is a part of a separate executable computer program connected to GUI software 110 through a communications link, such as a TCP/IP link. In general, any simulator 170 that can interface with SIMPLUG interface 140 to accept the following commands from GUI software 110 may be used:

1) launch simulator and load a design;

2) Start/stop/resume/restart a simulation;

3) Query signal and variable values; and

4) Set/remove breakpoints on changes in signal values.

Simulator 170 must also be able to communicate a notification to GUI software 110 when the simulation halts.

The SIMPLUG interface 140 must perform at least the following functions:

1) Keep track of the debug signals that need to have values sent to GUI software 110.

2) Send those debug signal values to GUI software 110 when the simulator changes them;

3) Setting and Removing simulator breakpoints on specified debug signals; and

4) Sending a "run" command to the simulator.

Figure 43:
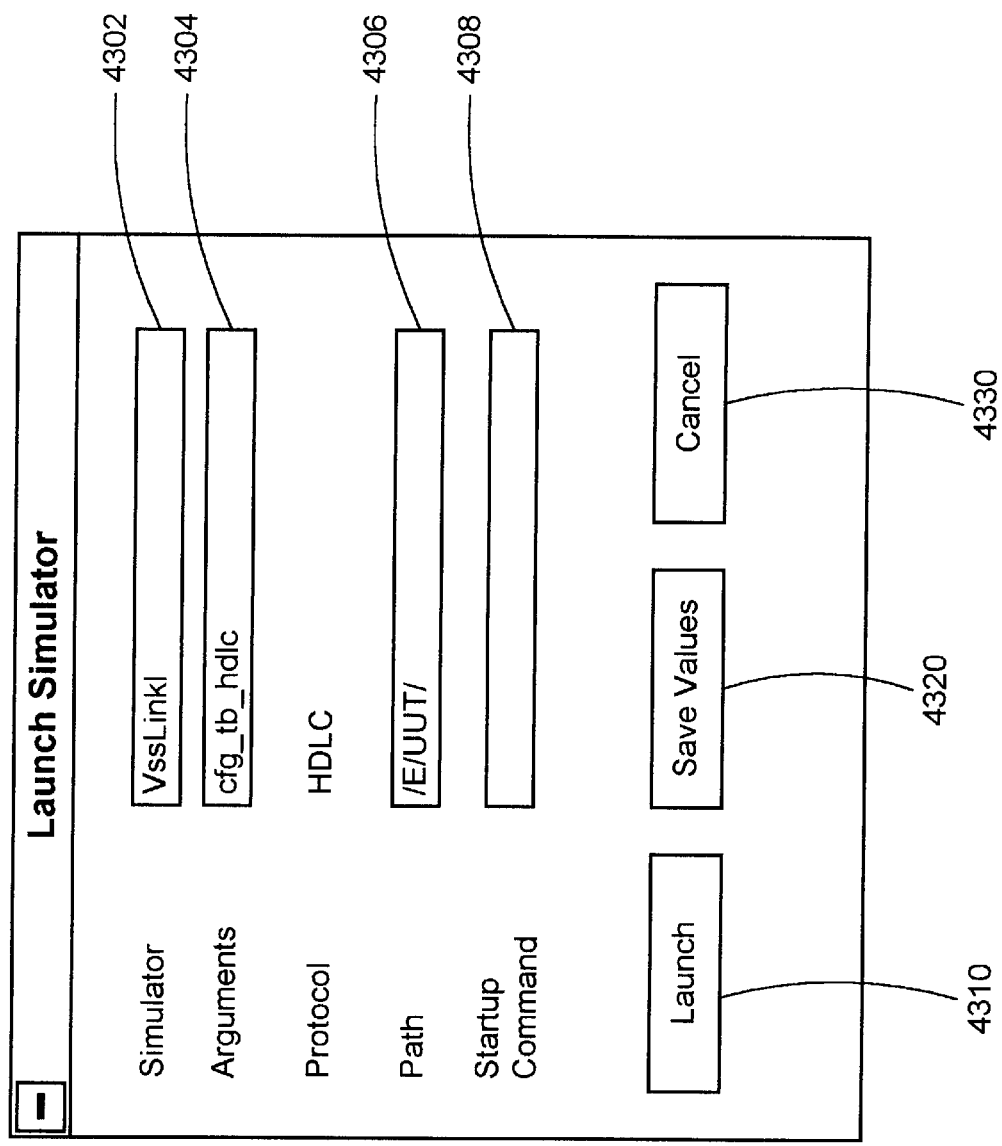
FIG. 43 shows an example of a Launch Simulator window that is used to launch the simulation.

FIG. 43 shows an example of a Launch Simulator window that is used to launch the simulation. The Launch simulator window is displayed by GUI software 110 when the user clicks on "Simulator" in the menu of FIG. 5. Each of the fields of FIG. 43 (except "Startup Command" 4308) preferably defaults to a predetermined default value. The user can change these values by selecting a field and typing a value into it. A field 4302 displays a name of simulator 170 (thus allowing various simulators to be used with the present invention). A field 4304 displays a name of a "test bench" input 180. A field 4306 displays a name of an instance of the design in the design hierarchy that we wish to monitor. (There can be several instances of the same design in a system). A field 4308 displays a startup command (default or user-specified) for simulator 170 if the simulator chosen by the user requires an initial startup command.

Figure 54:
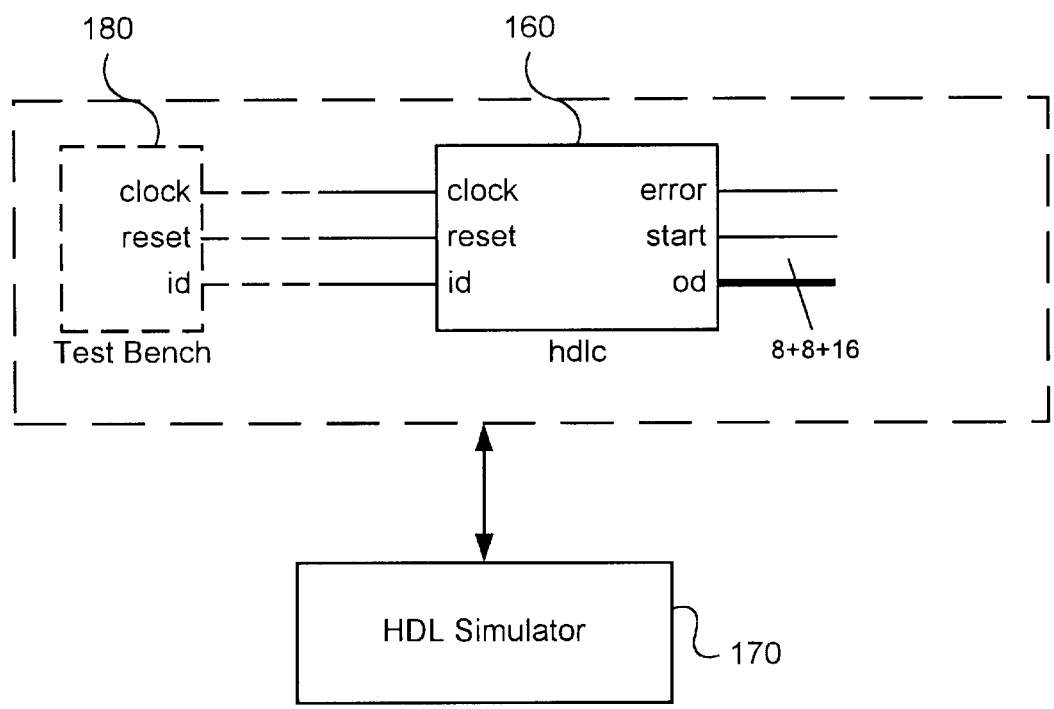
FIG. 54 shows an example of a test bench input signal used for simulation.
Figure 55:
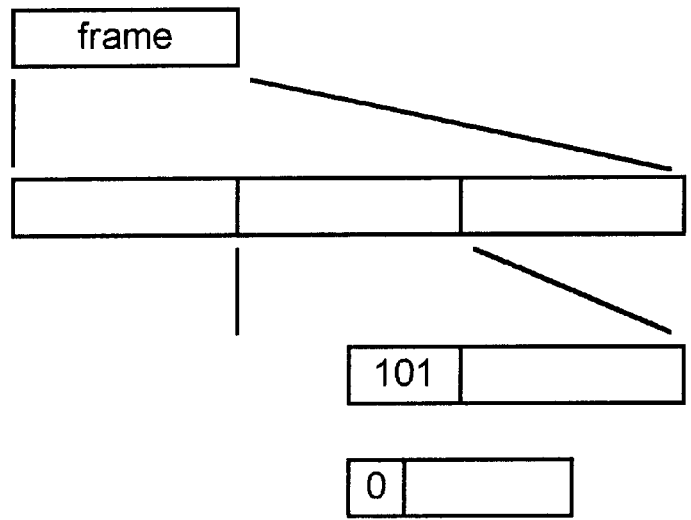
FIG. 55 illustrates a frame comprising a sequence of three subframes.
Figure 56:
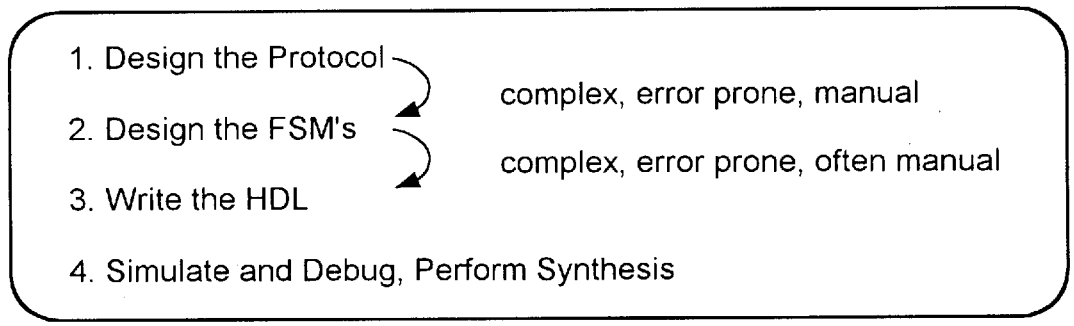
FIG. 56 shows stages in the design of a network interface chip.

FIG. 54 shows details of "Test bench" 180, which acts as input for the simulated design 160. This information can be specified once and stored for use by SIMPLUG interface 170. Test bench 180 sends a clock, reset, and input (id) signal to HDL 160. During simulation, HDL 160 outputs an error, start, and output (od) signal (which includes the debug signals). Appendix L shows an example of test bench 180.

The window of FIG. 43 also includes three buttons: Launch 4310, Save Values 4320, and Cancel 4330. If the user clicks on Launch, GUI software 110 begins the simulation. GUI software 110 preferably opens the windows in FIGS. 44, 46, 51, and 52 when the simulator is launched. If the user clicks on Save Values 4320, GUI software 110 saves the values of the fields in the dialog box. These values will override the system defaults in the future. If the user clicks on "Cancel", control returns to the state shown in FIG. 5 to await another user command.

Figure 44:
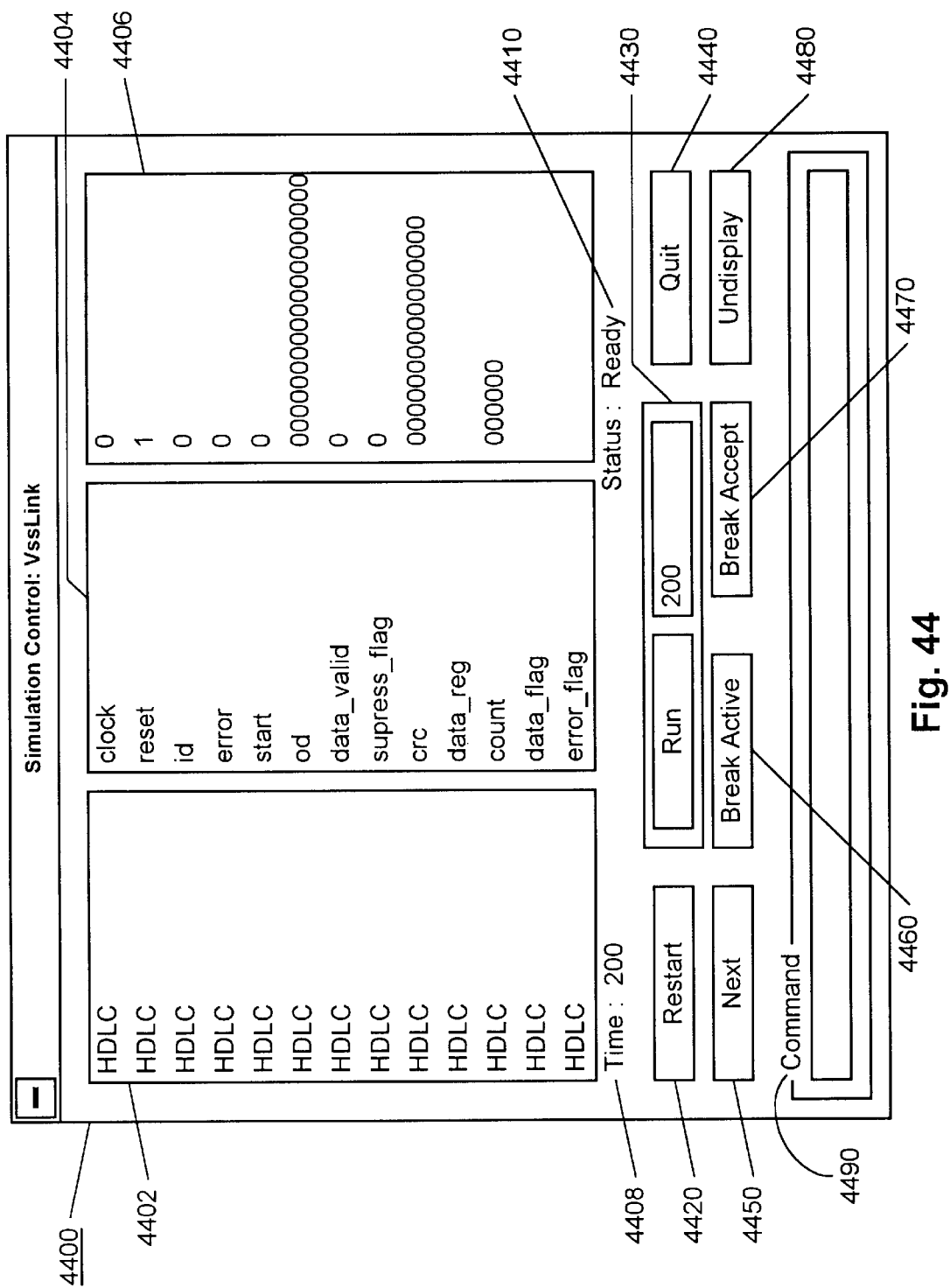
FIG. 44 shows an example of a Simulate window that operates in conjunction with the browser of FIG. 46.
Figure 45A:
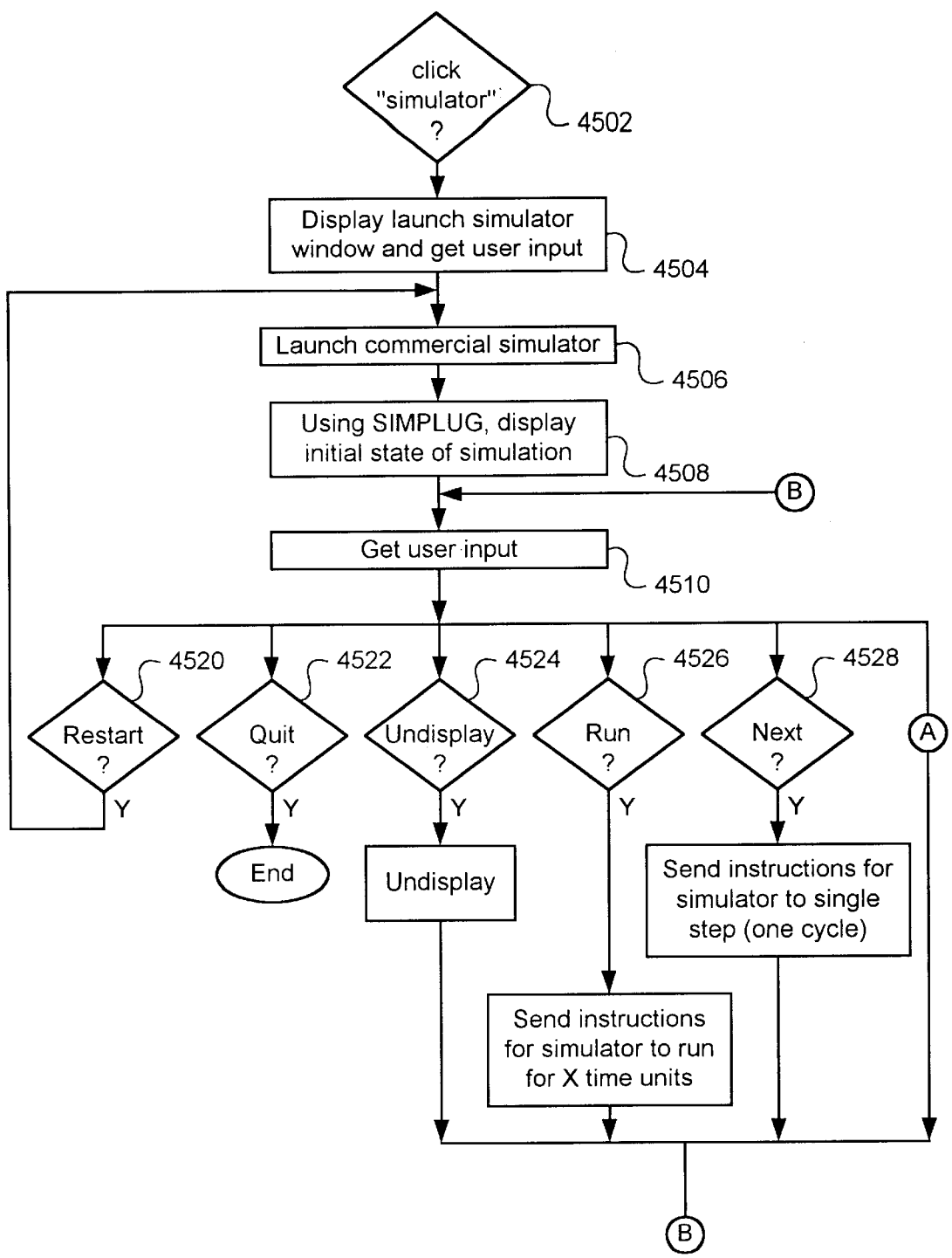
FIGS. 45(a) through 45(f) are flow charts showing steps performed by the GUI during simulation of HDL in response to user input received via the GUI.
Figure 45B:
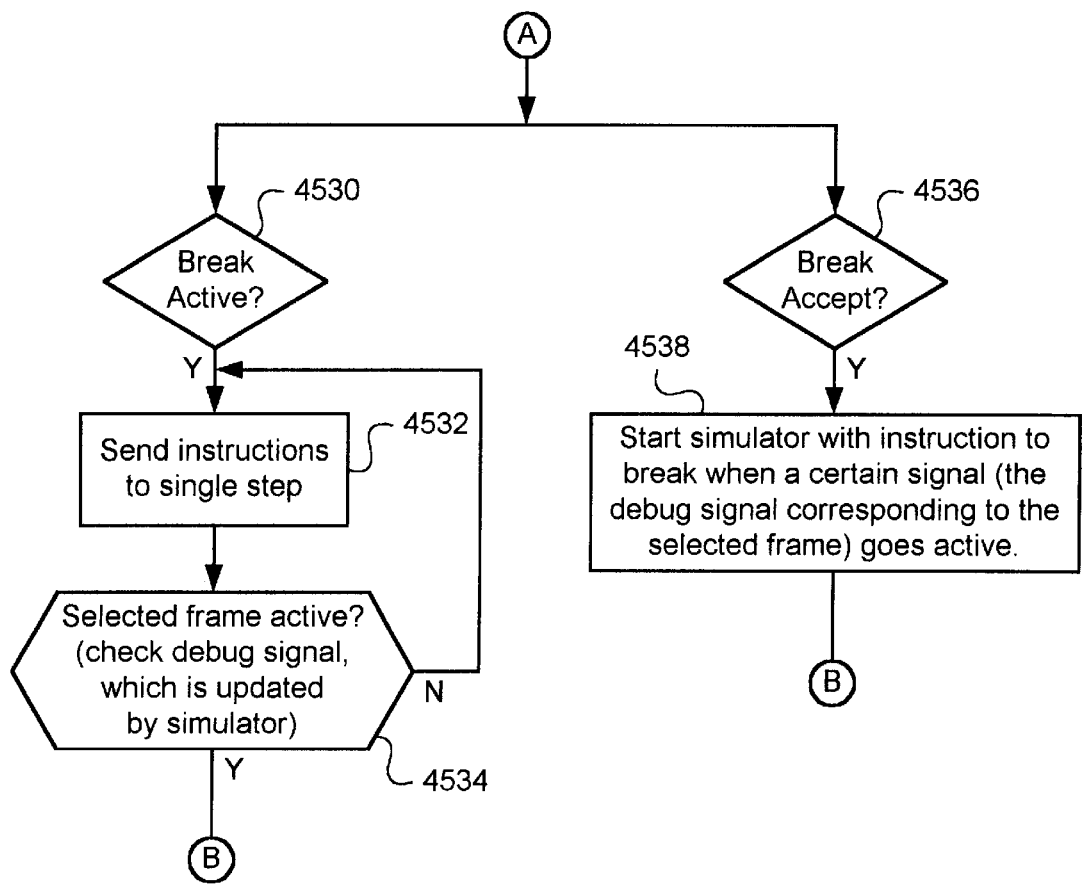
Figure 45C:
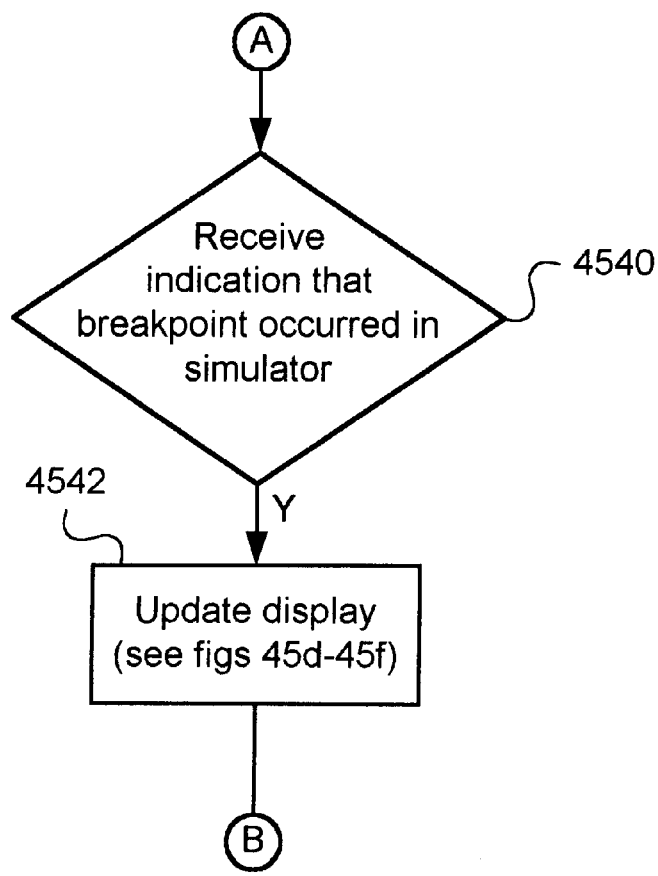
Figure 45D:
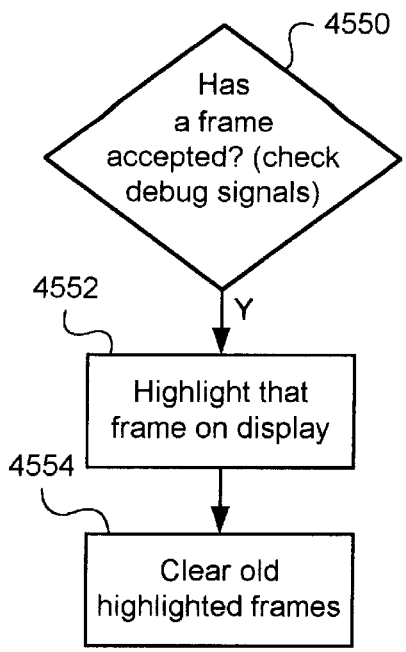
Figure 45E:
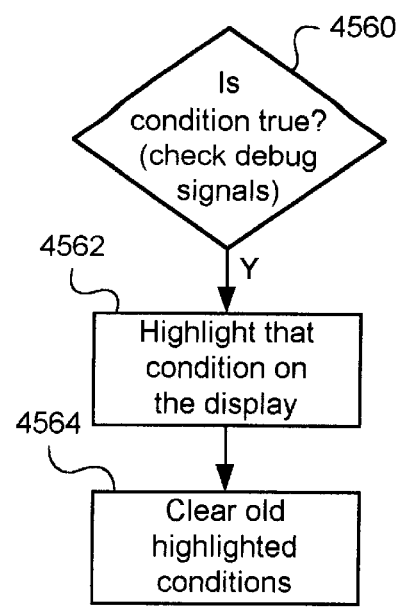
Figure 45F:
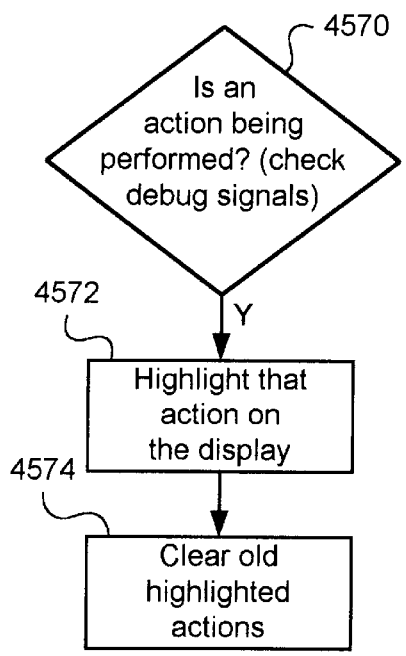
Figure 46:
FIG. 46 shows an example of a Simulator Browser window generated by the GUI.

FIG. 44 shows an example of a Simulate window that operates in conjunction with the browser of FIG. 46. GUI software 110 activates this window when the user clicks on "watch" button (see, e.g., FIGS. 12 and 14). The window includes three sub-windows: a design subwindow 4402, a signal subwindow 4404 (showing, e.g., ports or variable names), and a value subwindow 4406. As SIMPLUG interface 140 determines that the simulator is changing debug values, it passes this information to GUI software 110, which displays the values as they are updated during simulation. The window also includes a current simulation time (e.g., 200 ns) and a current status. A "ready" status means that the GUI software is waiting for input from the user (for example, at the end of a single step operation).

The window 4400 also includes seven buttons: "Restart" button 4420, "Run" button 4430, "Quit" button 4440, "Next" button 4450, "Break Active" button 4460, "Break Accept" button 4470, and "Undisplay" button 4480. The performance of GUI 110 when each of these buttons is clicked by the user is described in connection with FIG. 45. The window of FIG. 44 also includes a "command" field. The user can explicitly enter simulator commands, which are sent to the simulator by GUI software 110.

FIGS. 45(*a*) through 45(*f*) are flow charts showing steps performed during simulation of HDL in response to input from the user via the GUI. As shown in step 4502 of FIG. 45(*a*), when the GUI software 110 receives an indication that the user has clicked "Simulator" menu item (see FIG. 5), then GUI software 110 displays the Launch Simulator window of FIG. 43 in step 4504. In step 4506, the GUI software detects that the user has clicked "launch" button 4310.

In step 4508, the GUI software displays an initial state of the protocol (e.g., the window of FIGS. 44 and 46). The GUI software also sends any needed simulator initiation instructions at this time. In step 4510, the GUI software receives an indication that the user has clicked on a button in the Simulator Control window 4400. If it is determined in step 4520 that the user has clicked "Restart" button 4420, control returns to step 4506. If it is determined in step 4522 that the user has clicked "Quit" button 4440, the simulation ends. If it is determined in step 4524 that the user has clicked "Undisplay" button 4480, the GUI software performs an undisplay operation.

If it is determined in step 4526 that the user has clicked "Run" button 4430, the GUI software sends instructions to the simulator via the SIMPLUG interface to run for a number of time units set by the user via the GUI (e.g., 200 ns). If it is determined in step 4528 that the user has clicked "Next" button 4450, the GUI software sends instructions to the simulator via the SIMPLUG interface to perform a single step instruction (e.g., for one cycle) (e.g., for one frame). If it is determined in step 4530 that the user has clicked "Break Active" button 4460, the GUI software repeatedly sends instructions to the simulator via the SIMPLUG interface to perform a single step instruction (step 4532) until the debug signals indicate that a (user-selected) frame has become active. If it is determined in step 4536 that the user has clicked "Break Accept" button 4470, the GUI software sends instructions to the simulator via the SIMPLUG interface to run until a debug signal corresponding to a (user-selected) frame goes high (indicating an accept state of the corresponding frame).

If the GUI software receives an indication from the simulator VIA the SIMPLUG interface that a breakpoint has occurred in the simulator (step 4540) (or that the simulator has otherwise returned control to the GUI software), then GUI software 110 updates the display as shown in FIGS. 45(*d*)–45(*f*).

If a frame has accepted (step 4550) the GUI software highlights that frame on display 180 (see FIG. 46) and unhighlights any frames that are no longer active in steps 4552 and 4554. If a condition is true (step 4560) the GUI software highlights that condition on display 180 and unhighlights any conditions that are no longer true in steps 4562 and 4564. If an action is being performed (step 4570) the GUI software highlights that action on display 180 and unhighlights any actions that are no longer being performed in steps 4572 and 4574.

FIG. 46 shows an example of a Simulator Browser window generated by GUI software 110. The contents of this window in FIG. 46 correspond to the window of FIG. 44. The window contains a display of the protocol being simulated. In this initial state, no portions of the displayed protocol are highlighted.

Figure 47:
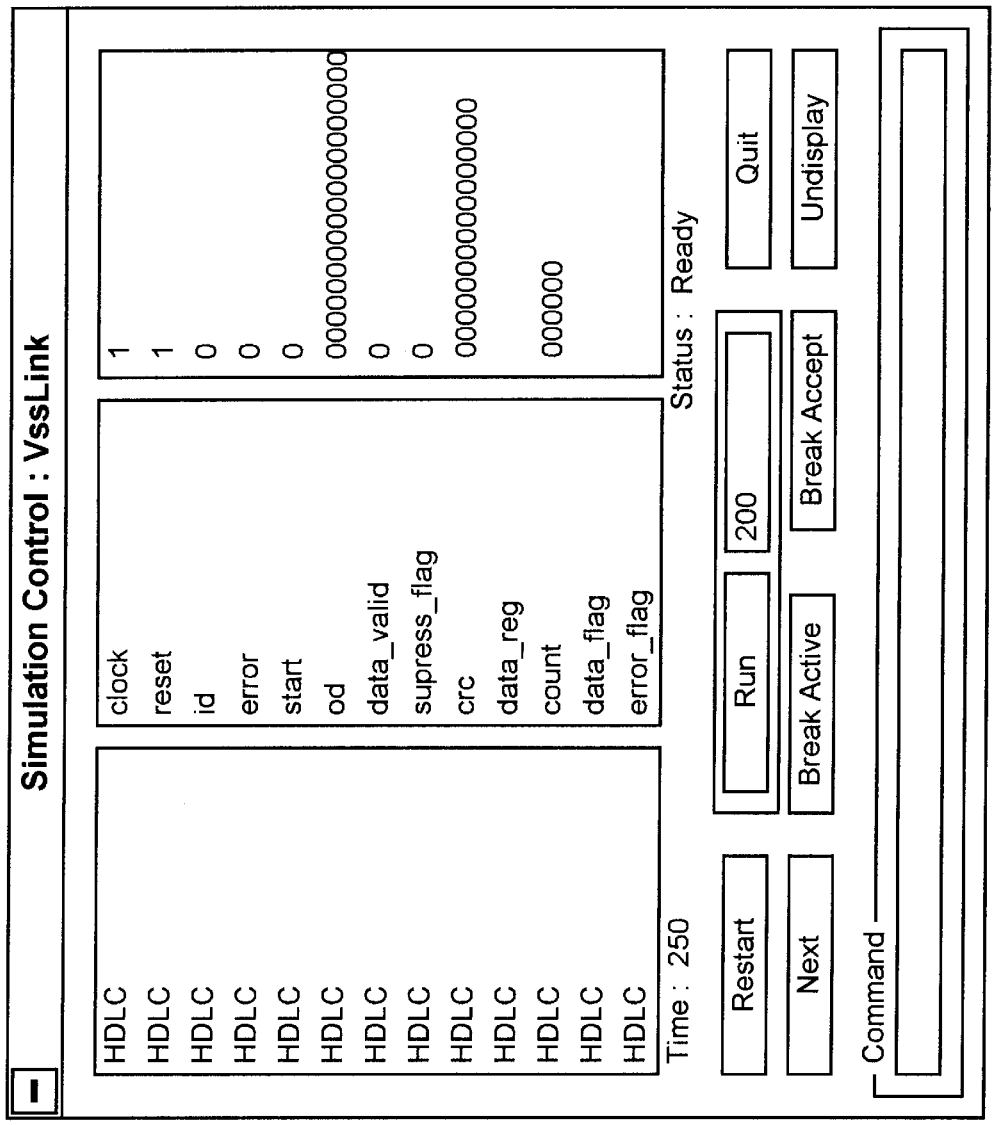
FIG. 47 shows an example of the Simulate window of FIG. 44 after a first breakpoint.

FIG. 47 shows an example of the Simulate window of FIG. 44 after a first breakpoint. FIG. 48 shows an example of a Simulator Browser window generated by GUI software 110 after the first breakpoint. Both of these windows are displayed after the user commands the simulator (via GUI software 110) to run until a frame is accepted using the "break accept" button. Note that the time has increased to 250 ns and active frames are highlighted. Conditions and actions that correspond to an accepted frame are also highlighted. GUI software 110 can determine which frames, actions, and conditions have gone active by looking at the debug signals from the simulator and determining which signals have gone high.

Figure 49:
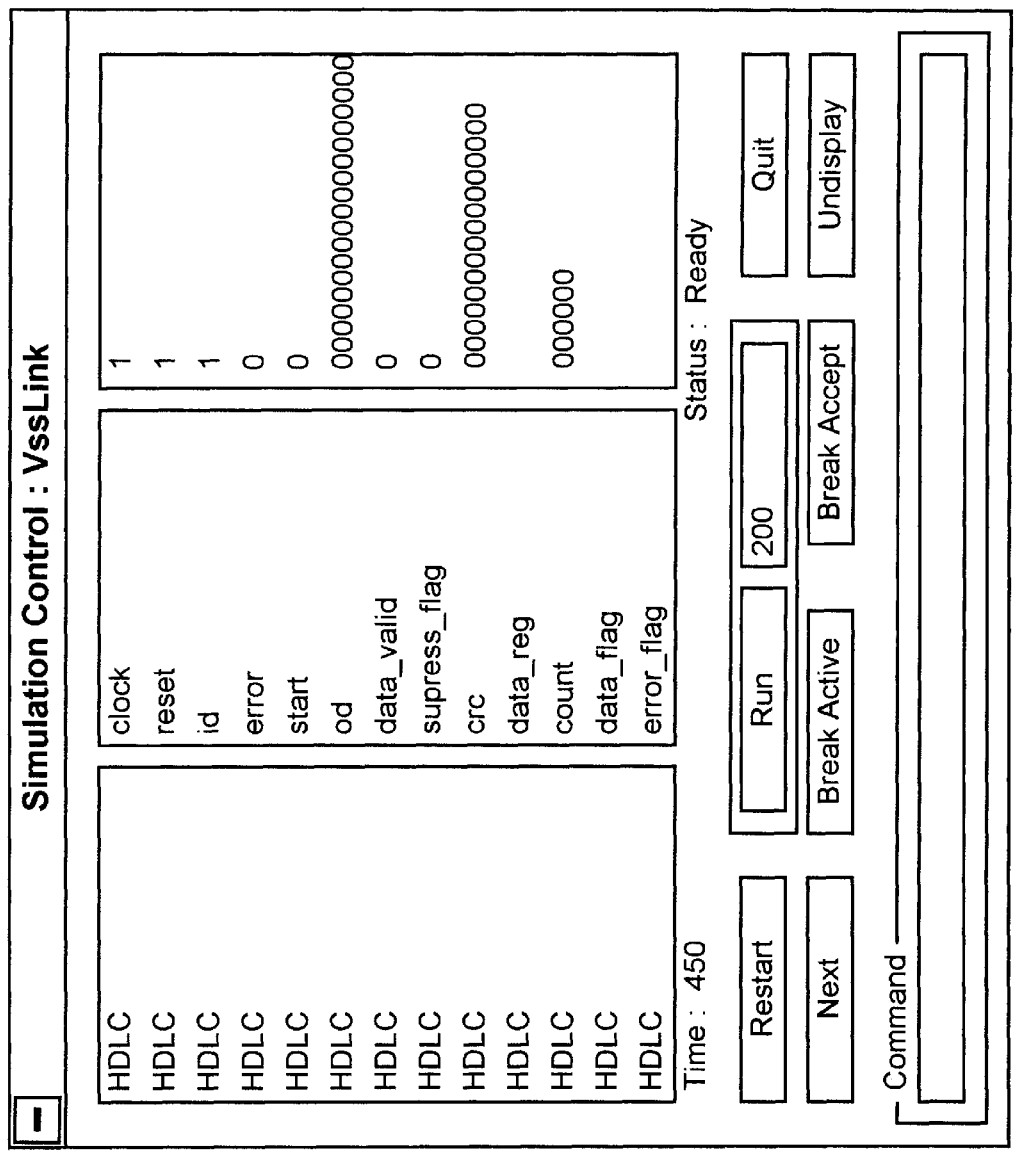
FIG. 49 shows an example of a Simulate window after a second breakpoint.

FIG. 49 shows an example of the Simulate window of FIG. 44 after a second breakpoint. FIG. 50 shows an example of a Simulator Browser window generated by GUI software 110 after the second breakpoint. Both of these windows are displayed after the user commands the simulator (via GUI software 110) to run until a frame is accepted using the "break accept" button. Note that the time has increased to 450 ns and active frames (and actions/conditions) are highlighted. (GUI software 110 has removed the highlights from the previously active frames). Again, GUI software 110 can determine which frames, actions, and conditions have gone active by looking at the debug signals and determining which signals have gone high.

Figure 51:
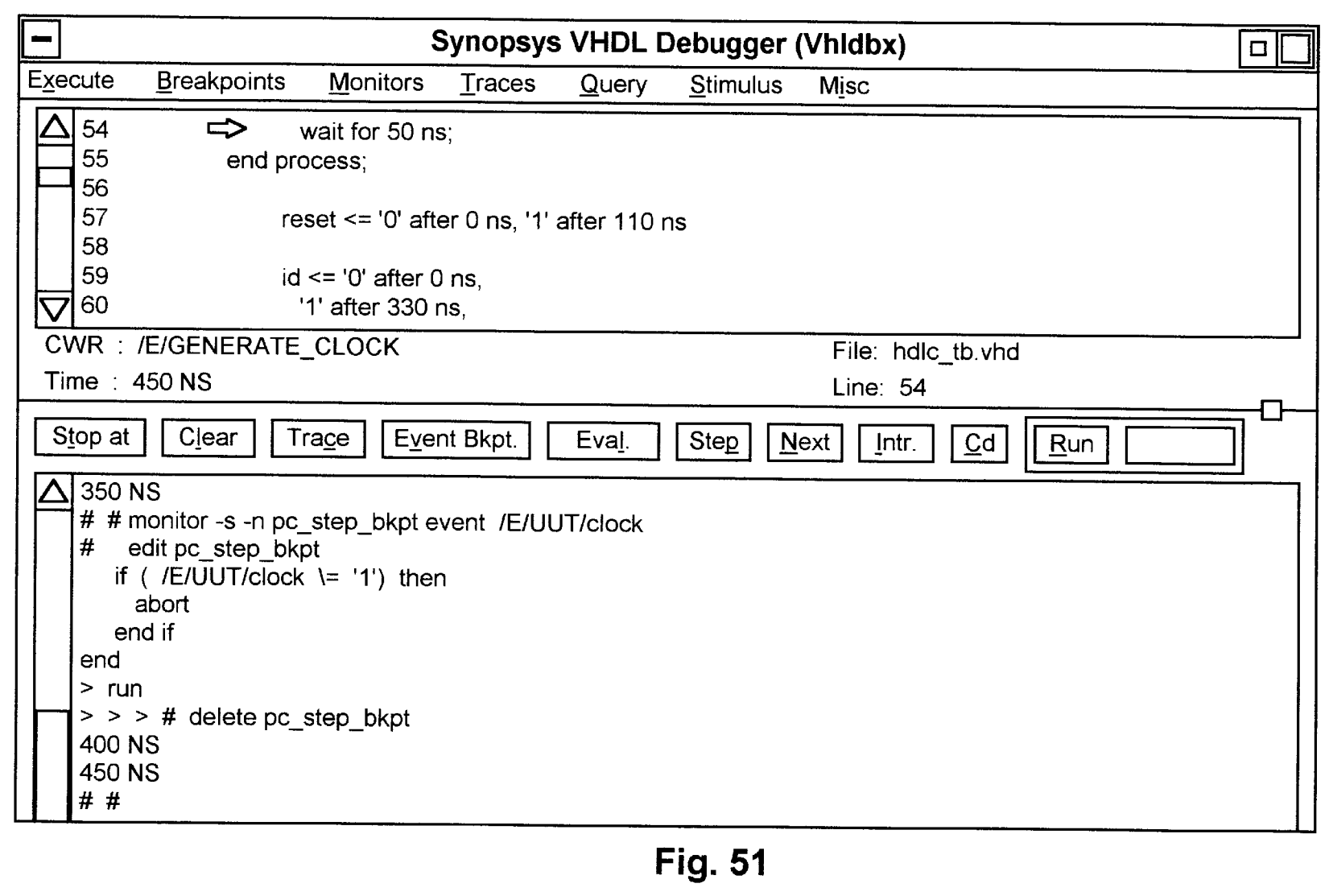

FIG. 51 shows an example of a window for displaying commands sent between GUI software and a simulator software. If this window is open, GUI software 110 displays commands as it sends and receives commands from SIMPLUG interface 140.

Figure 52A:
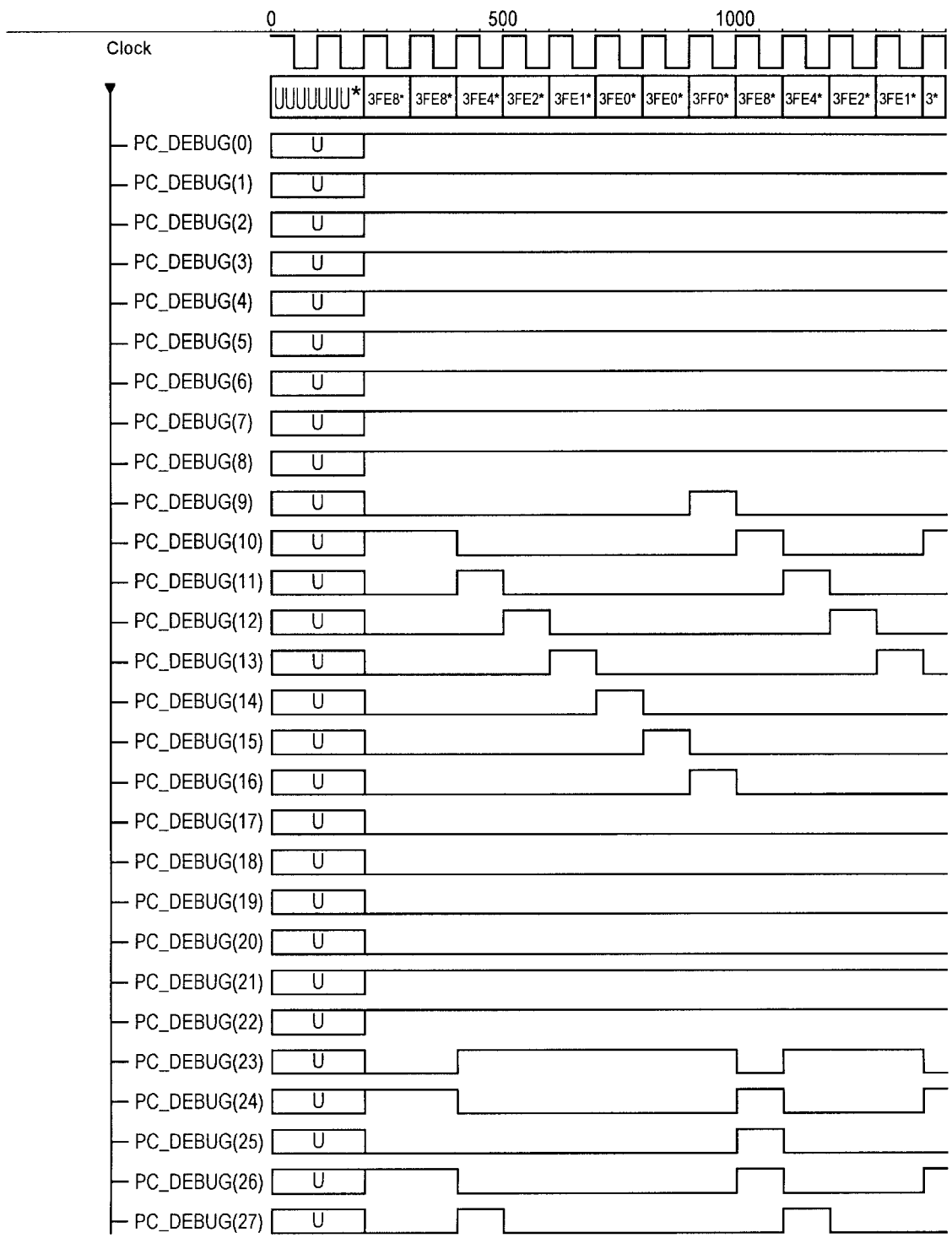
FIGS. 52(a) and 52(b) shows an example of timing signals displayed during simulation.
Figure 52B:
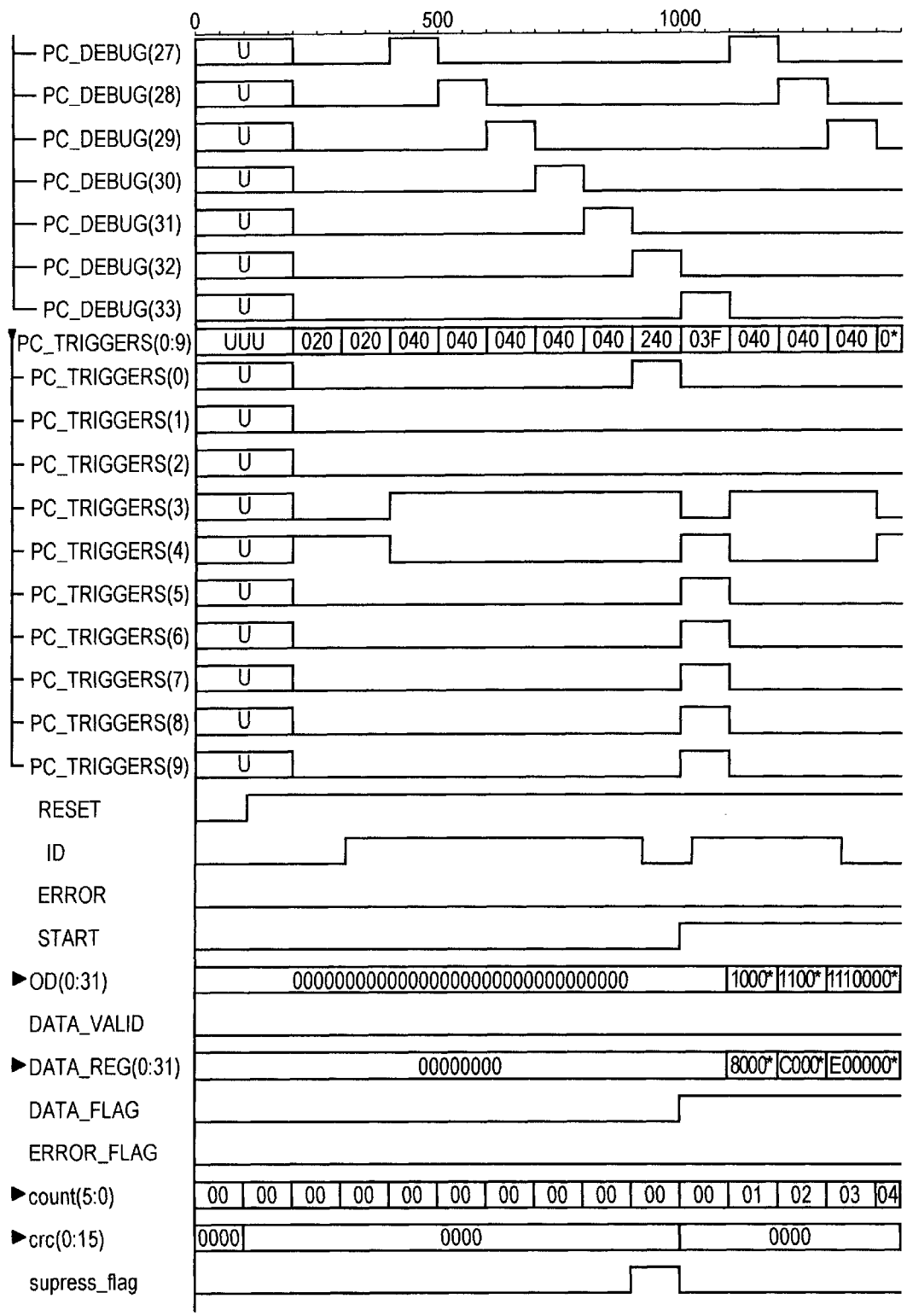

FIGS. 52(*a*) and 52(*b*) show an example of timing signals displayed during in a window during simulation. Each of the thirty-four "debug" signals represented in FIG. 52 corresponds to one of the nodes of the tree in frame definition data base 120 (see FIG. 16). As each of these signal representations changes, the change is passed through SIMPLUG interface 140 to GUI software 110, which updates the display of the debug signals accordingly.

7. Pull-Down Menus in the GUI

The File pull-down menu (not shown) contains the items: New, Open, Merge, Revert, Close, Save, Save As, Print, Print Preview, Print setup <file list>, and exit.

The Edit pull-down menu (not shown) contains the items: Undo, Cut, Copy, Paste, Delete, Add, Edit, Attributes, Rename, and Top Frame.

The View pull-down menu (not shown) contains the items: Tool Bar, Status Bar, Set Font, Duplicate, Shift Up, Shift Down, Top, Bottom, Watch, Command, Group, Ungroup, Collapse, and Expand. Duplicate allows the user to create duplicate copies of windows.

The Window pull-down menu contains conventional items and will not be discussed herein.

The Help pull-down menu (not shown) contains the items: Index, Using Help, and About. These are conventional help menu items and not described herein.

8. Data generated and used by the GUI

Figure 60:
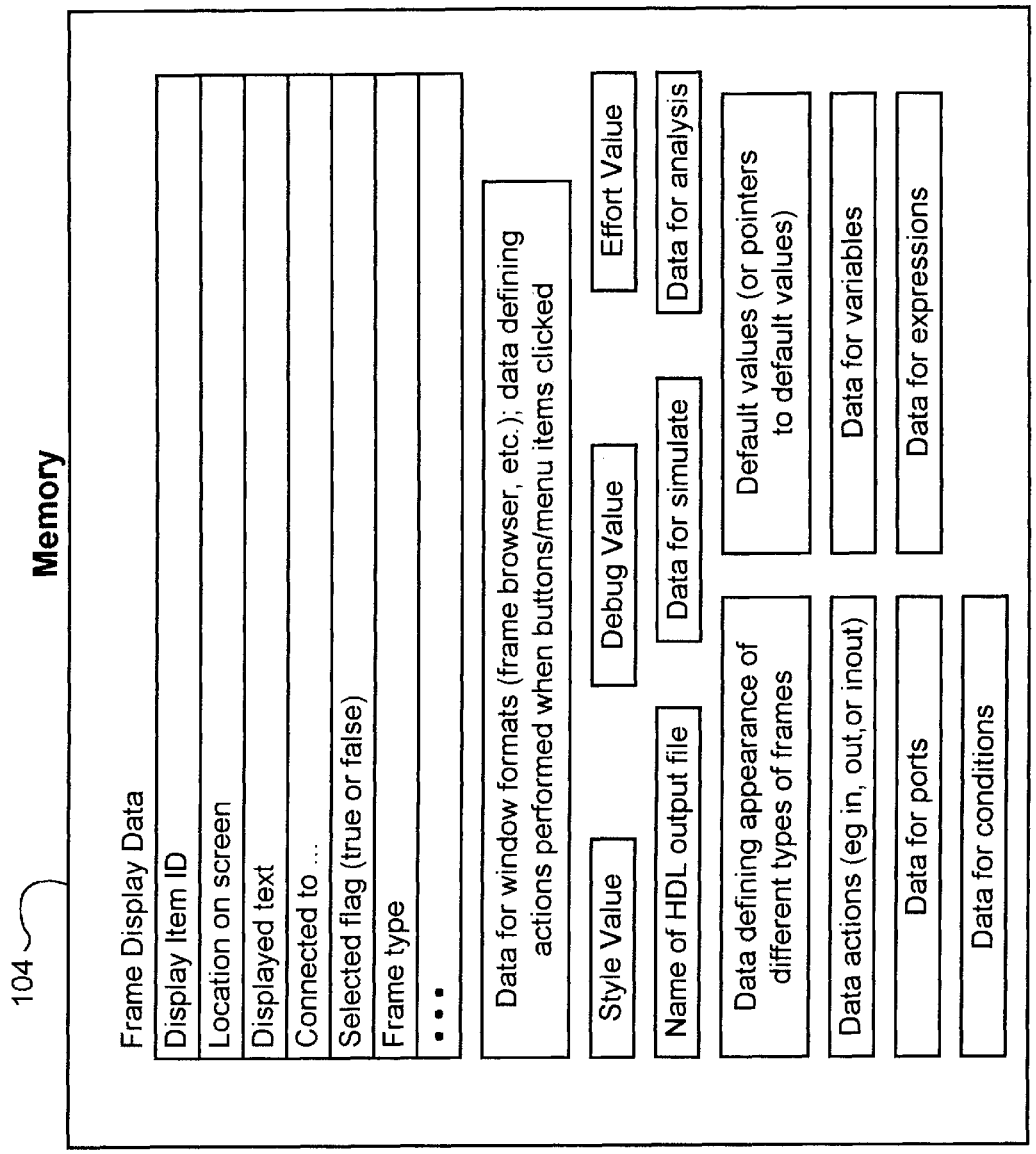
FIG. 60 shows an example of data stored in the memory of FIG. 1 that is used in a preferred embodiment of the present invention.

FIG. 60 shows an example of data stored in memory 104 of FIG. 1 that is used in a preferred embodiment of the present invention. This Figure is not exhaustive, but generally shows the type of data used by GUI software 110 to create and maintain its windows, displays, and dialog boxes. The figure also shows some of the data input by the user via the GUI (e.g., the style, effort, and debug parameter values used by the synthesis process). It should be understood that data input by the user generally is stored in memory 104 by GUI software 110. GUI software 110 generally relies on data stored in memory 104 to generate its windows and to determine what types of actions to take in response to user input.

9. Alternative Embodiments

Several preferred embodiments of the present invention have been described. Nevertheless, it will be understood that various modifications may be made without departing from the spirit and scope of the invention. FIG. 57 shows a vertical frame display in a GUI window that corresponds to the horizontal frame display of FIG. 6. In a vertical display, sequential frames are displayed on a vertical axis instead of on a horizontal axis. Such a display allows display of a frame having many sequential parts. In a preferred embodiment of the invention, the user can choose between vertical and horizontal frame displays by use of a GUI menu item. The format of data base 120 is not affected by the display mode chosen by the user.

In describing the preferred embodiments, a number of specific technologies used to implement the embodiments of various aspects of the invention were identified and related to more general terms in which the invention was described. However, it should be understood that such specificity is not intended to limit the scope of the claimed invention.

We claim:

1. A method for generating a circuit design from a protocol specification, comprising the steps, performed by a data processing system of:

receiving the protocol specification in a language with applicative semantics for specifying control flow and procedural semantics for specifying data flow;

storing the protocol specification in a memory of the data processing system;

receiving from a user an indication of a "style" parameter value;

converting, when the style parameter value is "distributed", the protocol specification to a virtual circuit and then converting the virtual circuit to a first High-level Description Language (HDL) circuit design; and converting, when the style parameter value is "min-encoded", the protocol specification to a virtual circuit, then to a state transition graph, then to a second virtual circuit, and finally to a second High-level Description Language circuit design.

2. The method of claim 1, wherein the step of receiving the protocol specification includes the step of:

displaying a frame editor window of a graphical user interface;

receiving the protocol specification from a user via the frame editor of the graphical user interface, the user graphically entering frames of the protocol specification via the frame editor.

3. The method of claim 1, wherein the step of receiving a style parameter value incudes the step of:

displaying a synthesis window of a graphical user interface;

receiving the style parameter value from the user via the synthesis window of the graphical user interface, the user graphically indicating the style parameter value via the synthesis window.

4. The method of claim 1, wherein the first converting step incudes the steps of:

receiving from the user an indication of an "effort" parameter value via a graphical user interface;

minimizing, when the effort parameter value is "high", the virtual circuit before converting the virtual circuit to the first High-level Description Language circuit design.

5. The method of claim 1, wherein the second converting step includes the step of:

minimizing the state transition graph before it is converted to the second virtual circuit.

6. The method of claim 1, further comprising the step of synthesizing a low-level circuit design from a one of the first and the second High-level Description Language circuit designs.

7. The method of claim 1, further comprising the steps of:

receiving, from the user via a graphical user interface, a signal initiating a simulation of the behavior of a one of the first or the second High-level Description Language circuit designs via the graphical user interface;

receiving from the user, via the graphical user interface, an indication of a simulation command;

sending the simulation command to a simulator software program;

receiving from the simulator program a result of simulation; and displaying, via the graphical user interface, the result of simulation.

8. The method of claim 1, further comprising the steps of:

receiving, from the user via a graphical user interface, a signal initiating an analysis of the first virtual circuit;

receiving from the user, via the graphical user interface, an indication of an selected frame;

graphically displaying the specified protocol with the selected frame highlighted;

receiving from the user, via the graphical user interface, an analysis command;

analyzing the virtual circuit in accordance with the analysis command to yield a set of analysis results; and graphically displaying the specified protocol with frames corresponding to the set of analysis result states highlighted.

9. The method of claim 1, wherein the first converting step includes the steps of:

generating a linked protocol tree having a plurality of nodes;

generating a plurality of debug signals, where the number of debug signals corresponds to the number of nodes in the linked protocol tree, where the debug signals are included in the circuit design.

10. The method of claim 9, further comprising the steps of:

simulating the High-level Description Language circuit design in accordance with the debug signals;

displaying a result of the simulating step via a graphical user interface in accordance with the debug signals.

11. The method of claim 1, wherein the first converting step includes the steps of:

displaying a synthesis window of a graphical user interface;

receiving a debug parameter value from the user via the synthesis window of the graphical user interface, the user graphically indicating whether debug signals should be generated during the first converting step.

12. A method for inputting a protocol specification, comprising the steps, performed by a data processing system of:

displaying a frame editor window of a graphical user interface on a display screen;

receiving an indication from a user that a new frame is to be specified;

displaying an empty new frame on the display screen;

allowing the user to enter frames within the new frame via the graphical user interface in a language with applicative semantics for specifying control flow and procedural semantics for specifying data flow;

allowing the user to cut and paste existing frames via the graphical user interface; and storing the entered frames and the cut and pasted frames in a frame definition data base.

13. An apparatus for synthesizing an electrical circuit, comprising:

a memory;

a graphical user interface, receiving user input defining a protocol and displaying the user input as frames on a display screen and further storing the user input as a frame definition data base stored in the memory, wherein the user input is received in a language with applicative semantics for specifying control flow and procedural semantics for specifying data flow;

a virtual circuit generator receiving the frame definition data base and generating a first virtual circuit representation stored in the memory;

a state transition graph generator, receiving the first virtual circuit representation and generating a state transition graph stored in the memory;

a state transition graph to virtual circuit converter, receiving the state transition graph and generating a second virtual circuit; and an HDL generator, for receiving a one of the first virtual circuit representation, second virtual circuit representation or state transition graph, and generating an HDL representation of the circuit to be synthesized.

14. The apparatus of claim 13, wherein the graphical user interface further includes portions of the interface that allow a user to browse at least one of: the protocol, frames, actions, variables, ports, expressions, and conditions.

15. The apparatus of claim 13, wherein the graphical user interface further includes portions of the interface that allow a user to edit at least one of: the protocol, frames, actions, variables, ports, expressions, and conditions.

16. The apparatus of claim 13, further including a frame editor interface that allows a user to input frames of at least one of the following types: sequence, hierarchy, alternative, optional, repetitions, qualified, low level, simultaneous, IF, and template.

17. The apparatus of claim 13, wherein the virtual circuit includes:

an optimizer for the virtual circuit, receiving the first virtual circuit representation and generating an optimized virtual circuit representation, the optimizer operating in accordance with a user command received via the graphical user interface.

18. The apparatus of claim 13, wherein the STG to VC converter includes an STG minimizer that minimizes the state transition graph before it is converted to the second virtual circuit.

19. The apparatus of claim 13, further comprising:

an STG to HDL converter that converts the state transition graph to a second HDL representation in accordance with user input received via the graphical user interface.

20. The apparatus of claim 13, further comprising a SIMPLUG interface for software controlling the graphical user interface, the SIMPLUG interface providing a standardized interface to the software so that a variety of simulator programs can simulate the HDL.

* * * * *